US011427044B2

(12) United States Patent
Lee, II et al.

(10) Patent No.: US 11,427,044 B2
(45) Date of Patent: Aug. 30, 2022

(54) TRAILER COUPLER LOCK ASSEMBLY

(71) Applicant: Dynamic Manufacturing Group, LLC, Palmetto, FL (US)

(72) Inventors: Ronald James Lee, II, Apollo beach, FL (US); Anthony Francis Sansone, Parrish, FL (US)

(73) Assignee: DYNAMIC MANUFACTURING GROUP, LLC, Palmetto, FL (US)

(*) Notice: Subject to any disclaimer, the term of this patent is extended or adjusted under 35 U.S.C. 154(b) by 289 days.

(21) Appl. No.: 16/456,189

(22) Filed: Jun. 28, 2019

(65) Prior Publication Data

US 2020/0406694 A1 Dec. 31, 2020

(51) Int. Cl.
*B60D 1/28* (2006.01)
*B60D 1/60* (2006.01)

(52) U.S. Cl.
CPC *B60D 1/28* (2013.01); *B60D 1/60* (2013.01)

(58) Field of Classification Search
CPC . B60D 1/60; B60D 1/28; B60D 1/605; B60D 1/18
USPC ...................................... 280/507, 480.1, 480
See application file for complete search history.

(56) References Cited

U.S. PATENT DOCUMENTS 4,141,569 A * 2/1979 Dilk ......................... B60D 1/60 280/507
4,180,281 A * 12/1979 Tertinek .................. B60D 1/28 280/457
6,035,977 A * 3/2000 Marasco .................. B60T 7/10 188/112 R
6,244,614 B1 * 6/2001 Bonvillain ............... B60D 1/60 280/507
6,467,317 B1 * 10/2002 Hillabush ................ B60D 1/60 280/507
6,572,132 B1 * 6/2003 Saul ......................... B60D 1/18 280/480
6,581,952 B1 * 6/2003 MacKarvich .......... B60D 1/065 280/457
6,971,661 B1 * 12/2005 MacKarvich .......... B60D 1/065 280/457
7,246,810 B2 * 7/2007 Bussiere .................. B60D 1/60 280/507
10,513,159 B2 * 12/2019 Odom ...................... B60D 1/60
10,569,607 B1 * 2/2020 Alalouf .................. B60D 1/605
10,766,321 B2 * 9/2020 Pratt ....................... B60D 1/363

(Continued)

FOREIGN PATENT DOCUMENTS

DE 3502701 A1 * 7/1986 ............... B60D 1/60
DE 9212540 U1 * 2/1993 ............... B60D 1/60

(Continued)

OTHER PUBLICATIONS https://www.provenlocks.com/pages/demo-videos; various demo videos at provenlocks.com (uploaded prior to effective filing date of current application—also on Youtube.com); last vistied website on: Jun. 28, 2019.

*Primary Examiner* — Jacob D Knutson
*Assistant Examiner* — Myles A Harris
(74) *Attorney, Agent, or Firm* — Mark Young, P.A.

(57) ABSTRACT

A trailer coupler lock assembly has a rigid protective case that receives an interlock adapter for interlocking a trailer coupler within the rigid protective case. The rigid protective case has a compartment dedicated for securing a safety chain assembly.

19 Claims, 59 Drawing Sheets

(56) References Cited

U.S. PATENT DOCUMENTS

| | | | | |
|---|---|---|---|---|
| 2008/0067783 | A1 * | 3/2008 | Rousseau | B60D 1/60 280/507 |
| 2008/0277902 | A1 * | 11/2008 | Green | B60D 1/60 280/457 |
| 2009/0315309 | A1 * | 12/2009 | Lopes | B60D 1/60 280/762 |
| 2019/0193497 | A1 * | 6/2019 | Williamson | B60D 1/60 |
| 2021/0039458 | A1 * | 2/2021 | Strickland | E05B 67/383 |

FOREIGN PATENT DOCUMENTS

| | | | | |
|---|---|---|---|---|
| DE | 4304552 | A1 * | 9/1994 | B60D 1/60 |
| DE | 202012101949 | U1 * | 7/2012 | B60D 1/60 |
| FR | 3078016 | A1 * | 8/2019 | B60D 1/60 |
| GB | 2210343 | A * | 6/1989 | B60D 1/60 |
| GB | 2255538 | A * | 11/1992 | B60D 1/60 |

* cited by examiner

106

TRAILER COUPLER LOCK ASSEMBLY

CROSS-REFERENCE TO RELATED APPLICATIONS

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to locks and more particularly, to a trailer coupler lock assembly that secures a trailer coupler and safety chain assembly of a trailer.

Description of Related Art

Conventional locks for trailer couplers are well known and have been in use for a number of years. Regrettably, most conventional locks were not originally designed or configured with the intent to secure a safety chain assembly of a trailer. In fact, the existing locks are extremely bulky, heavy, and very cumbersome to operate for locking and unlocking of both trailer coupler and safety chain assembly.

Accordingly, in light of the current state of the art and the drawbacks to current locks for securing trailer couplers mentioned above, a need exists for a small, compact, and sturdy trailer coupler lock assembly that would securely lock both the trailer coupler and safety chain assembly of a variety of commercially available (or conventional) sizes, makes, and models. In particular, a need exists for a sturdy trailer coupler lock assembly with a small, compact form-factor that would include a dedicated compartment for securing and locking conventional safety chain assembly with different size, type, and models in addition to locking a trailer coupler of a trailer. As importantly, a need exists for a sturdy trailer coupler lock assembly with a small, compact form-factor that would not be cumbersome to operate in locking both the trailer coupler and the safety chain assembly.

BRIEF SUMMARY OF THE INVENTION

A non-limiting, exemplary aspect of an embodiment of the present invention provides a trailer coupler lock assembly, comprising:

a rigid protective case; and an interlock adapter for interlocking a trailer coupler within the rigid protective case;

with the rigid protective case having a compartment dedicated for securing a safety chain assembly.

Another non-limiting, exemplary aspect of an embodiment of the present invention provides a trailer coupler lock assembly, comprising:

a rigid protective case that shields a trailer coupler;

the rigid protective case includes:

a detachable interlock adapter that facilitates securing of the trailer coupler assembly to the trailer coupler lock assembly;

an integrated locking compartment for housing, securing, and locking a safety chain assembly.

A further non-limiting, exemplary aspect of an embodiment of the present invention provides a method of locking a trailer coupler lock assembly, comprising:

- providing a rigid protective case;
- removing an interlock adapter from the rigid protective case;
- positioning a projection of the interlocking adapter within an interlocking recess of the trailer coupler,
- latching the coupler latch to secure the interlock adapter to trailer coupler,
- positioning safety chain assembly within a compartment of the rigid protective case;
- mounting the rigid protective case and the included safety chain assembly over the combined interlock adapter and the trailer coupler,
- wherein: the hasp piece of the interlock adapter passes through the body of the rigid protective case and is secured using a lock, preventing the protective case from being removed from the interlocking adapter attached to the trailer coupler.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 4E and 4F are non-limiting exemplary exploded view illustration of the various members of the rigid protective case in accordance with one or more embodiments of the present invention;

DETAILED DESCRIPTION OF THE INVENTION

Figure 1A:
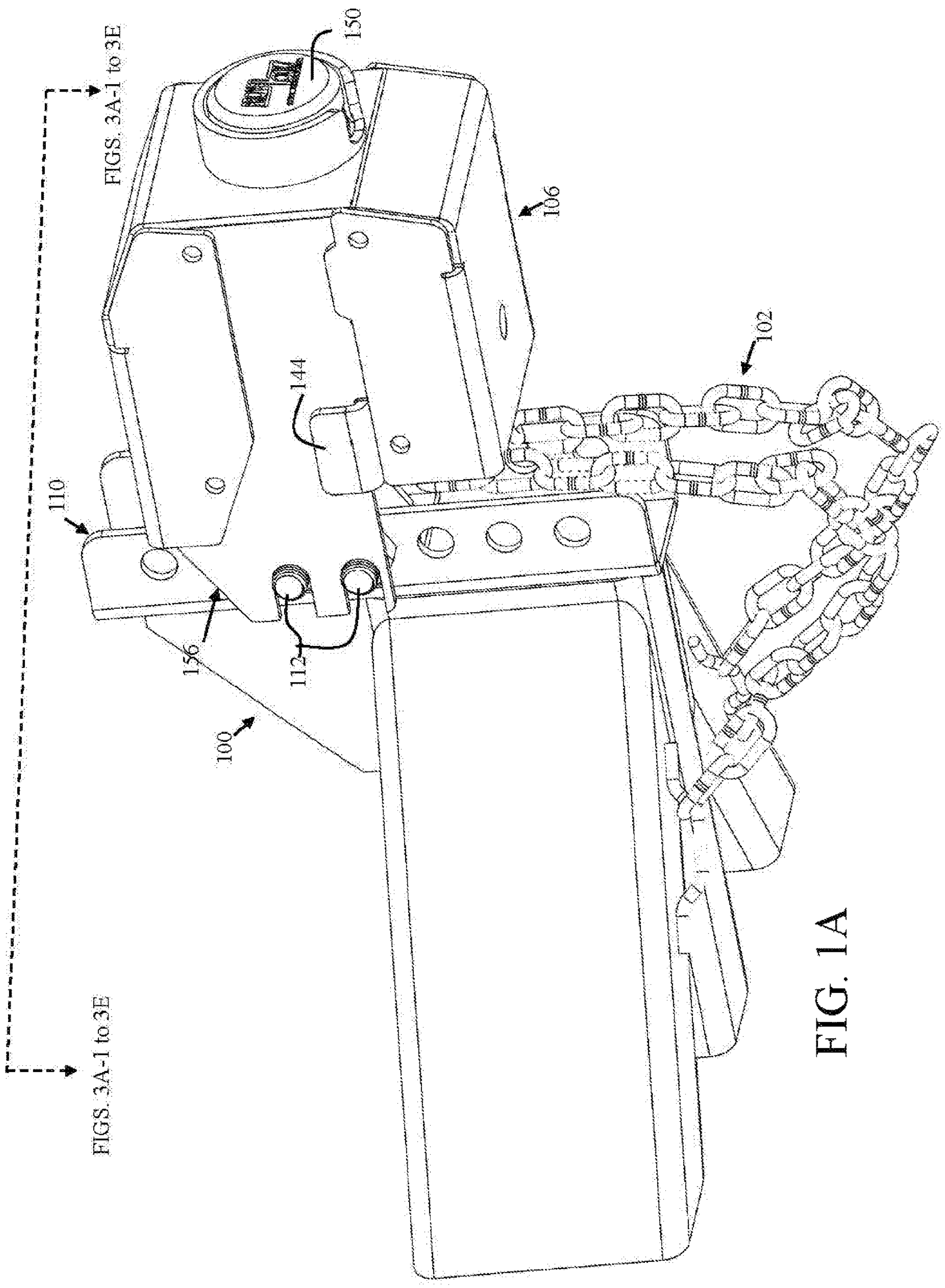
FIGS. 1A to 1G are non-limiting, exemplary illustrations of the various views of a conventional adjustable trailer coupler in a fully locked position by a trailer coupler lock assembly in accordance with one or more embodiments of the present invention.
Figure 1B:
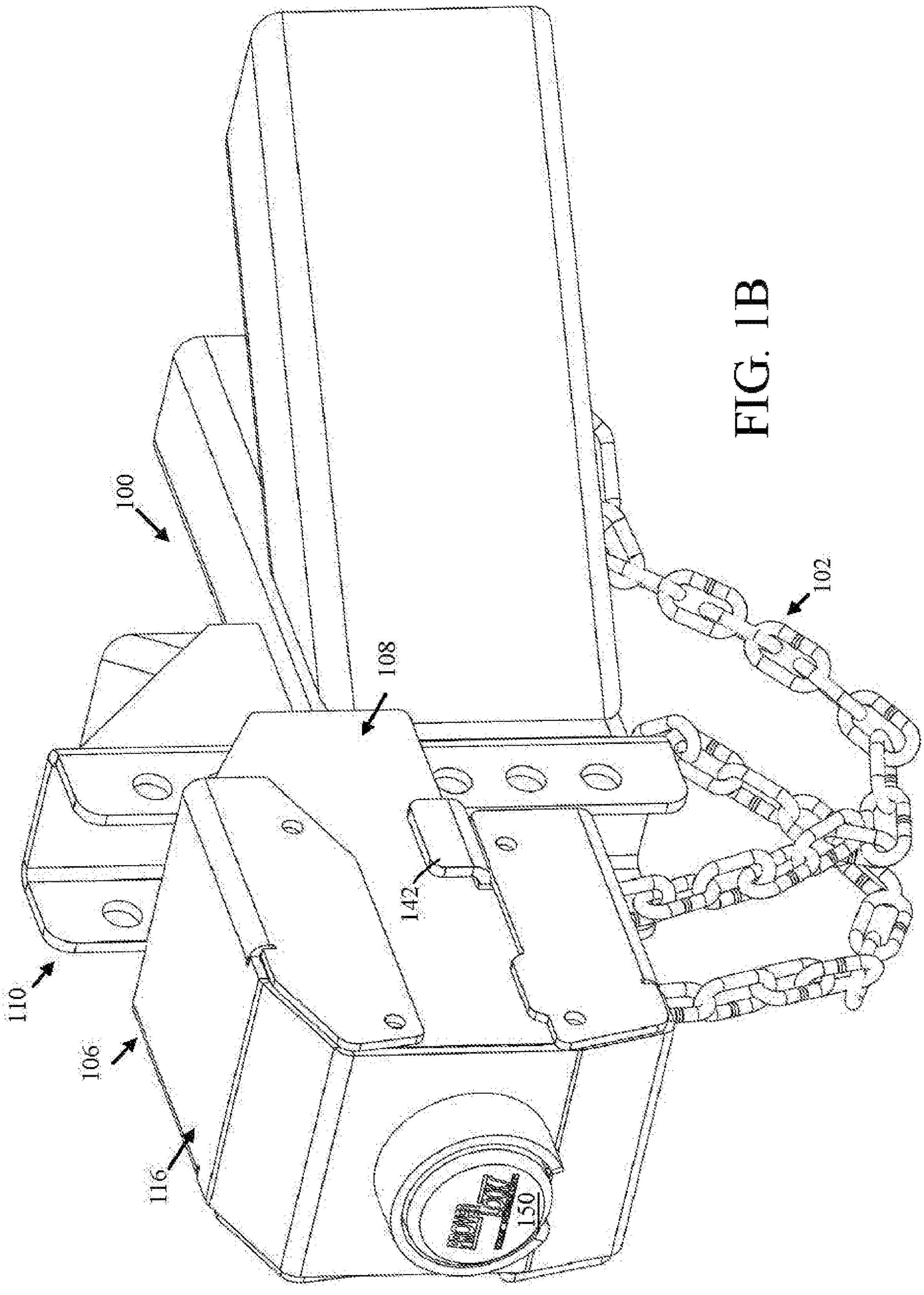
Figure 1C:
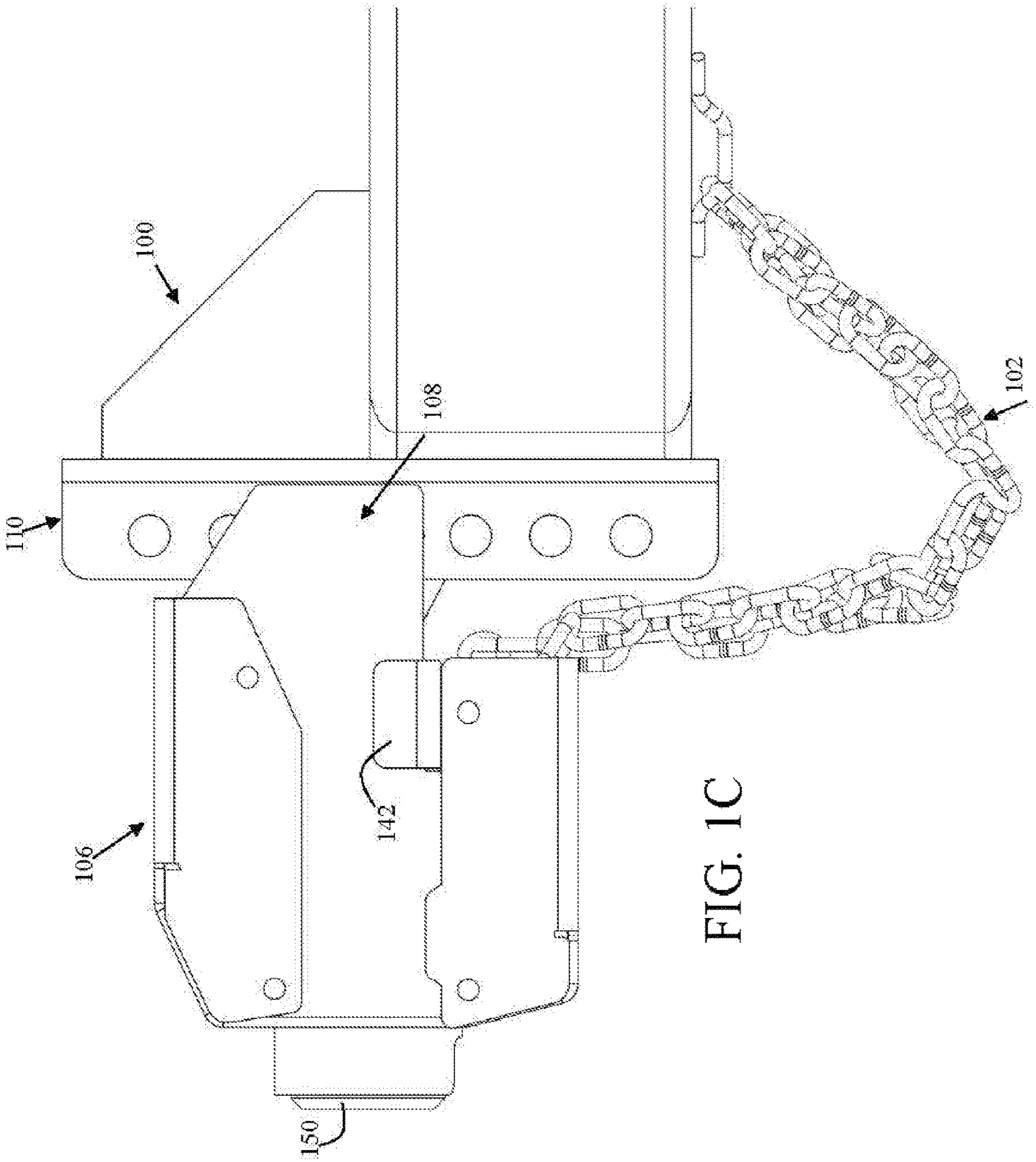
Figure 1D:
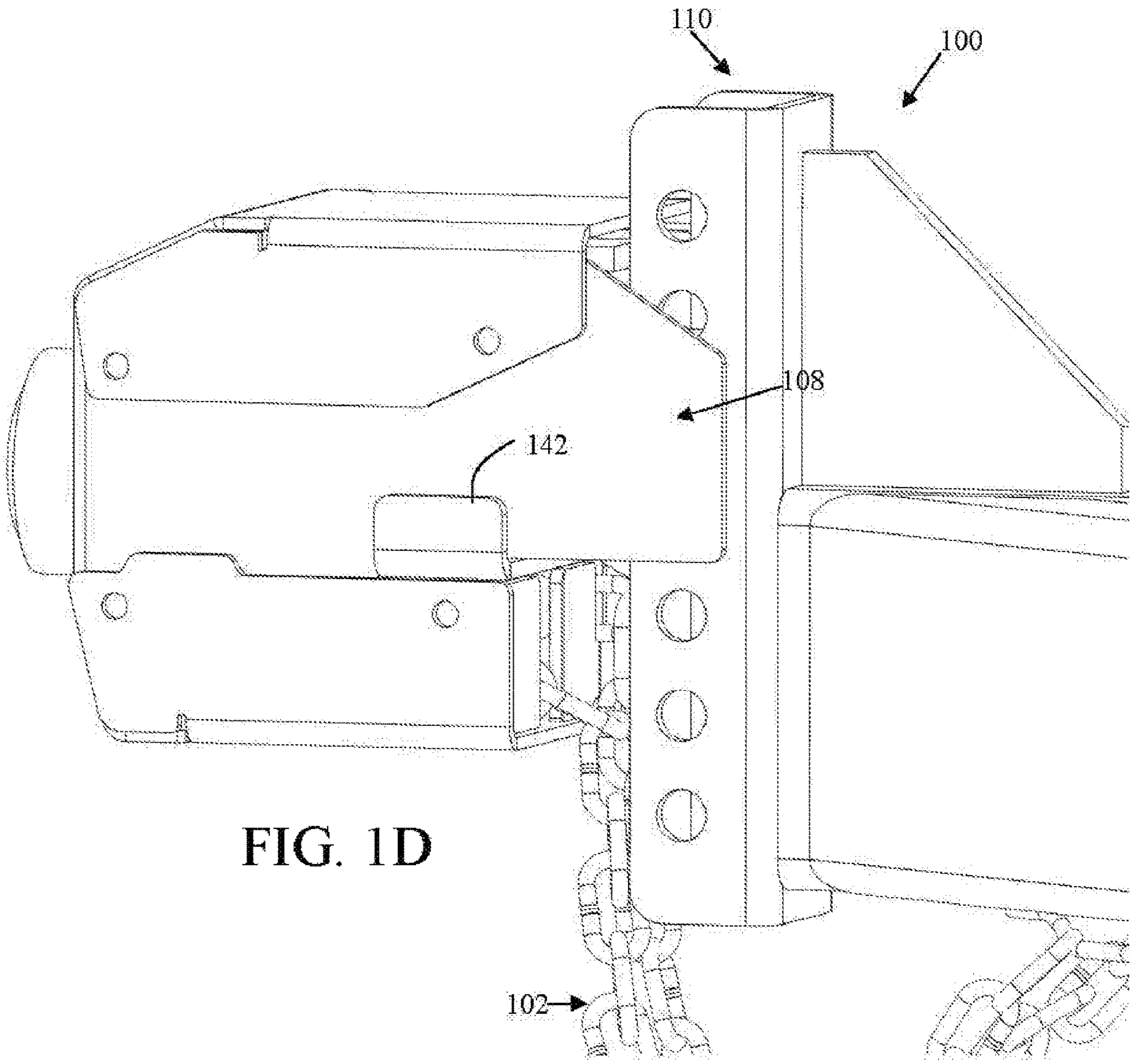
Figure 1E:
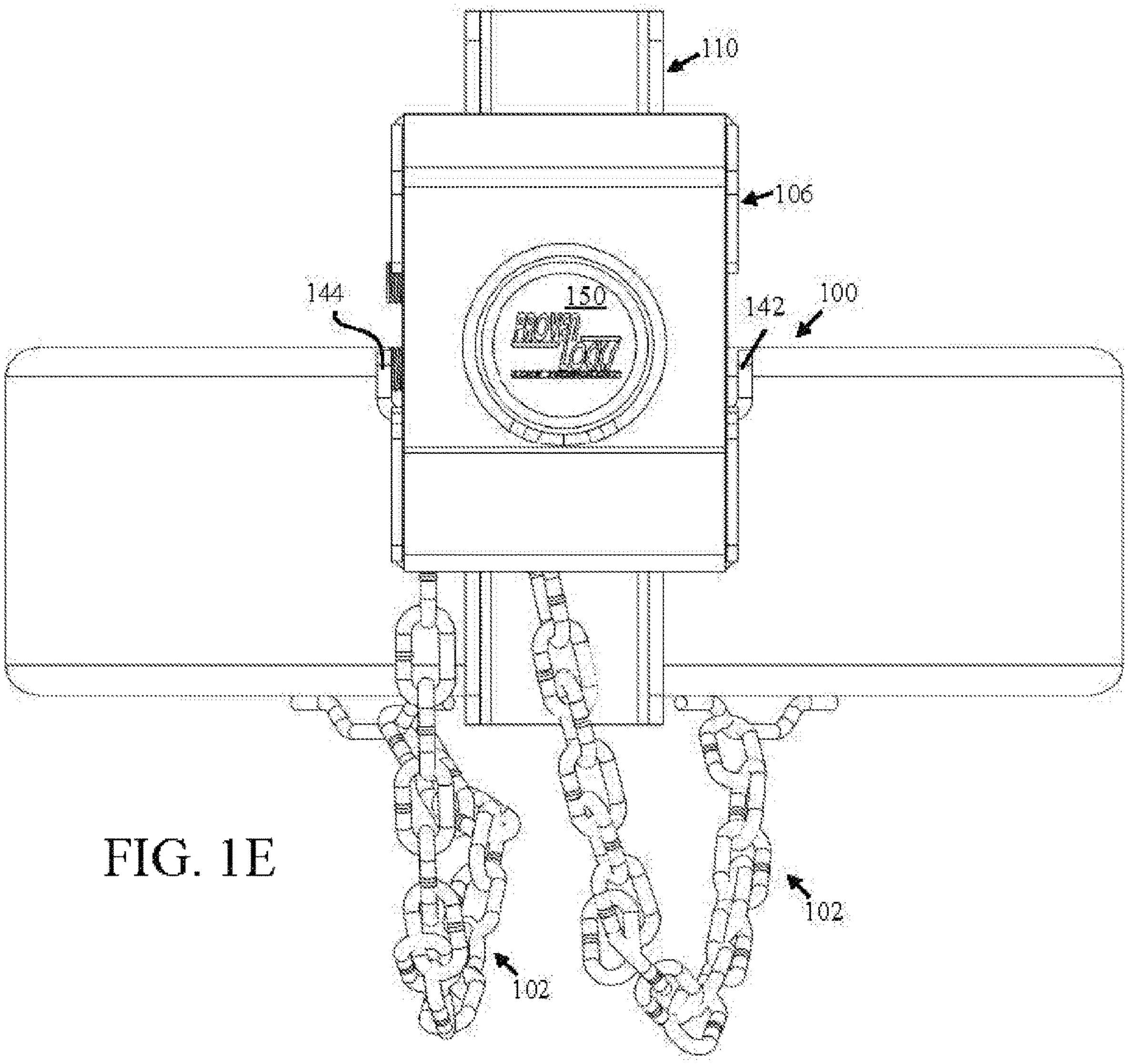
Figure 1F:
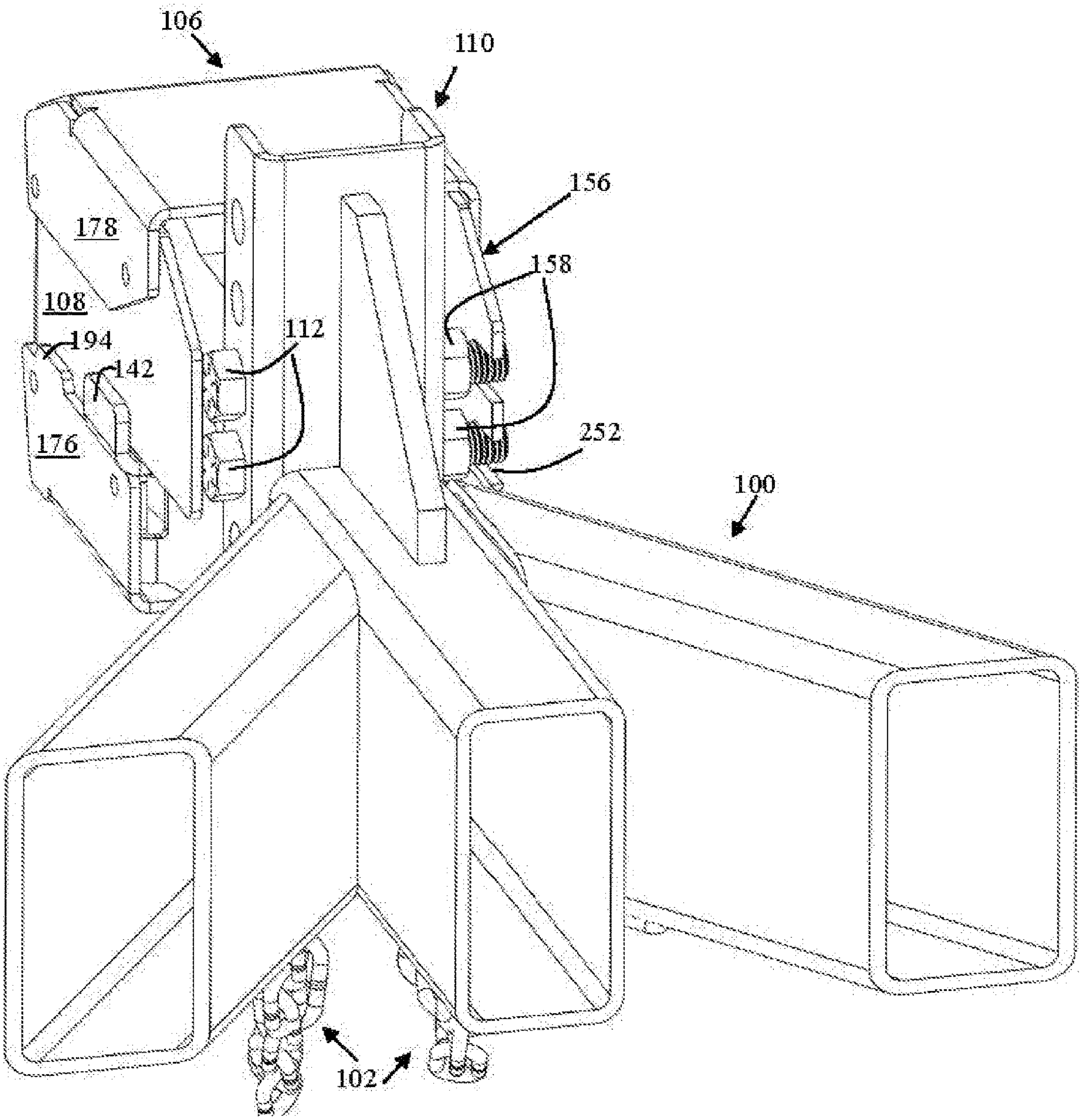
Figure 1G:
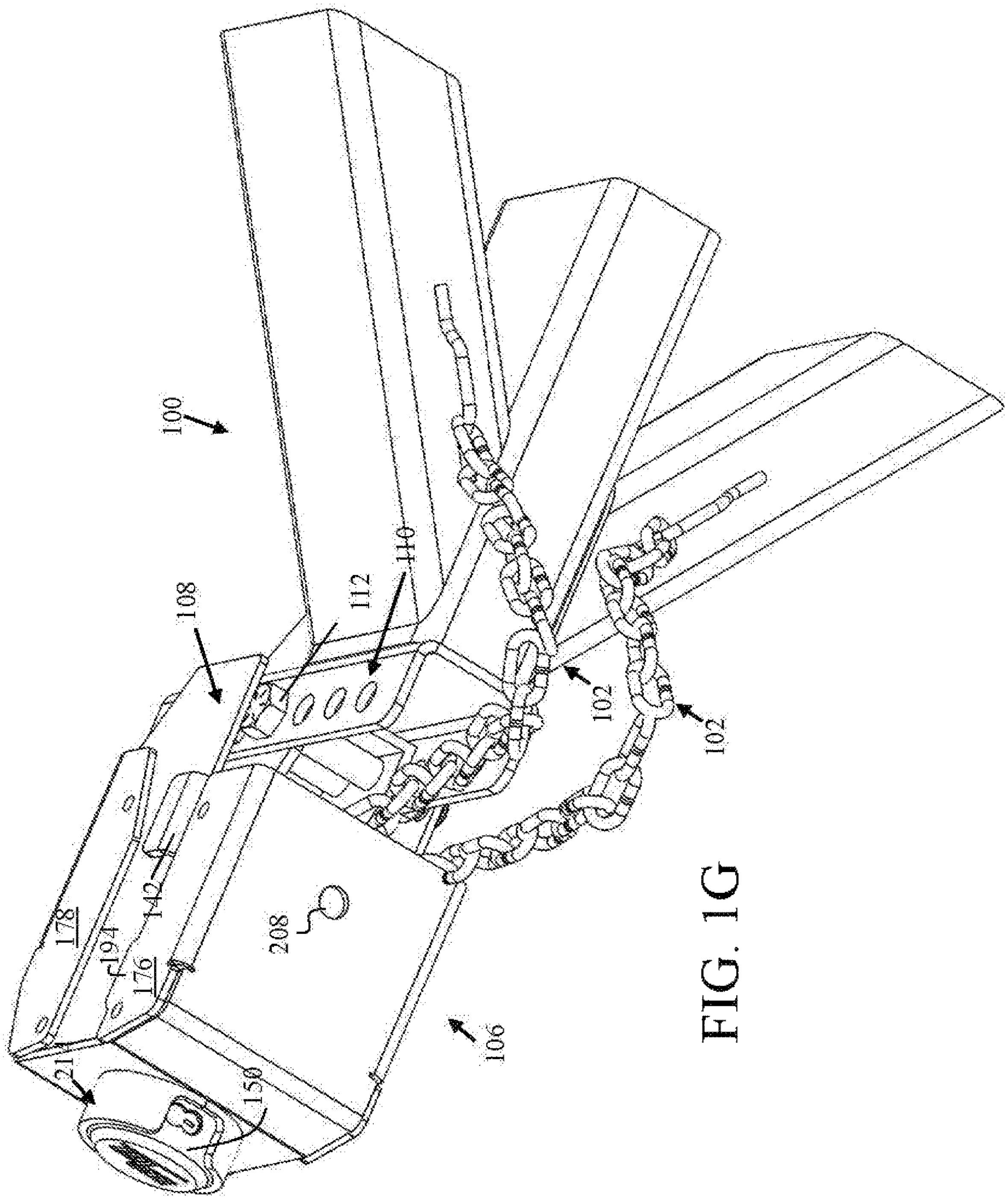

The detailed description set forth below in connection with the appended drawings is intended as a description of the presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention may use the phrase form factor as the physical size and or shape of various members of the one or more embodiments of the trailer coupler lock assembly of the present invention, including for example, the form factor of the trailer coupler lock assembly itself, interlock adapter, etc.

One or more embodiments of the present invention provide a small, compact, and sturdy trailer coupler lock assembly that securely locks both the trailer coupler and safety chain assembly of a variety of commercially available (or conventional) sizes, makes, and models Additionally, one or more embodiments of the present invention provide a sturdy trailer coupler lock assembly with small, compact form-factor that includes a dedicated compartment for securing and locking conventional safety chain assembly with different size, type, and models in addition to locking a trailer coupler of a trailer. In fact, at the very minimum, the dedicated compartment of the one or more embodiments of the trailer coupler lock assembly has sufficient size to securely lock at least the hook of the safety chain assembly.

Further, one or more embodiments of the present invention provide a sturdy trailer coupler lock assembly with small, compact form-factor that is not cumbersome to operate in locking both the trailer coupler and the safety chain assembly.

FIGS. 1A to 1G are non-limiting, exemplary illustrations of the various views of a conventional adjustable trailer coupler in a fully locked position by a trailer coupler lock assembly in accordance with one or more embodiments of the present invention. As illustrated, both trailer coupler 100 and its accompanying safety chain assembly 102 (which includes safety chain hooks 104 shown in FIG. 2I) are secured and locked by and within trailer coupler lock assembly 106. It should be noted that securing the safety chain assembly provides a strong deterrent from pulling the trailer using only the safety chain assembly 102, which may be accomplished if only coupler 100 is secured.

As further illustrated in FIGS. 1A to 1G, in this non-limiting, exemplary instance, since trailer coupler 100 is an adjustable trailer coupler, lateral sides 108 and 156 of trailer coupler lock assembly 106 extends and covers over an adjuster assembly 110 (FIG. 1F) of adjustable trailer coupler 100. Lateral sides 108 and 156 of trailer coupler lock assembly 106 prevents tampering with adjuster assembly 110 by preventing unauthorized users from unfastening and removal of fasteners 112 and 158 (e.g., the illustrated bolt 112 and nut 158).

Additionally, as illustrated, latch handle 128 (FIG. 2I) of trailer coupler latch (well known, not shown) is also fully secured within rigid protective case 116 and hence, trailer coupler lock assembly 106 prevents tampering with and movement of trailer coupler latch handle 128. Accordingly, trailer coupler 100, safety chain assembly 102, and adjuster assembly 110 are fully protected by trailer coupler lock assembly 106.

Figure 2A:
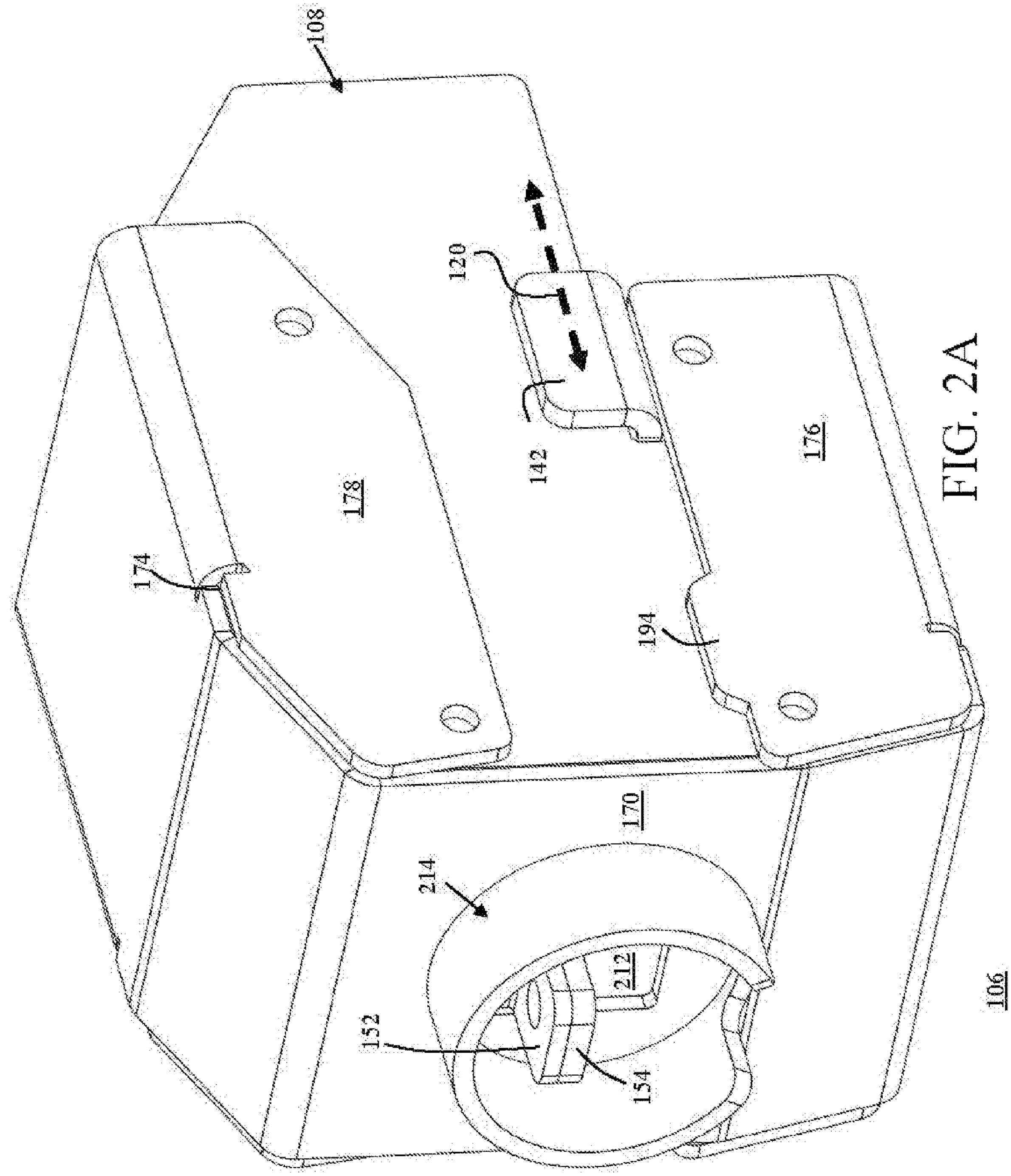
FIGS. 2A to 2U are non-limiting, exemplary illustrations of the trailer coupler lock assembly illustrated in FIG. 1A to 1G, which progressively illustrate a non-limiting, exemplary method of locking of a trailer coupler and safety chain assembly in accordance with one or more embodiments of the present invention.
Figure 2B:
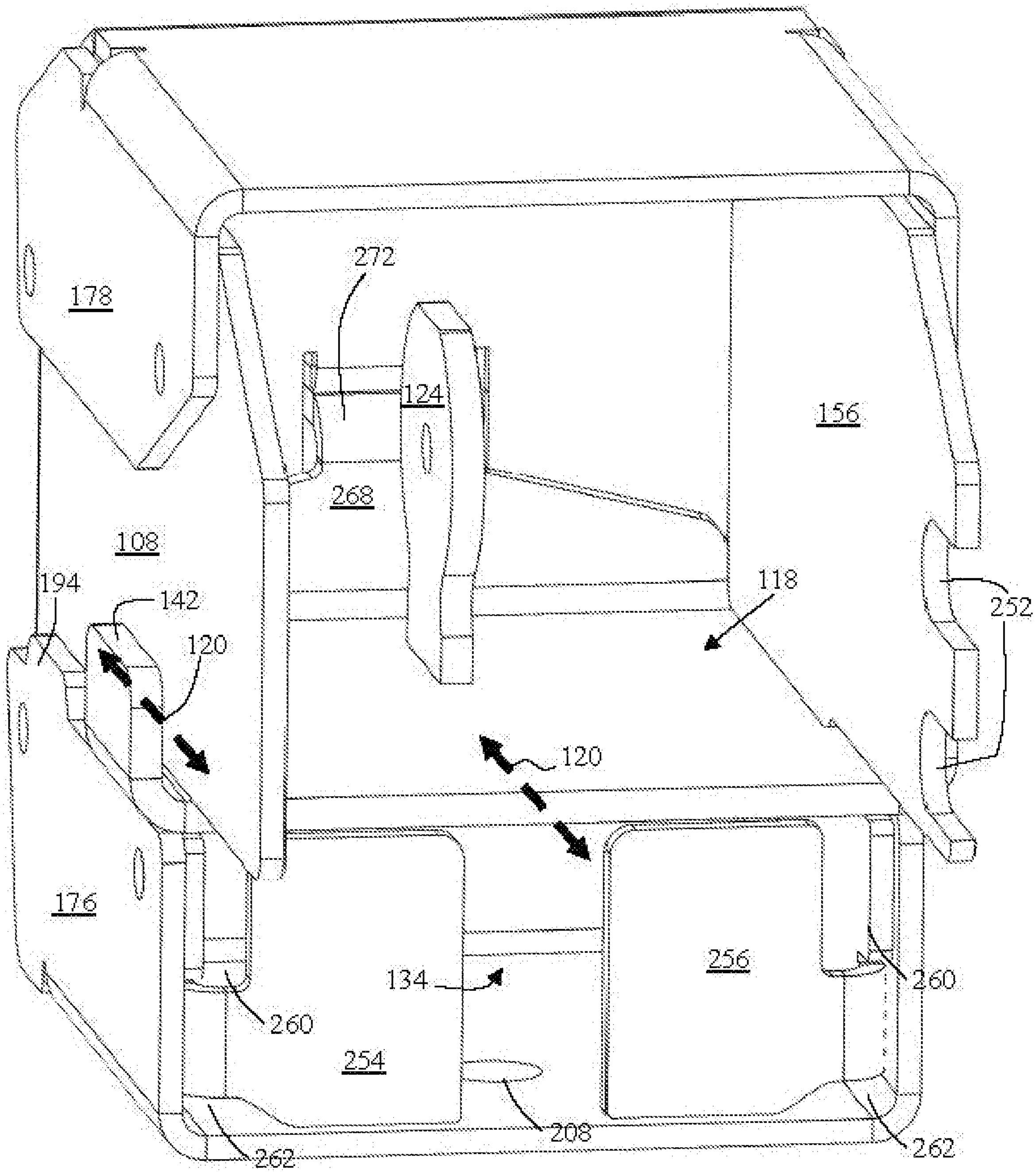
Figure 2C:
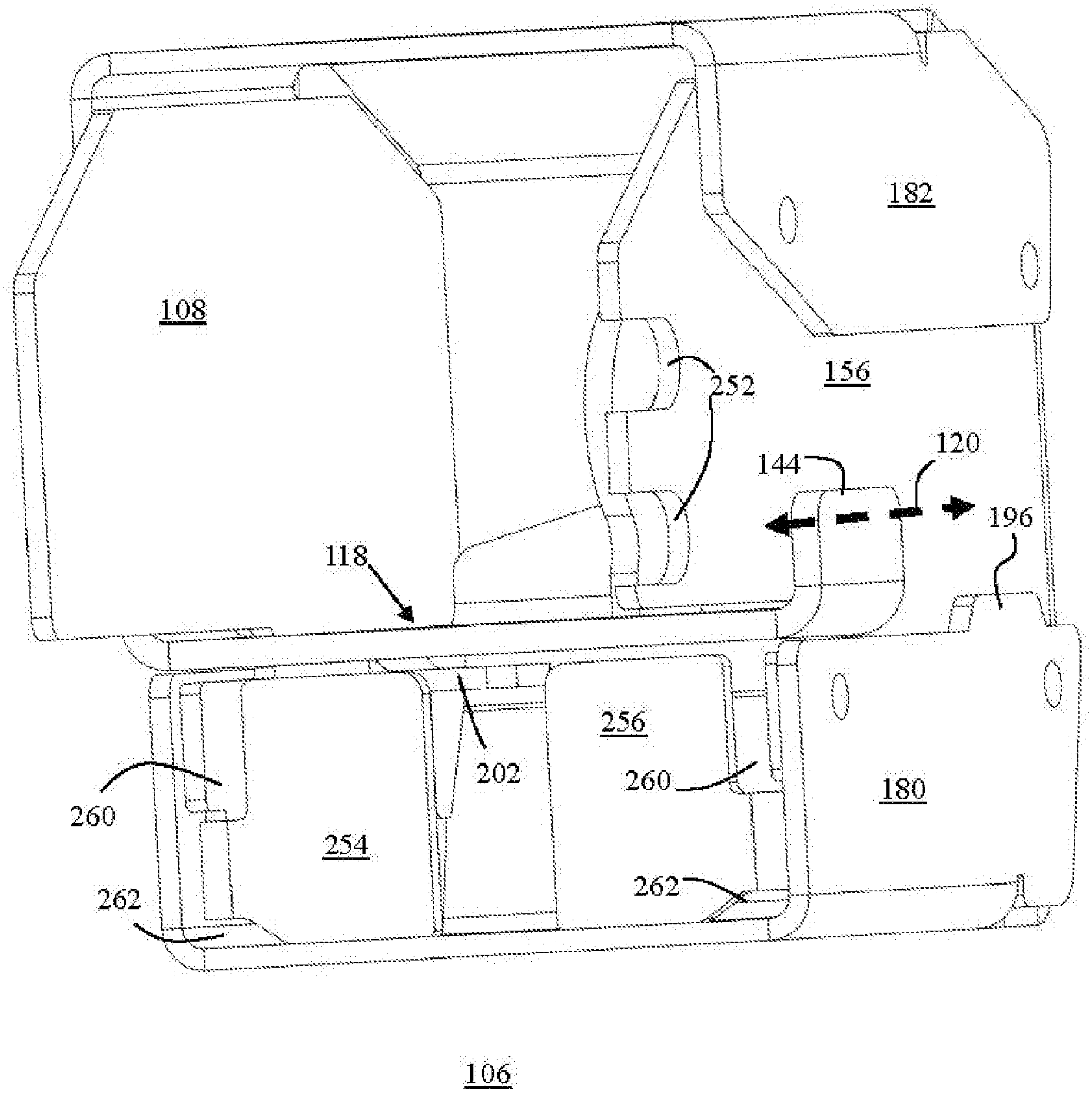
Figure 2D:
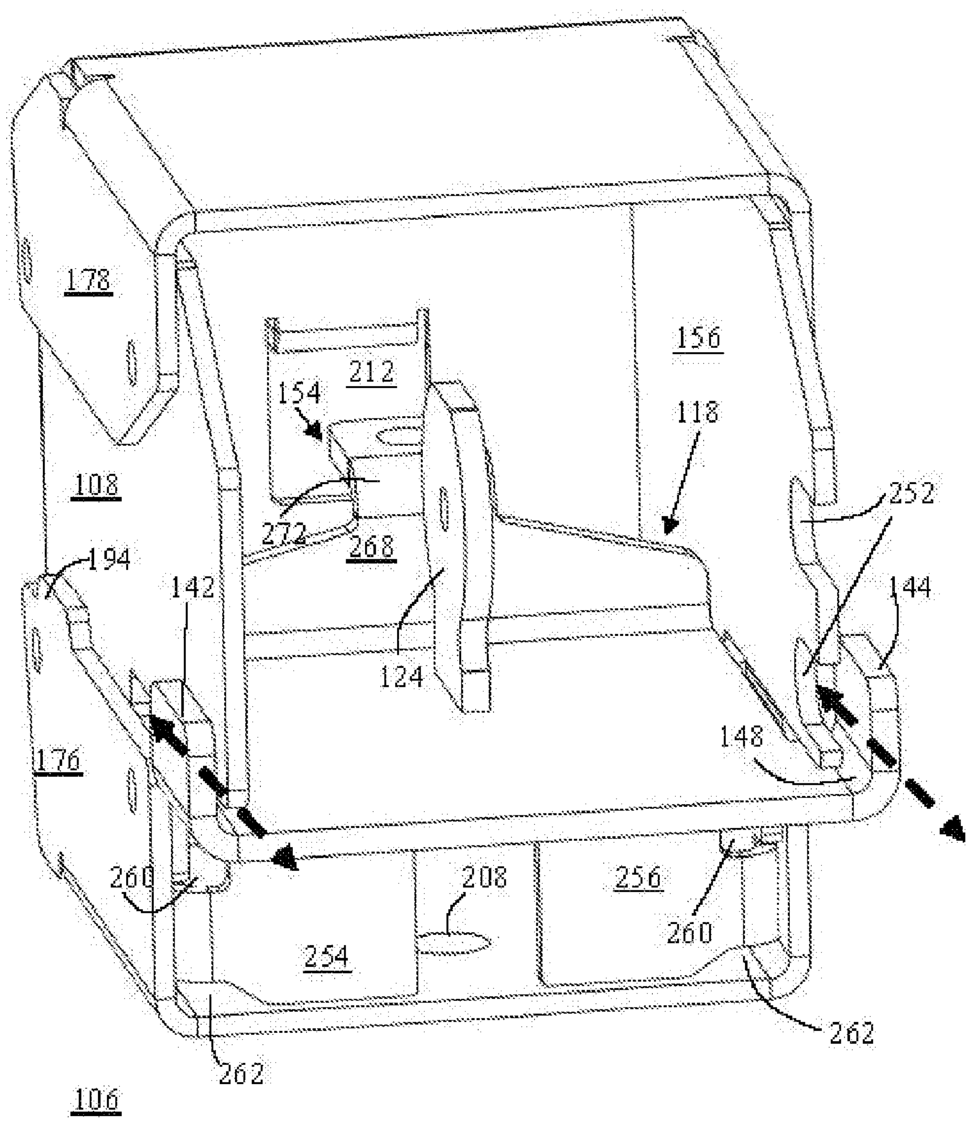
Figure 2E:
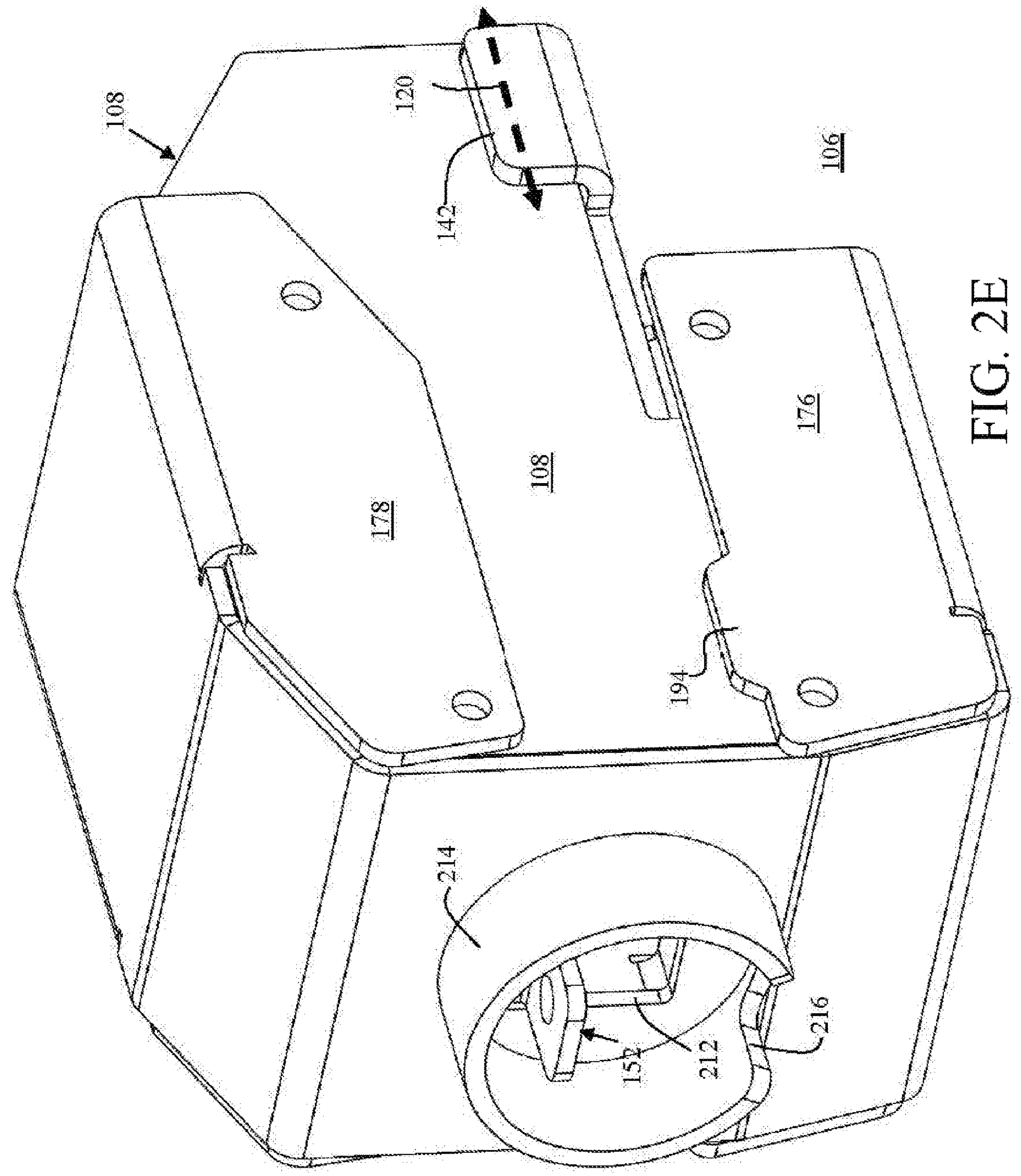
Figure 2F:
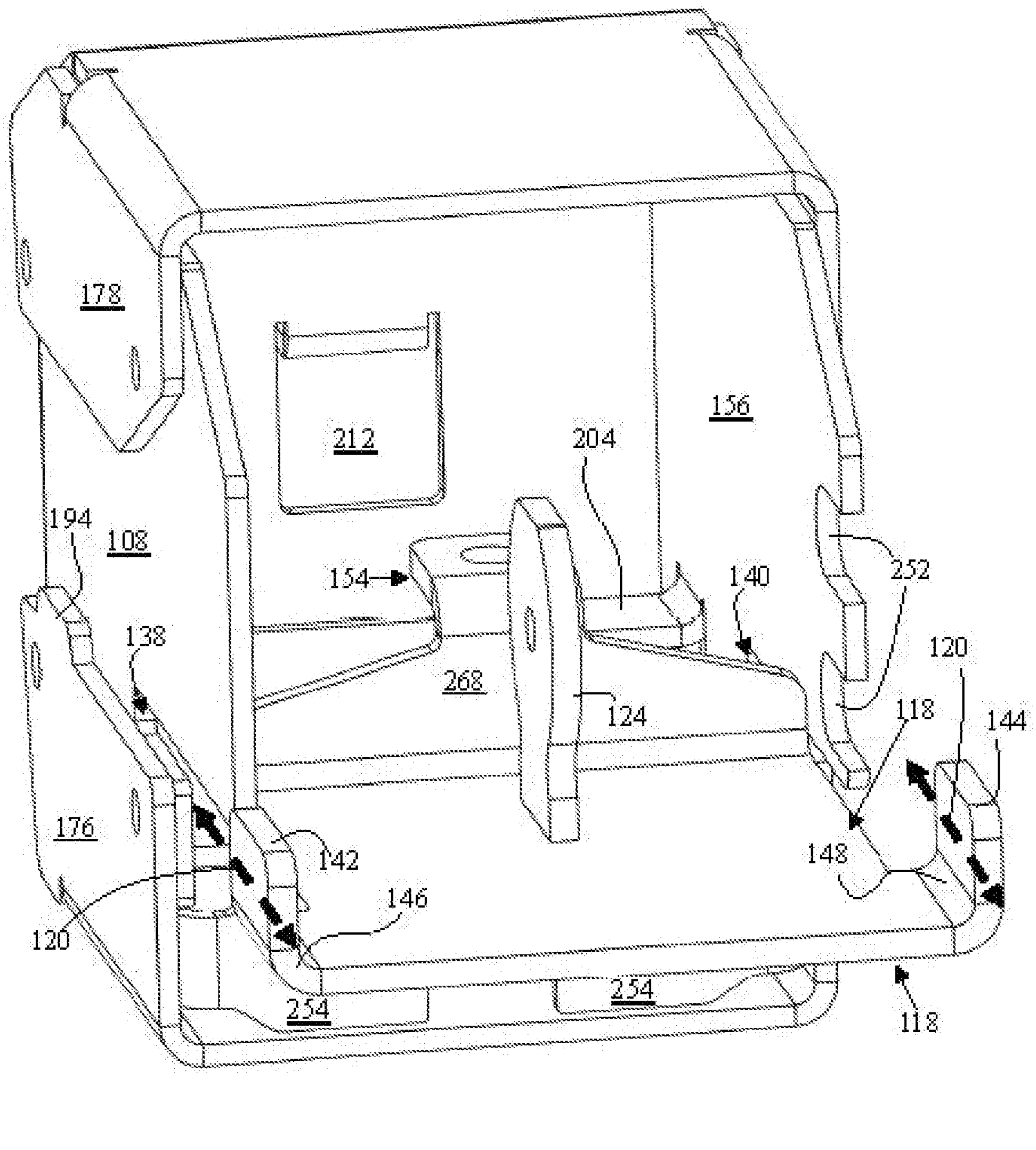
Figure 2G:
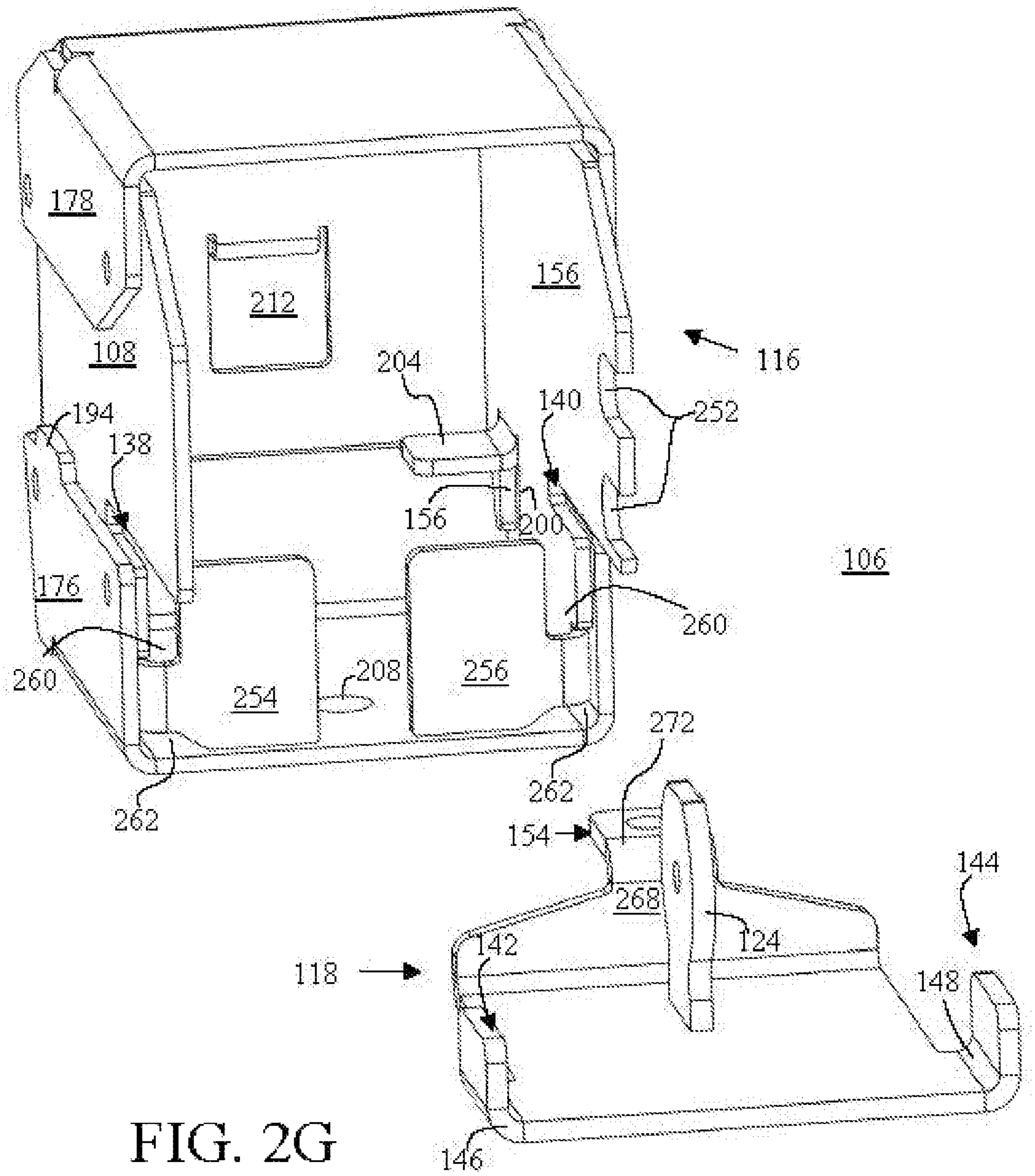
Figure 2H:
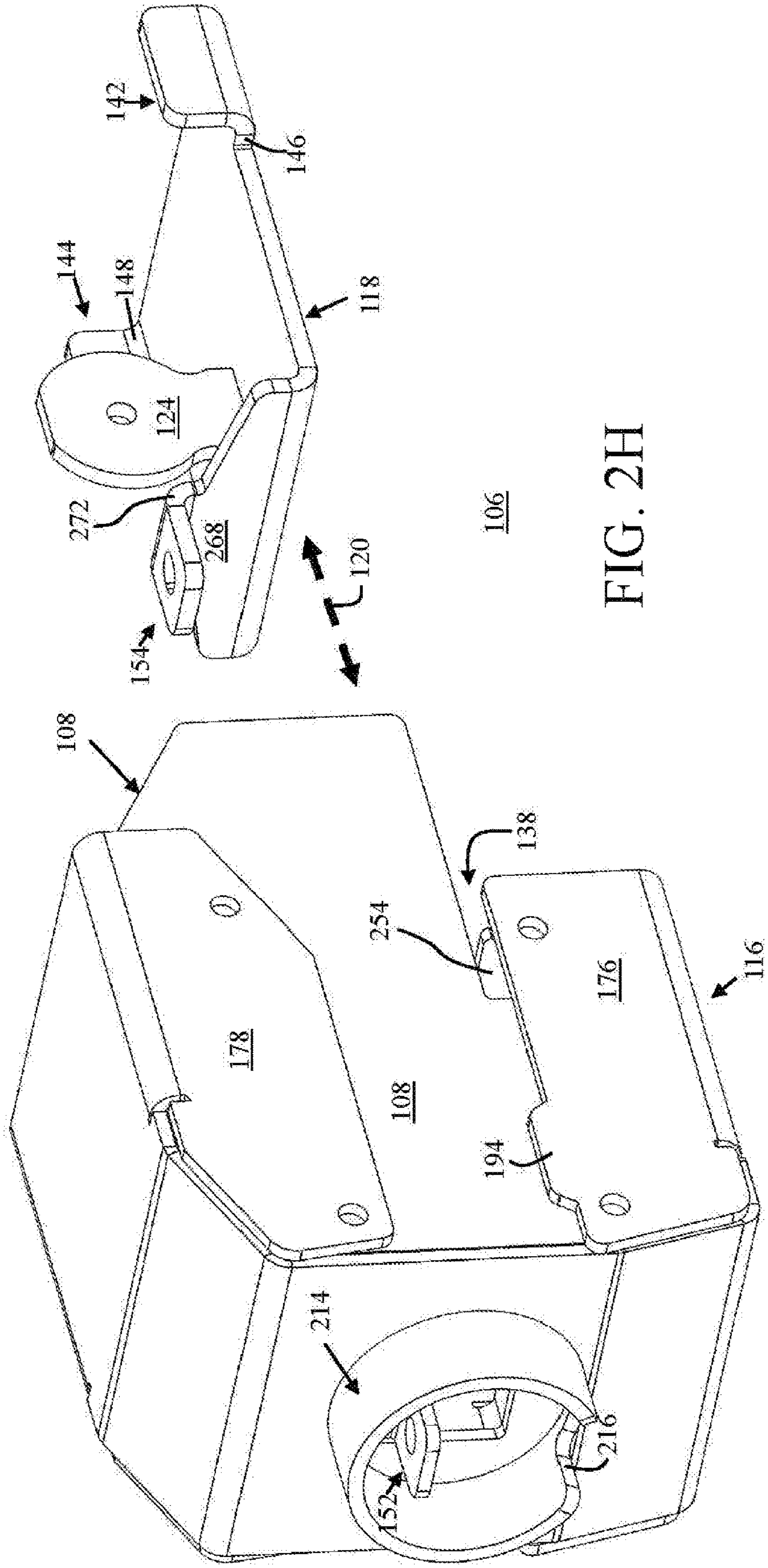
Figure 2I:
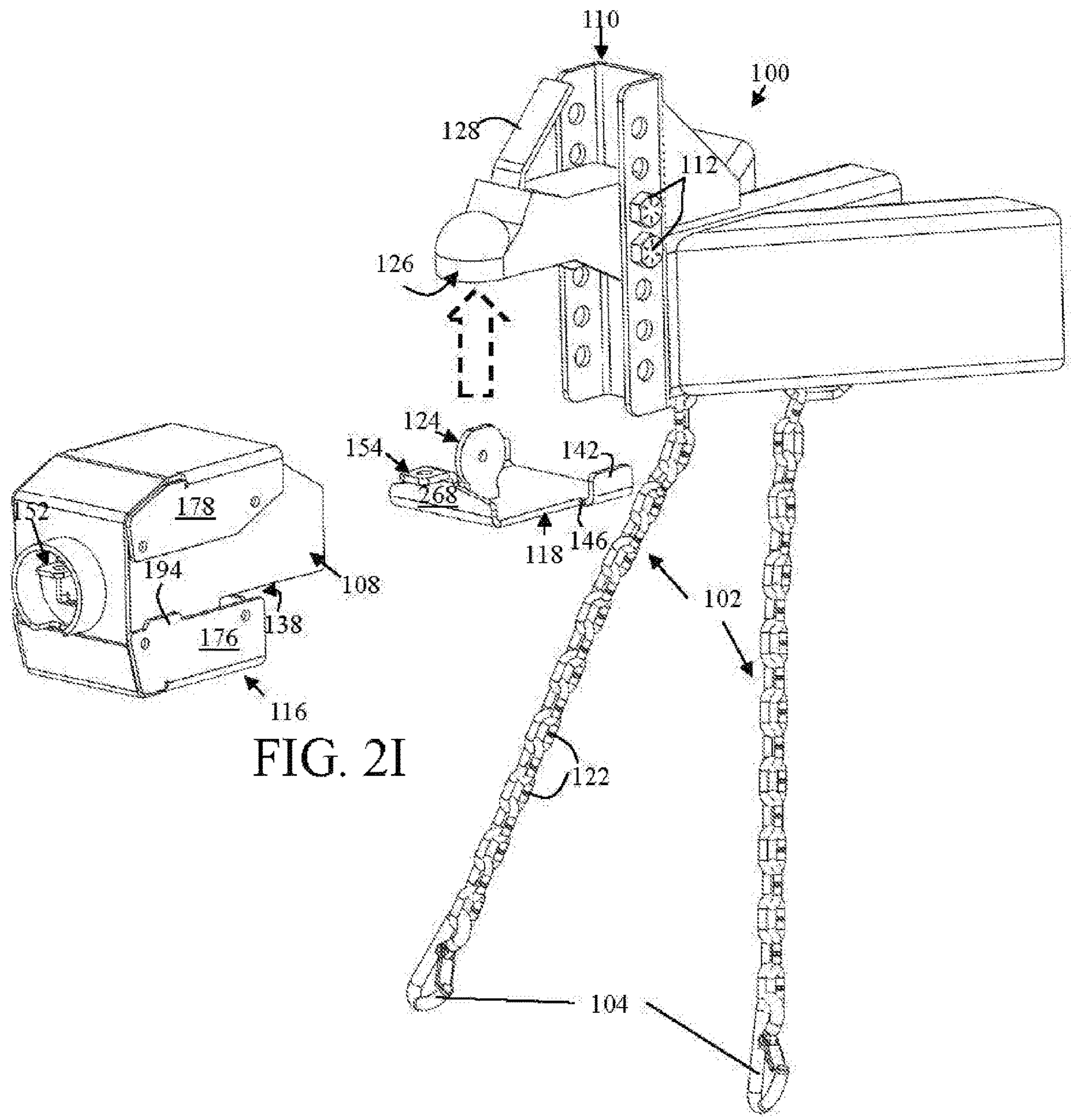
Figure 2J:
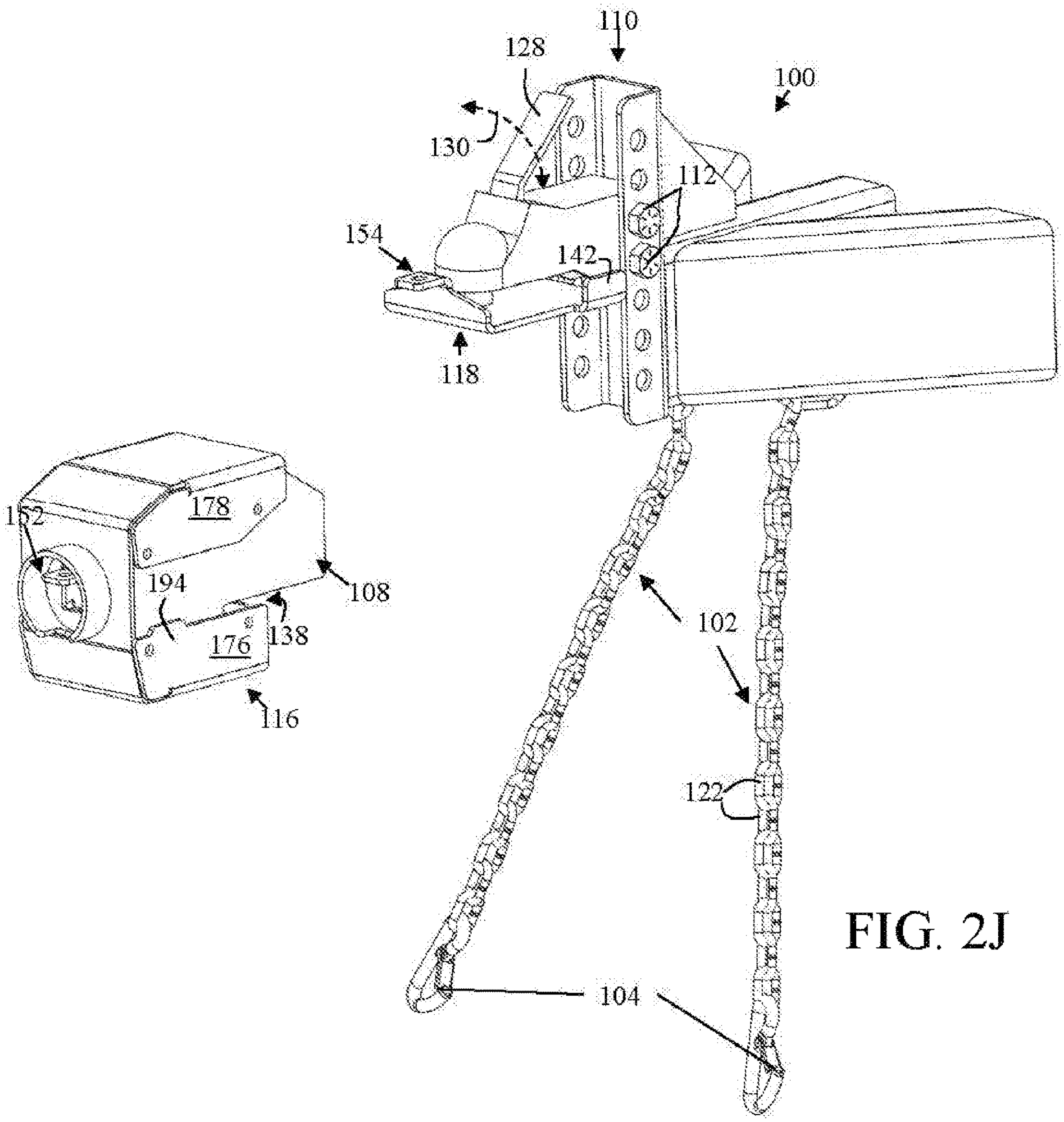
Figure 2K:
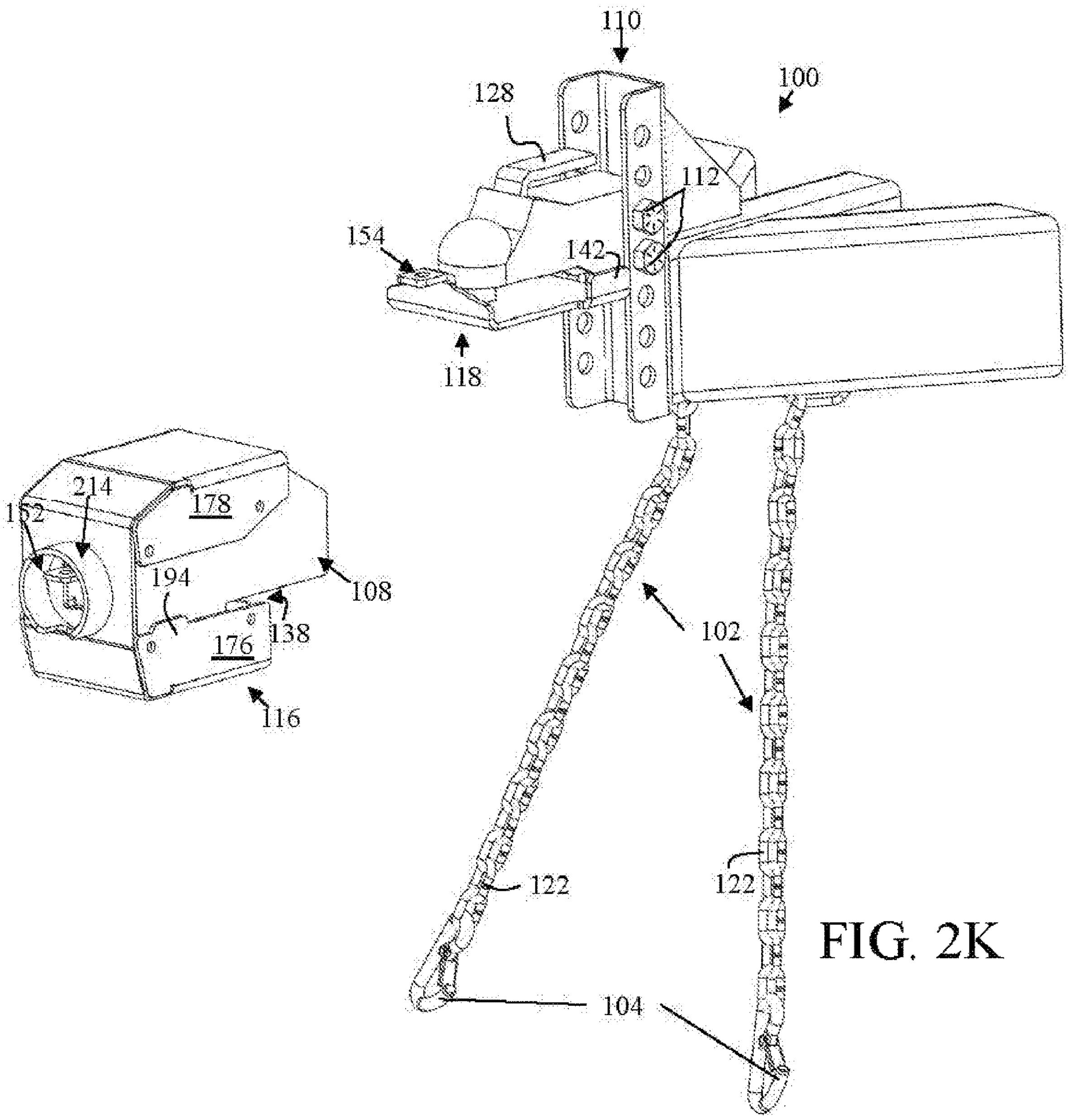
Figure 2L:
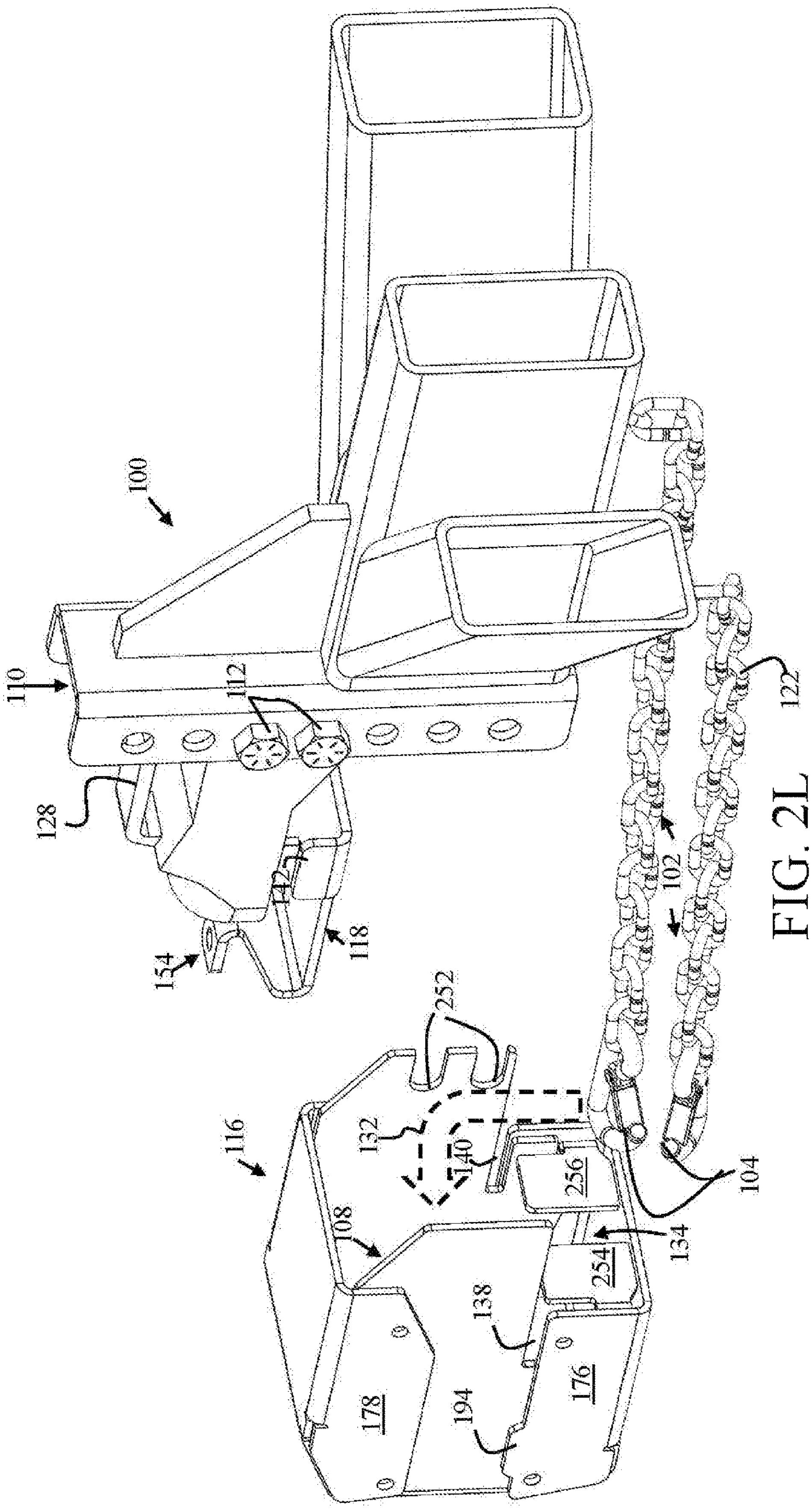
Figure 2M:
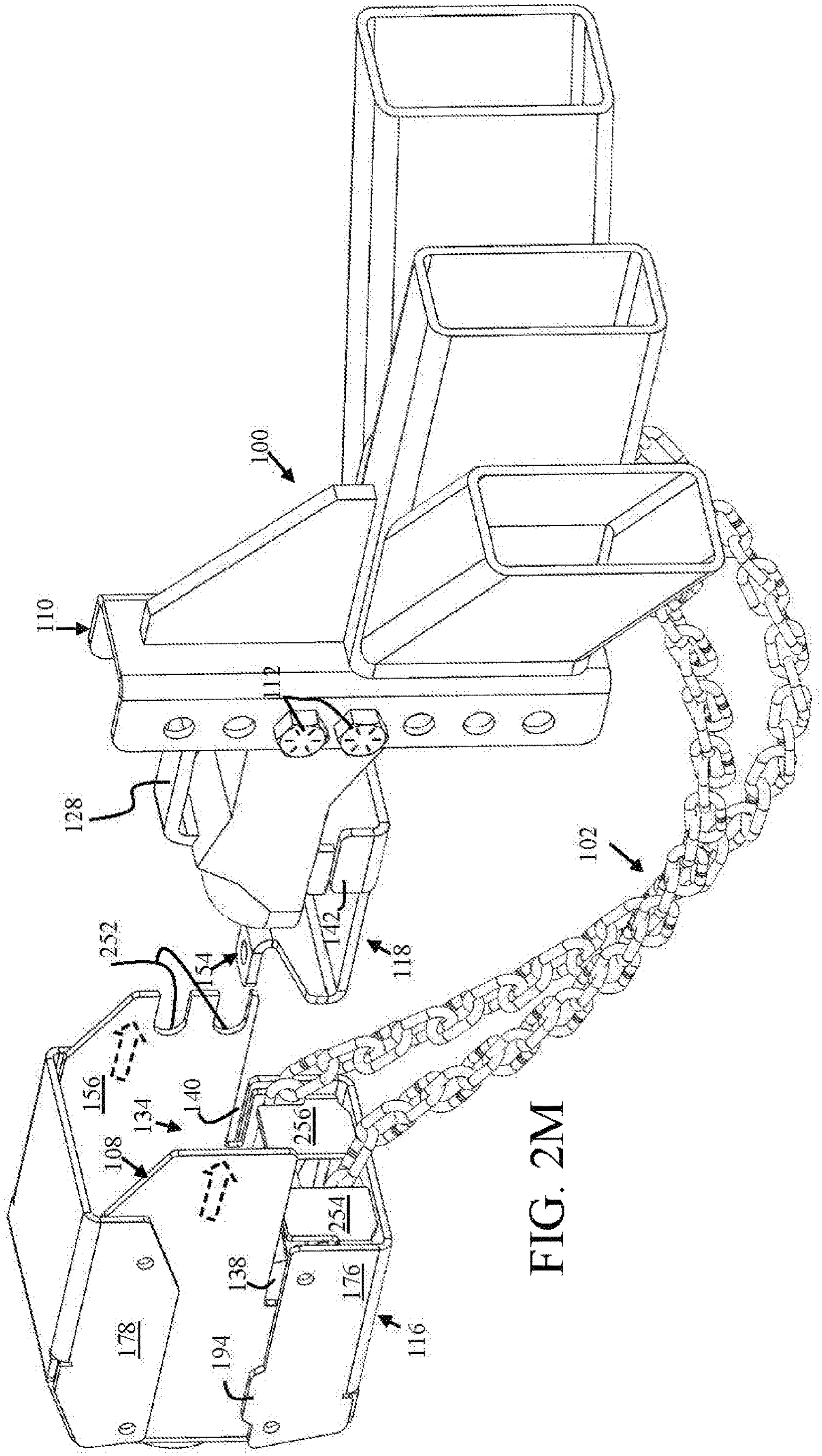
Figure 2N:
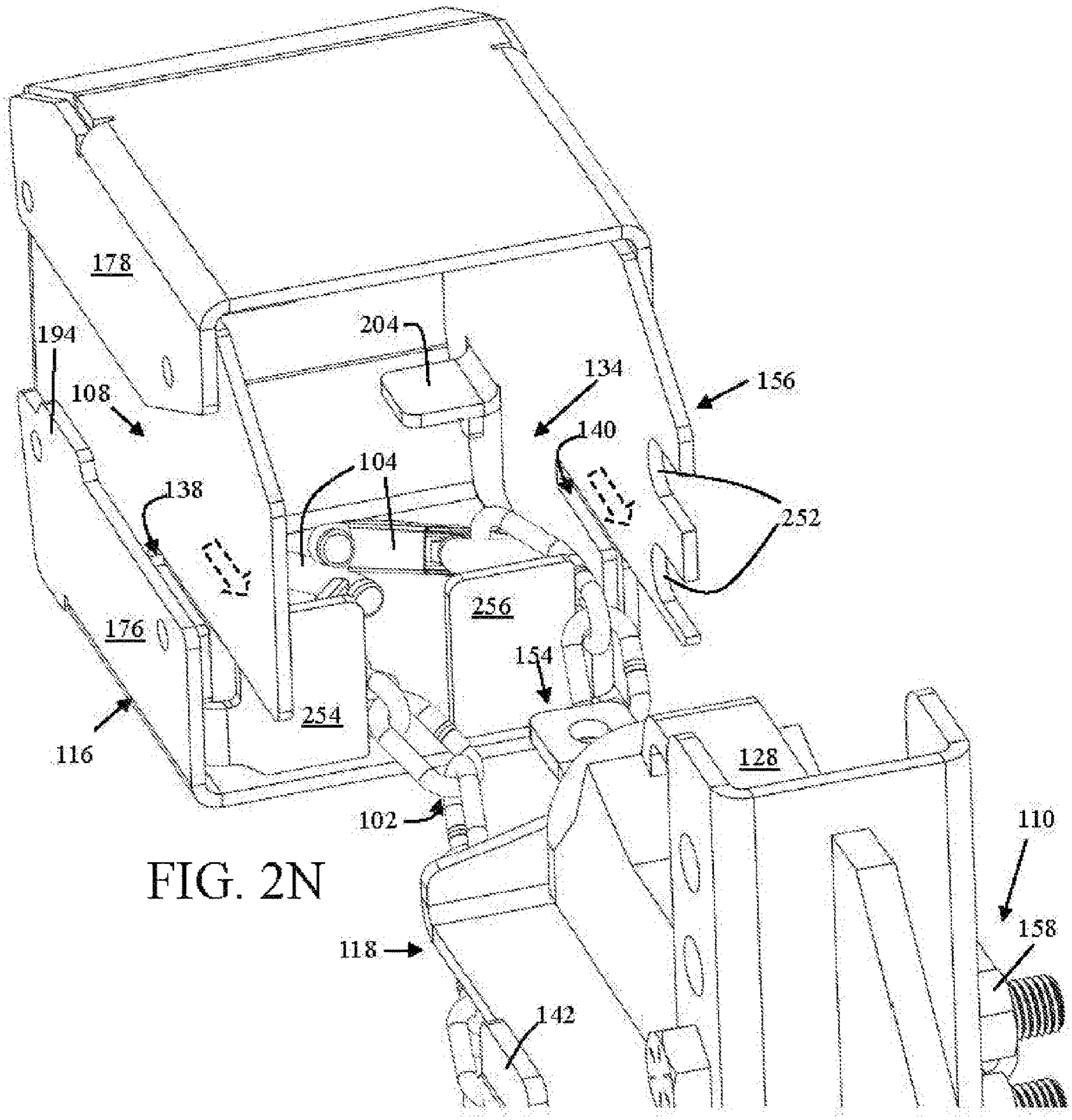
Figure 2O:
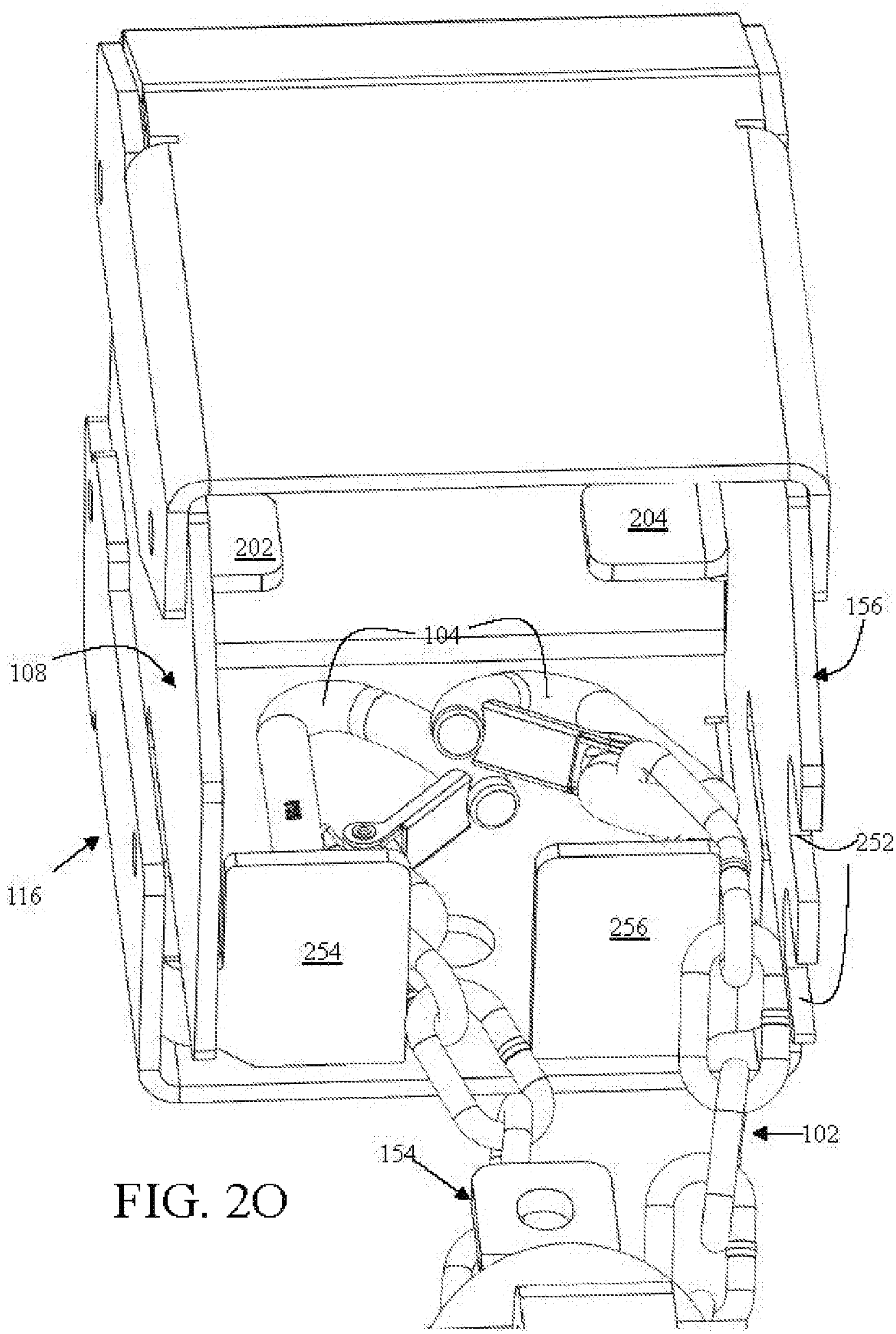
Figure 2P:
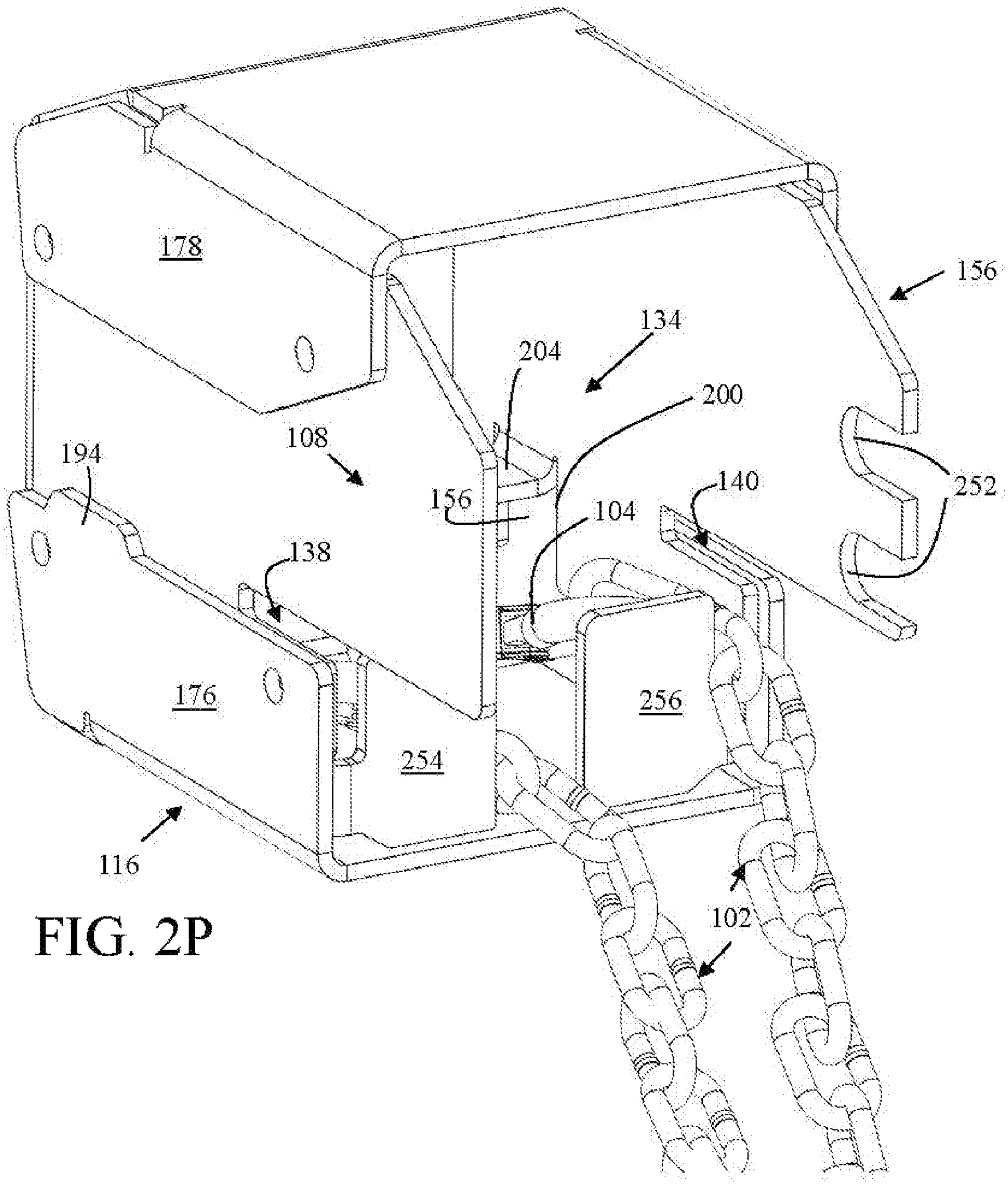
Figure 2Q:
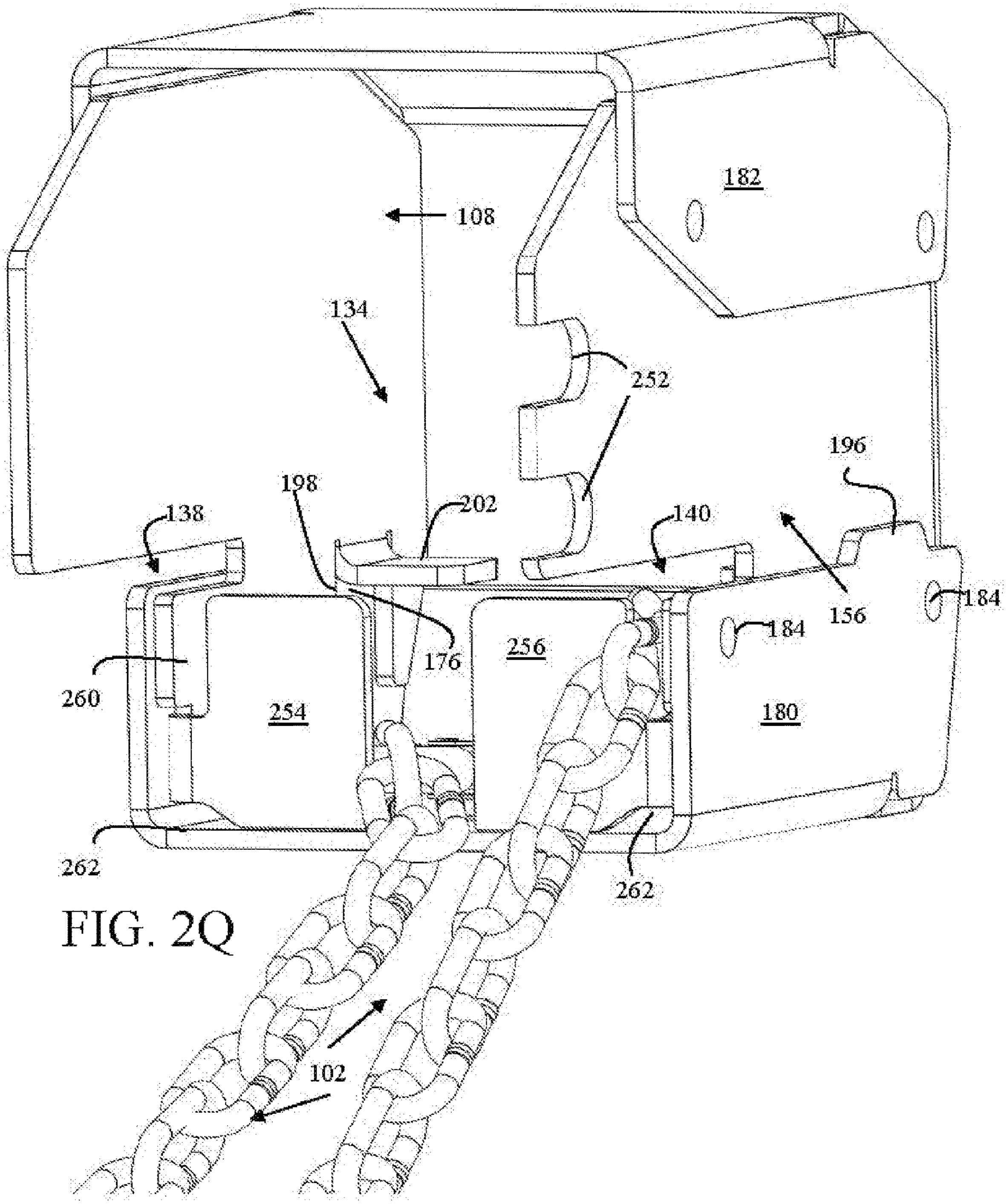
Figure 2R:
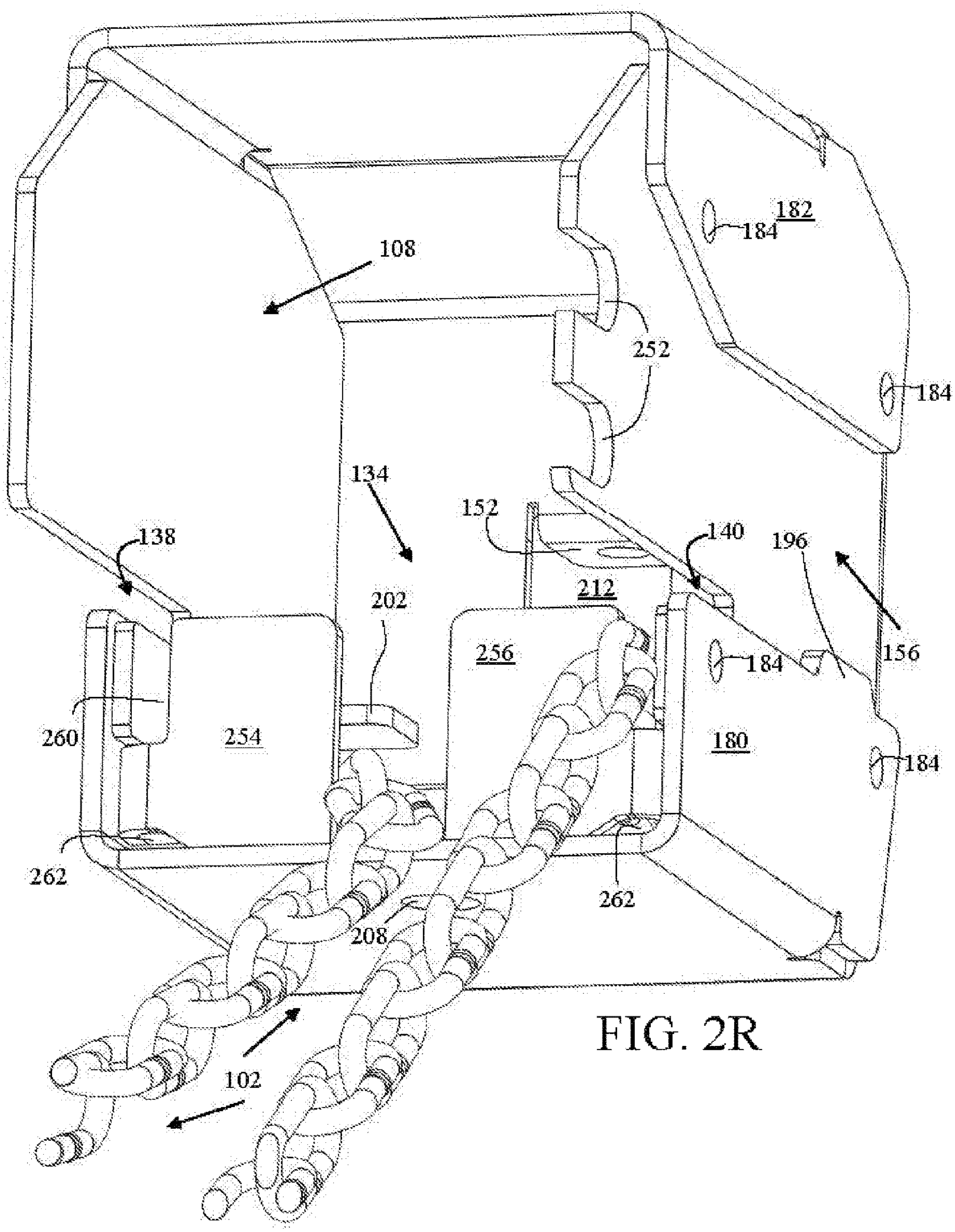
Figure 2S:
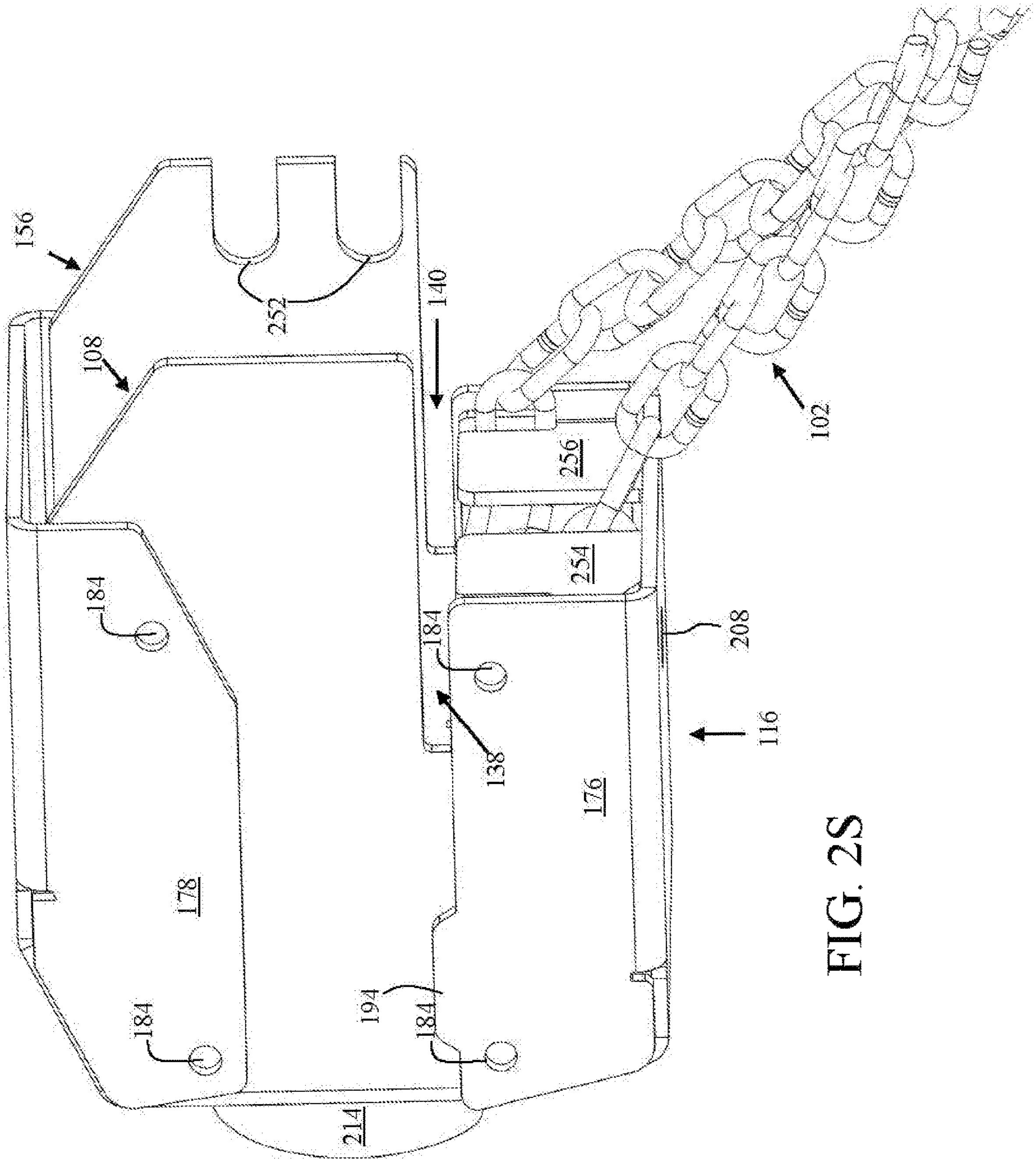
Figure 2T:
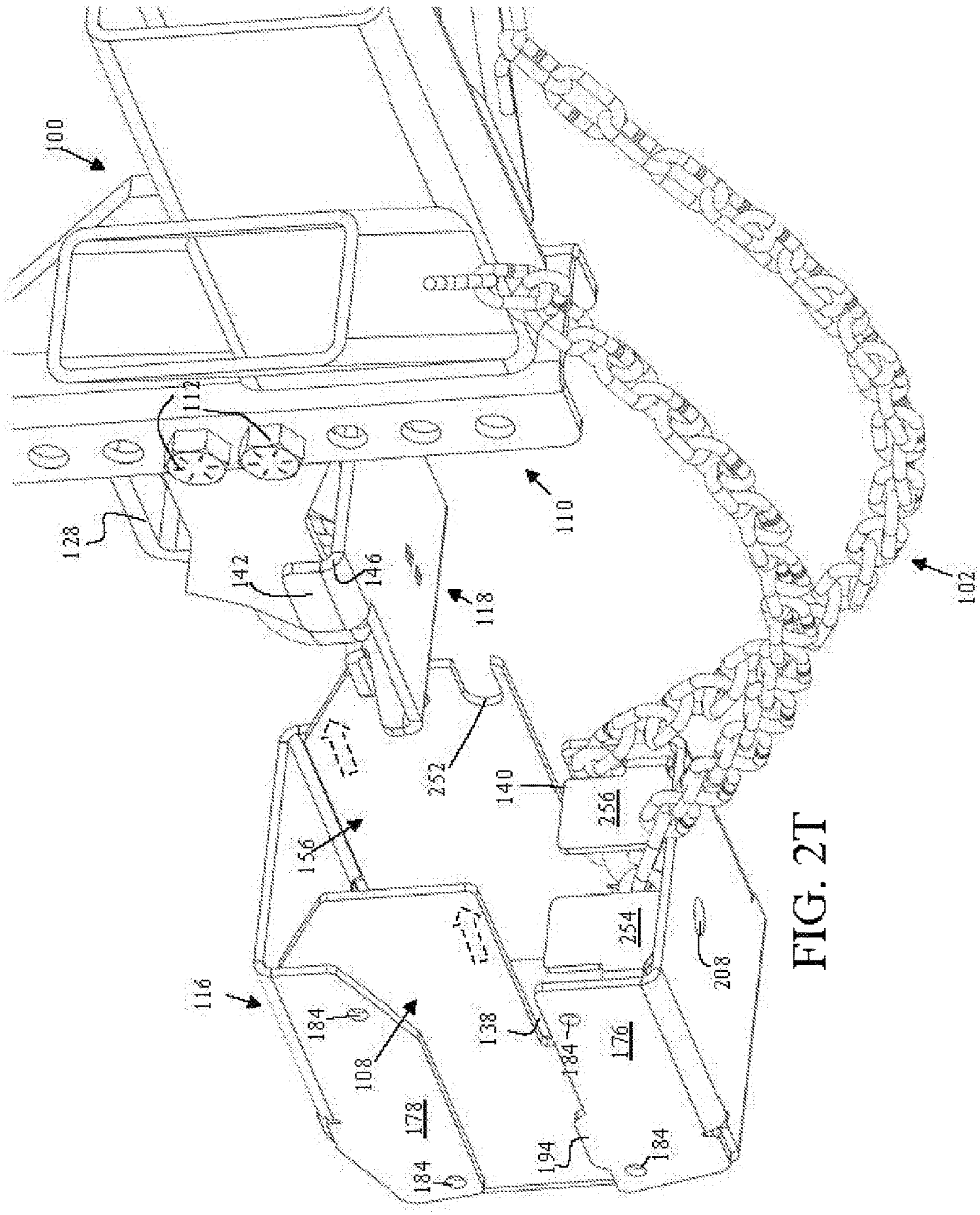
Figure 2U:
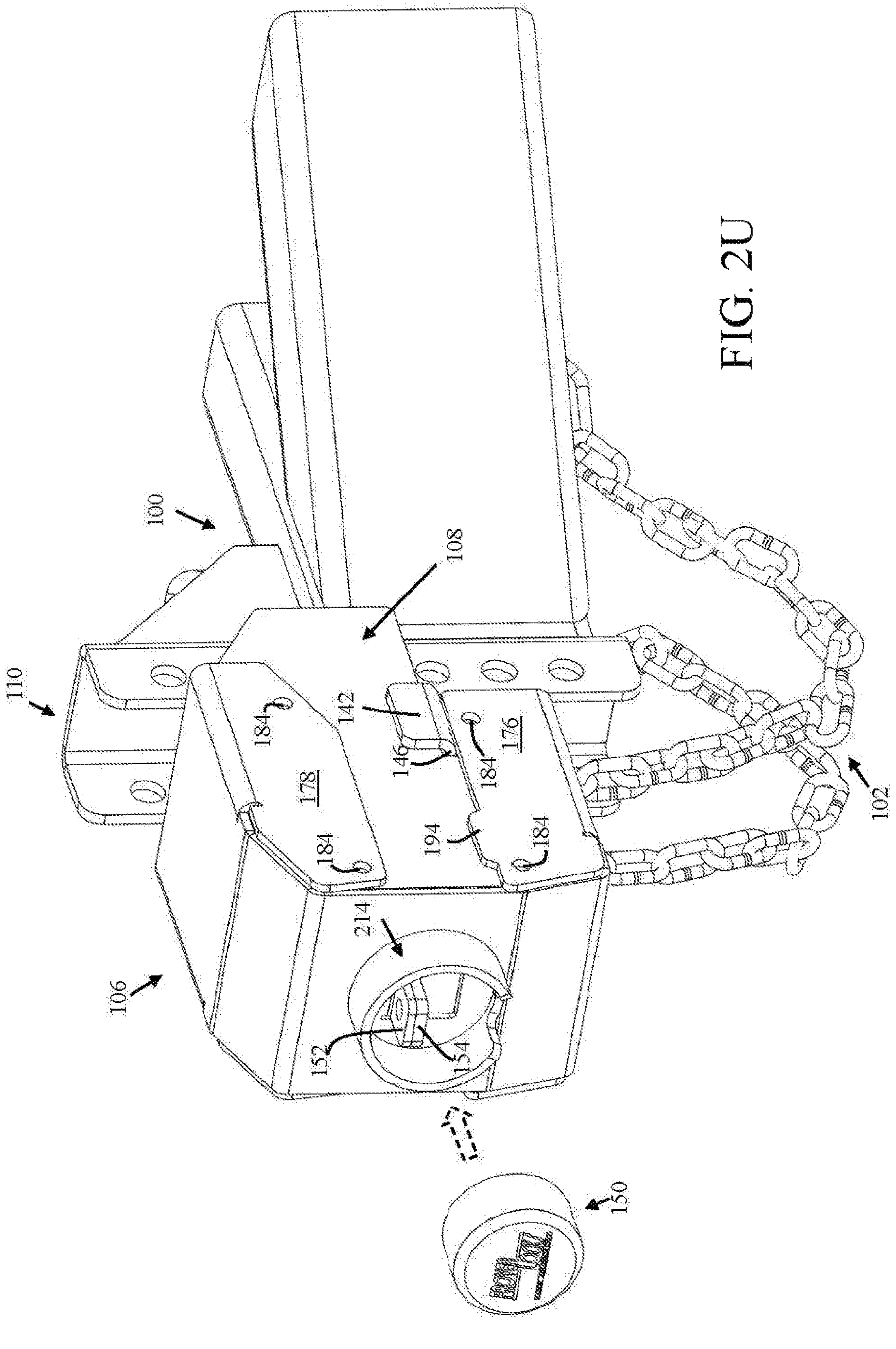

FIGS. 2A to 2U are non-limiting, exemplary illustrations of the trailer coupler lock assembly illustrated in FIG. 1A to 1G, which progressively illustrate a non-limiting, exemplary method of locking of a trailer coupler and safety chain assembly in accordance with one or more embodiments of the present invention. As illustrated in FIGS. 1A to 2U, and detailed below, securing a trailer is no longer a difficult, cumbersome task, but is very simple, extremely easy, and quick.

FIG. 2A is a non-limiting, exemplary illustration of a fully assembled trailer coupler lock assembly in accordance with one or more embodiments of the present invention. As illustrated in FIGS. 1A to 2U, to fully lock a trailer coupler 100 (including its safety chain assembly 102), interlock adapter 118 is first removed out of rigid protective case 116 of trailer coupler lock assembly 106. As detailed below and show by arrows 120, interlock adapter 118 may detachably slide in or out of rigid protective case 116 (FIGS. 2A to 2H).

As best illustrated in FIGS. 2I to 2L, interlock adapter 118 may be attached to trailer coupler 100 without having to be concerned about safety chain assembly 102. It should be noted that not having to be concerned with safety chain assembly 102 at this stage of locking process when latching interlock adapter 118 with trailer coupler 100 makes locking trailer coupler 100 very simple, easy and quick. Therefore, unlike conventional locks, users need no longer balance and hold together a very heavy interlock adapter and safety chain assembly 102 for connection to a trailer coupler 100. In particular, users need no longer engage safety chain assembly 102 with interlock adapter. Further, users need no longer "tuck-in" or "wrap" generally loose portion of chain links 122 of safety chain assembly 102 on top of interlock adapter when engaging the safety chain assembly 102 with interlock adapter. Further, unlike conventional lock mechanism, users need no longer balance and hold interlock adapter and the engaged safety chain assembly 102 together to engage both with trailer coupler 100. With the present invention, as illustrated in FIGS. 2D to 2L, at this stage of locking process, all that is required is to simply latch interlock adapter 118 of the present invention with trailer coupler 100, and nothing more.

In this non-limiting, exemplary instance, interlock adapter 118 may include an engagement member 124 that engages trailer coupler 100. That is, engagement member may be an interlocking projection that is configured to interlock with an interlocking recess 126 (cavity of well-known dome shaped structure best shown in FIG. 3A-2) of trailer coupler 100.

In this non-limiting, exemplary instance, trailer coupler 100 happens to include a latch arm 128 that when lowered as shown by arrow 130 (FIG. 2) would latch and keep interlock adapter 118 latched with trailer coupler 100. Again, this step of not having to be concerned with safety chain assembly 102 when latching interlock adapter 118 with trailer coupler 100 makes the entire process of locking trailer coupler 100 very simple, extremely easy and quick, and non-cumbersome.

Once the interlock adapter is latched onto trailer coupler (FIG. 2K to 2U), both hands are free to handle safety chain assembly 102. As illustrated in FIGS. 2L to 2U, users may easily gather together safety chain assembly 102 and simply place safety hooks 104 and chain 122 (as much of the chain as possible) as shown by arrow 132 in FIG. 2L within a dedicated compartment 134 (detailed below) of rigid protective case 116 with ease, as best shown in FIGS. 2M to 2S.

As detailed below, compartment 134 includes rear barriers 254 and 256 that prevent safety chain assembly 102 from sliding out of rigid protective case 116. This makes the next stage of locking, which is the handling of the combined rigid protective case 116 and safety chain assembly 102 therein very easy, even if only one hand is used to operate both rigid protective case 116 and the housed safety chain assembly 102 within compartment 134.

As further illustrated in FIG. 2T, once safety chain assembly is secured within compartment 134 (at least as much of chain 122 as may be possible to fit), combined rigid protective case 116 and safety chain assembly 102 may be positioned to be aligned with the already latched interlock adapter 118 (latched with trailer coupler 100), which may be accomplished with just one hand. Rigid protective case 100 includes lateral insertion slots 138 and 140 that receive lateral engagement flanges 142 and 144 of interlock adapter 118 (best shown in any one of the FIGS. 2A to 2C).

As best illustrated in FIG. 2T, once lateral insertion slots 138 and 140 of rigid protective case 116 and lateral engagement flanges 142 and 144 of interlock adapter 118 are aligned, rigid protective case 116 with safety chain assembly 102 housed within compartment 134 may then easily slide over both trailer coupler 100 and the already latched interlock adapter 118 using one hand and without having to balance or hold two or more other locking items. This way, bent 146 and 148 of lateral engagement flanges 142 and 144 may easily slide within lateral insertion slots 138 and 140 of rigid protective case 116.

As detailed above, unlike the conventional locks, users therefore, need no longer balance and hold together interlock adapter and safety chain assembly associated with trailer coupler with one hand just to allow for sliding of a heavy, bulky cover over trailer coupler, interlock adapter, and some portion of safety chain assembly (if any), with another hand.

As further illustrated in FIG. 2U, once rigid protective case 116 covers over trailer coupler 100 as shown, a conventional lock 150 may be used to lock hasp pieces 152 and 154 (detailed below) together to fully lock trailer coupler 100 and safety chain assembly 102. As illustrated in FIGS. 1A to 2U, securing a trailer (not shown) is no longer a difficult, cumbersome task, but is very simple, easy, and quick with any one of the one or more embodiments of trailer coupler lock assembly of the present invention.

Figures 1, 3A:
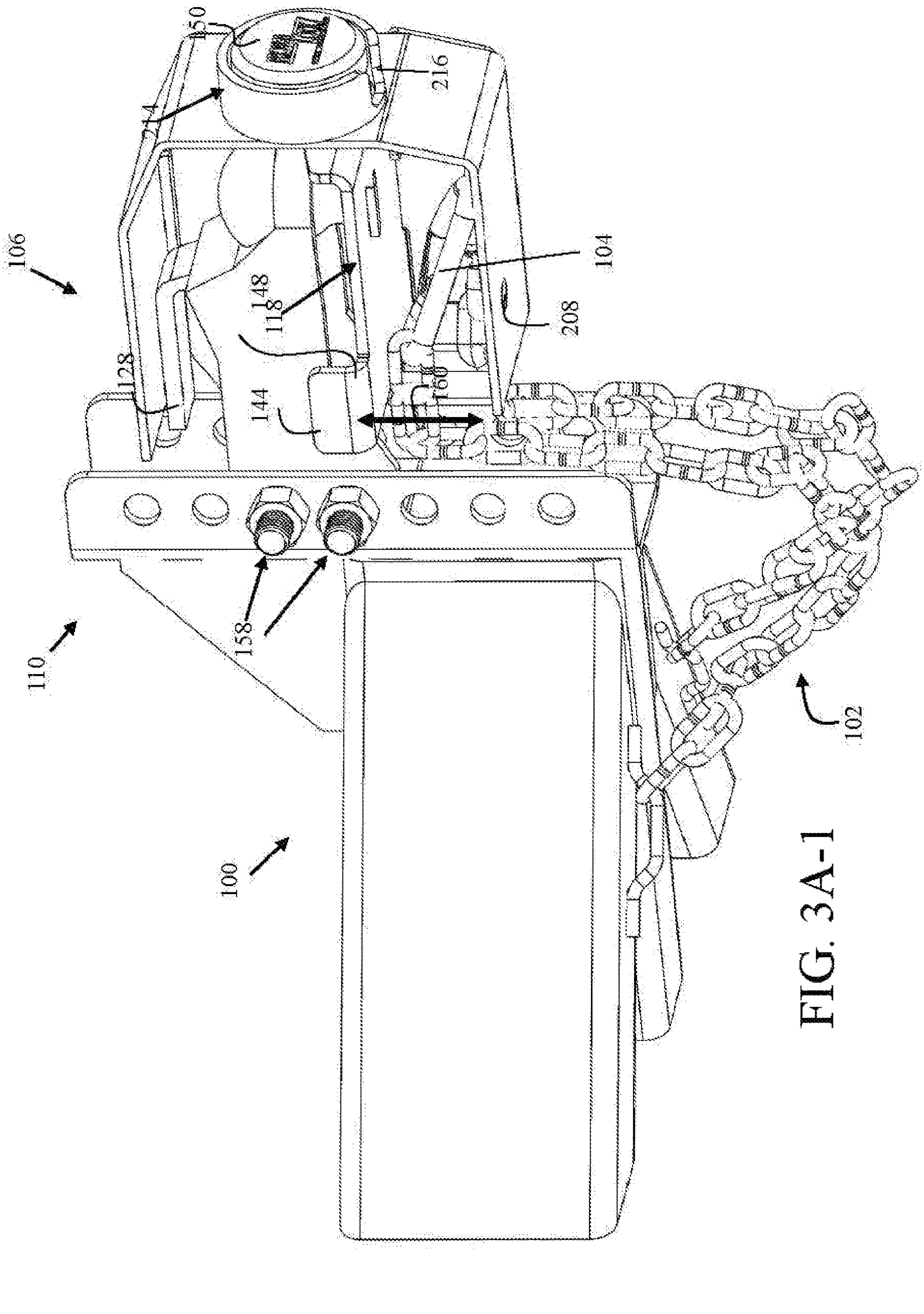
FIGS. 3A-1 to 3H are non-limiting, exemplary illustrations of a fully assembled trailer coupler lock assembly illustrated in FIGS. 1A to 2U in a fully locked position but with various sections, members, or parts removed or partially removed to expose and to clearly illustrate various locked components of a trailer coupler in accordance with one or more embodiments of the present invention.
Figures 2, 3A:
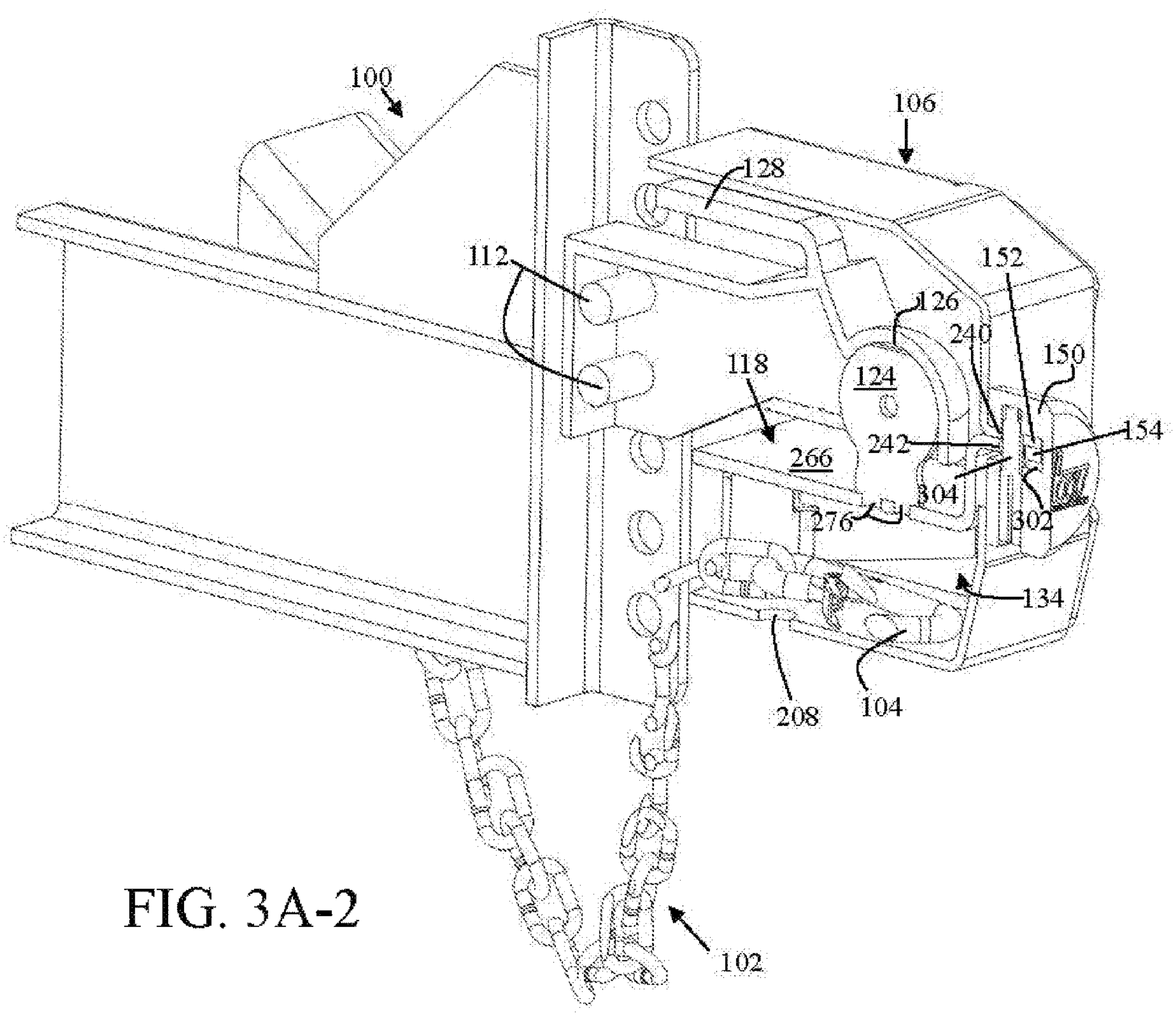
Figure 3B:
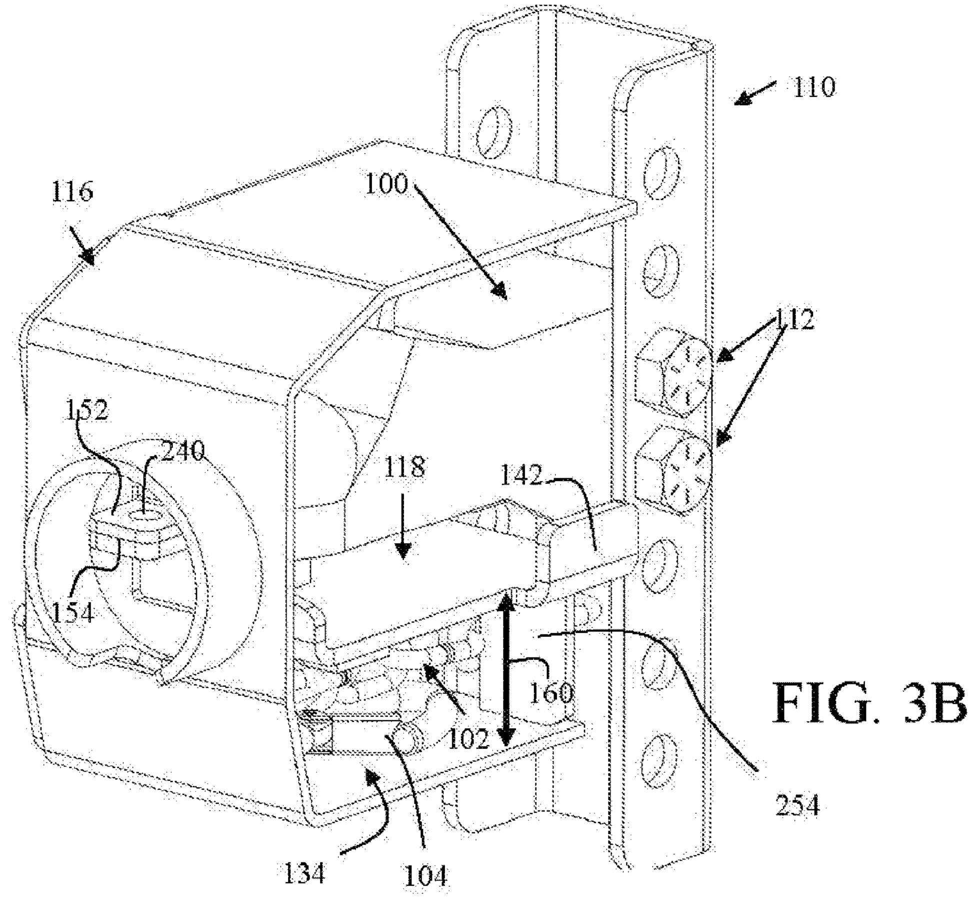
Figure 3C:
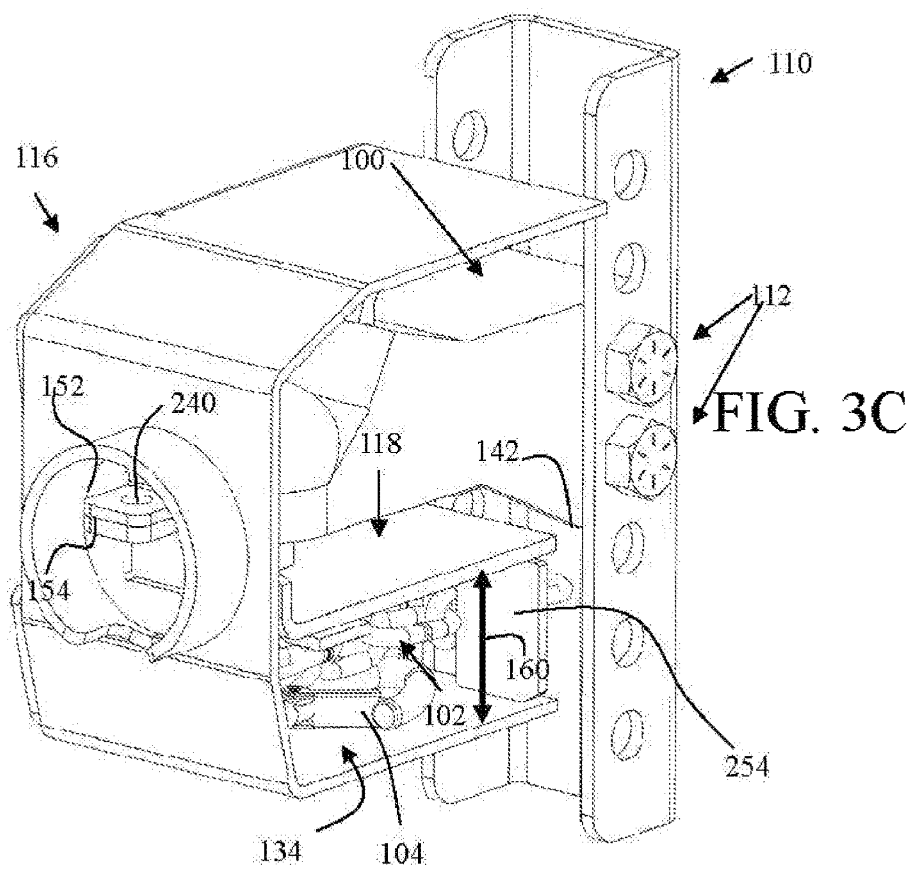
Figure 3D:
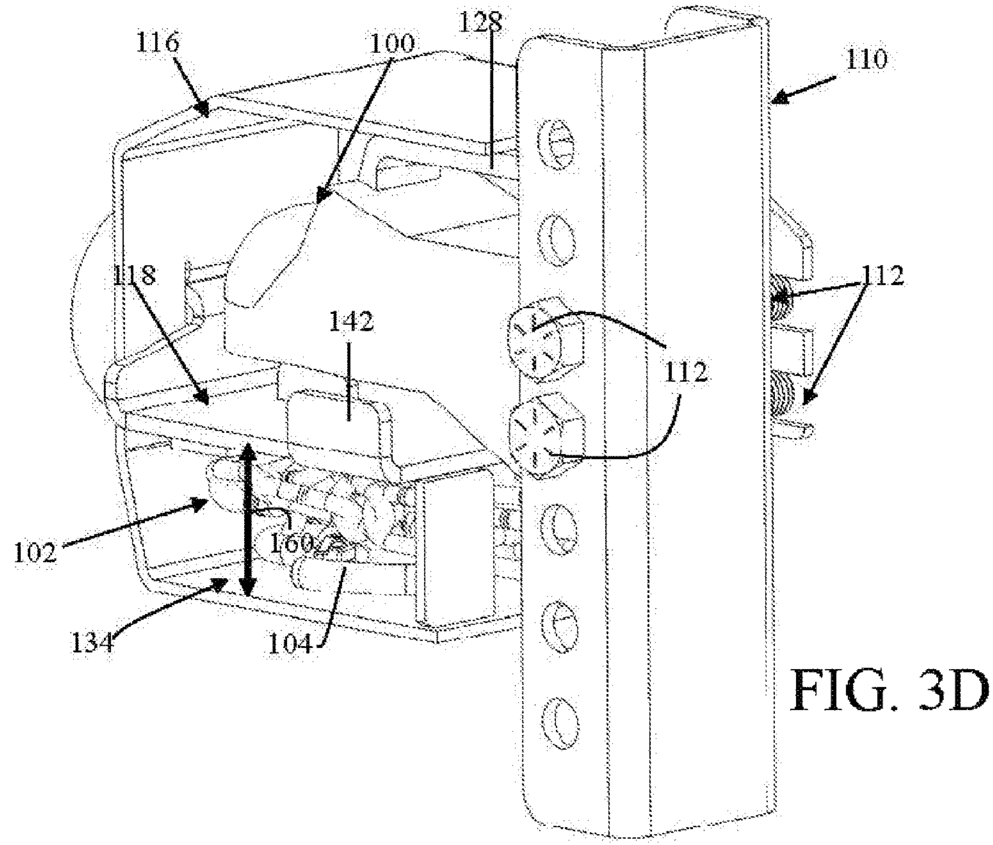
Figure 3E:
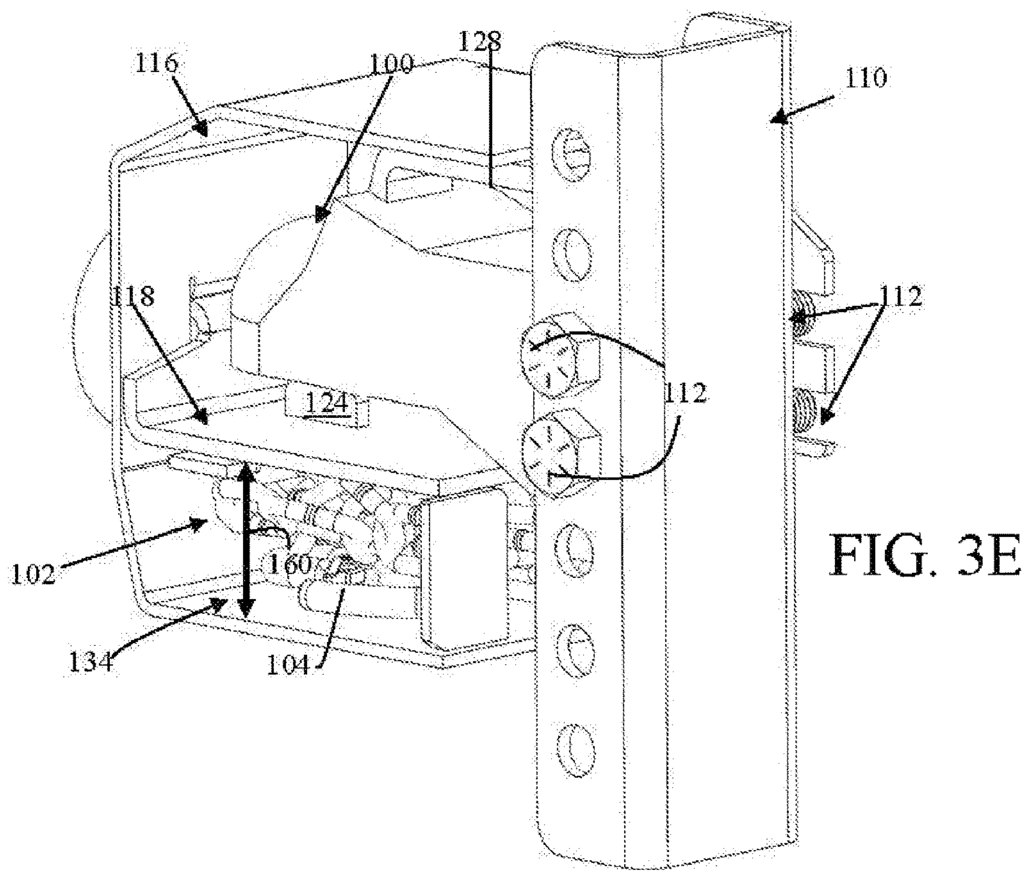
Figure 3F:
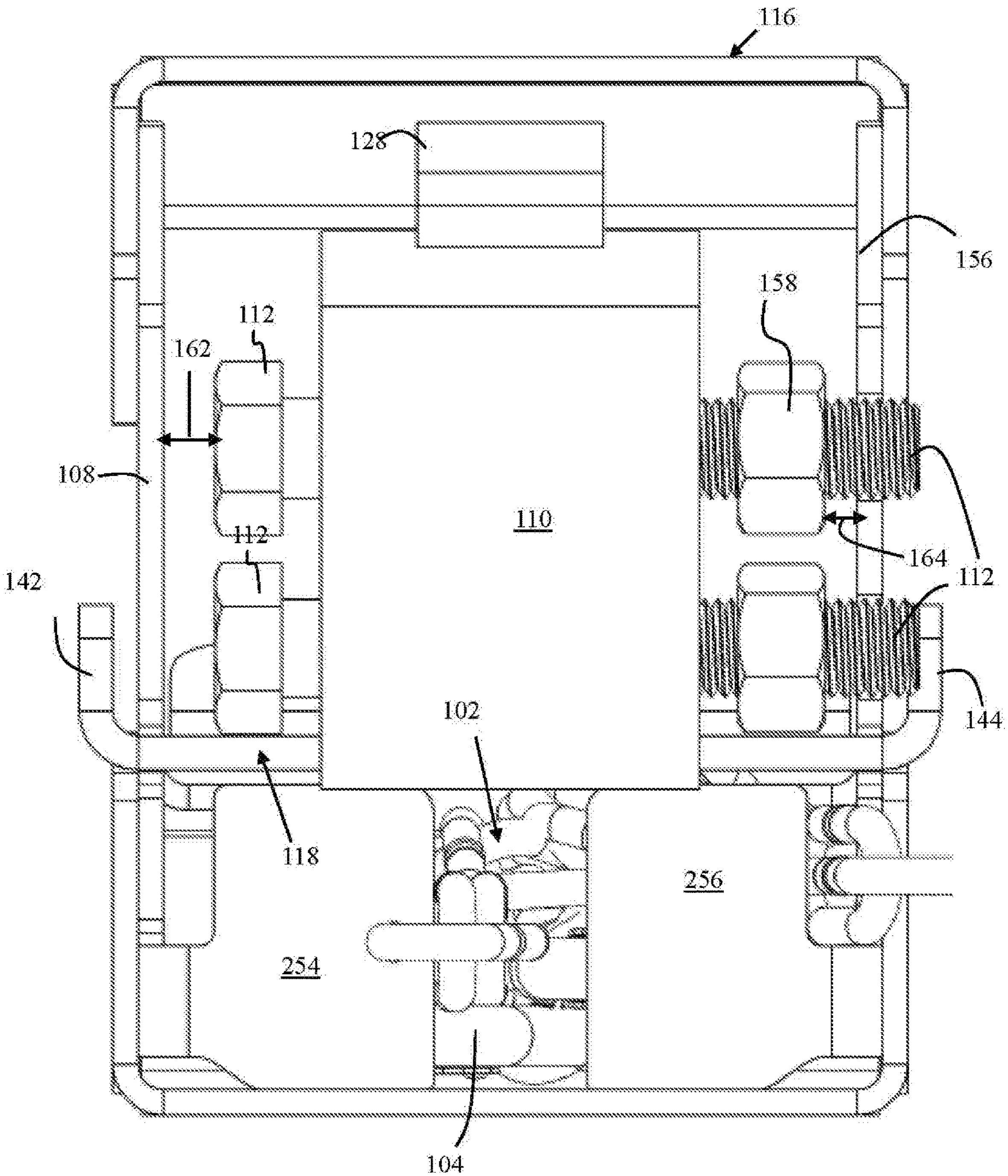
Figure 3G:
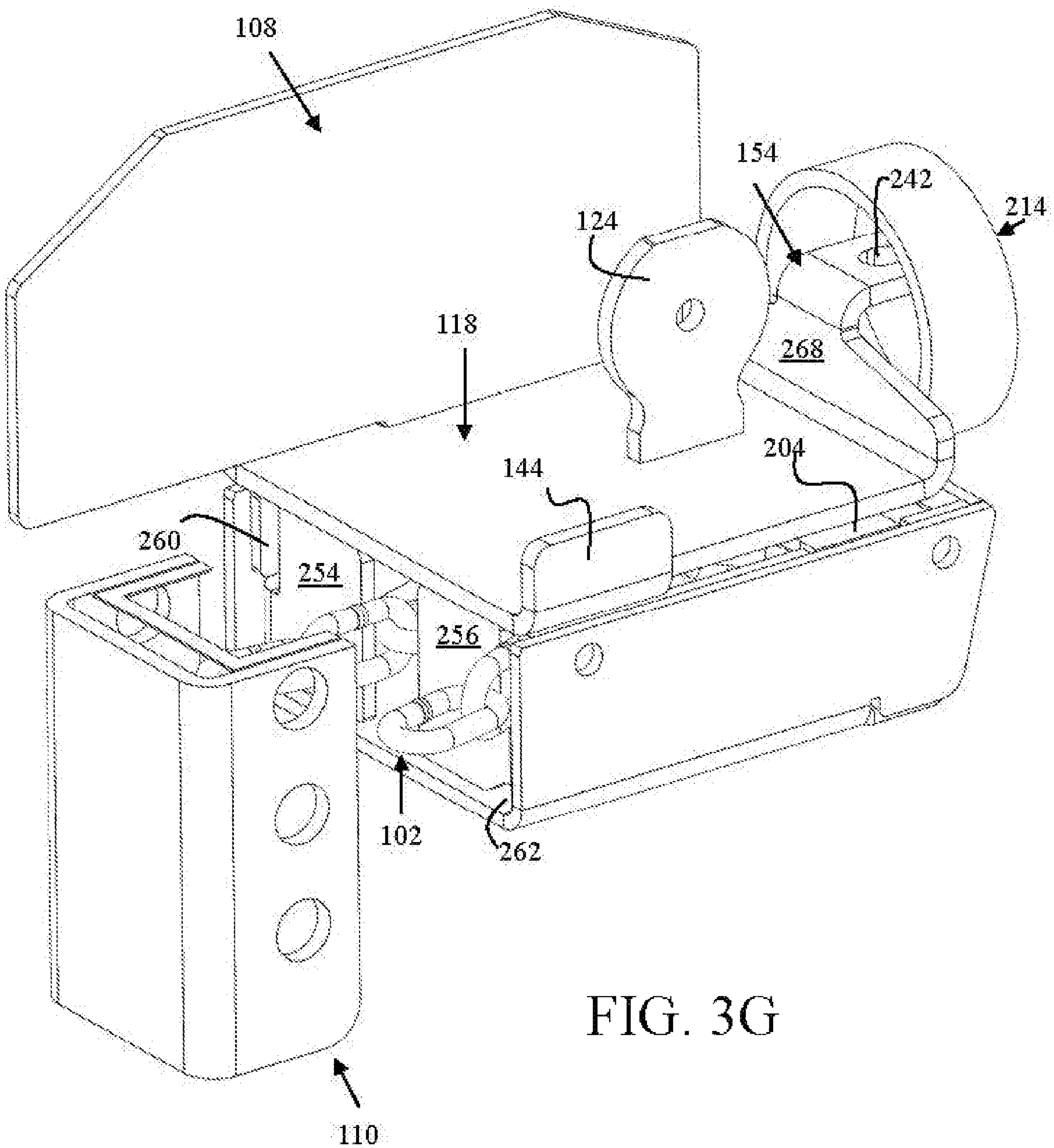
Figure 3H:
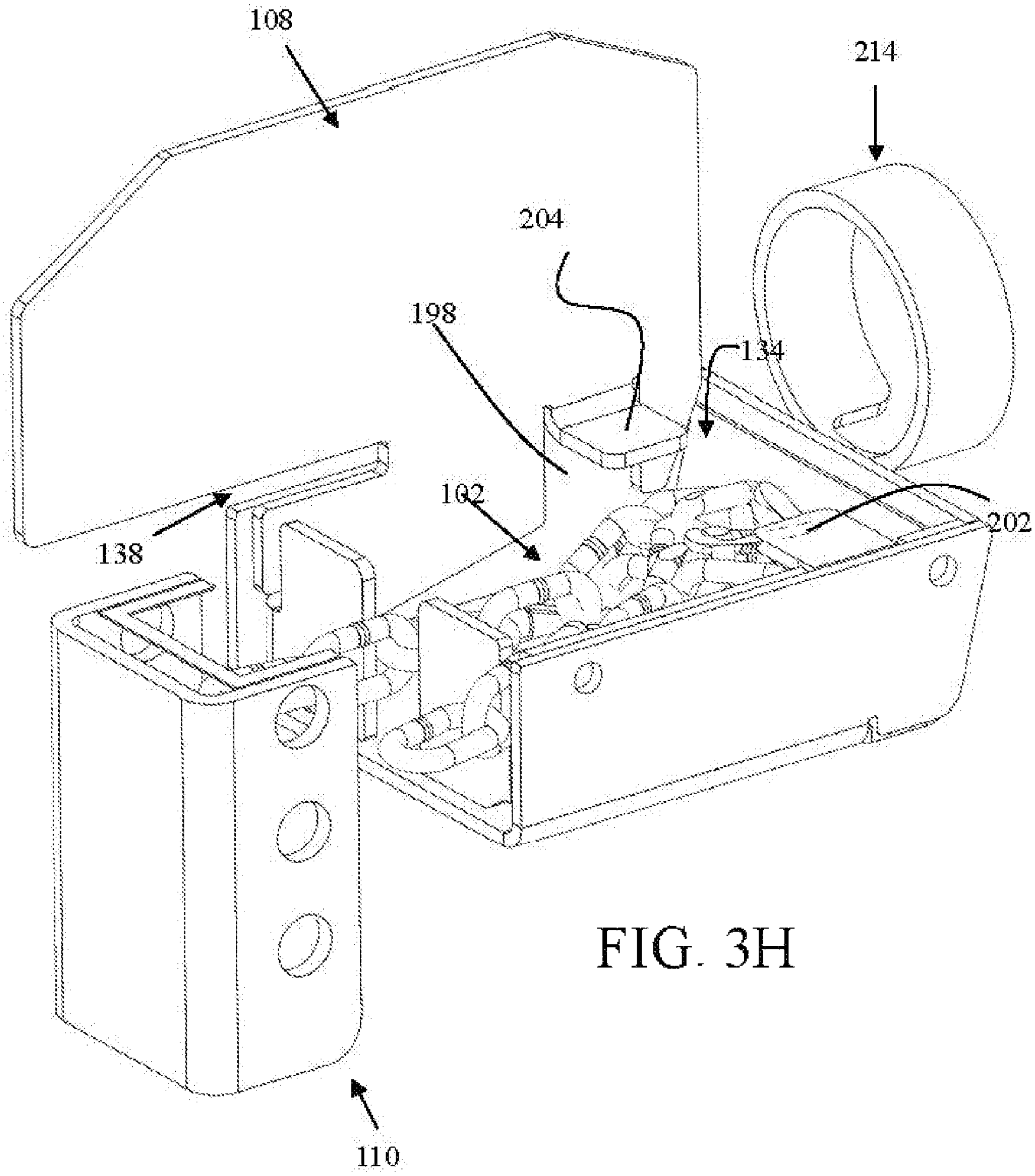

FIGS. 3A-1 to 3H are non-limiting, exemplary illustrations of a fully assembled trailer coupler lock assembly illustrated in FIGS. 1A to 2U in a fully locked position but with various sections, members, or parts removed or partially removed to expose and to clearly illustrate various locked components of a trailer coupler in accordance with one or more embodiments of the present invention.

As illustrated in FIGS. 1A to 3H, latch arm 128 of latch mechanism of trailer coupler 100, trailer coupler interlocking recess 126, safety chain assembly 102, and fasteners 112 and 158 of adjustable mechanism 110 of adjustable trailer coupler 100 are all fully secured by trailer coupler lock assembly 106.

Further, compartment 134 of trailer coupler lock assembly 106 provides ample sufficient space for securing chain links 122 of safety chain assembly 102, including safety chain hooks 104 thereof. As importantly, lateral walls 108 and 156 of rigid protective case 116 fully extent to cover over and protect fasteners 112 and 158 of adjustable trailer coupler 100.

It should be noted that since interlock adapter 118 is positioned above compartment 134 of rigid protective case 116, it functions as a cover for compartment 134 to prevent access to safety chain assembly 102 secured within compartment 134. Accordingly, the vertical position (or elevation level) 160 (FIG. 3B) of interlock adapter 118 within rigid protective case 116 in relation to compartment 134 may be optimized to provide ample sufficient space for compartment 134 below it to house and secure commercially available (i.e., conventional) size safety chain assembly 102 while functioning as a cover over compartment 134 to prevent tampering with the secured safety chain assembly 102 housed therein.

As best shown in FIG. 3F, fasteners 112 and 158 of adjustable trailer coupler 100 are also fully secured by lateral sides 108 and 156 of rigid protective case 116 of trailer coupler lock assembly 106 in that lateral sides 108 and 156 extend to fully cover over fasteners 112 and 158, preventing tampering with fasteners 112 and 158. In the non-limiting, exemplary instance illustrated, lateral sides 108 and 156 would prevent and in fact, block fasteners 112 and 158 from being unfastened due to tight spacing 162 and 164 between bolt-heads 112 and nuts 158 and lateral sides 108 and 156. Accordingly, nuts and bolts of adjustable mechanism 110 of adjustable trailer coupler 100 are positioned within rigid protective case 116 and further, are blocked and prevented from being unfastened.

Figure 4A:
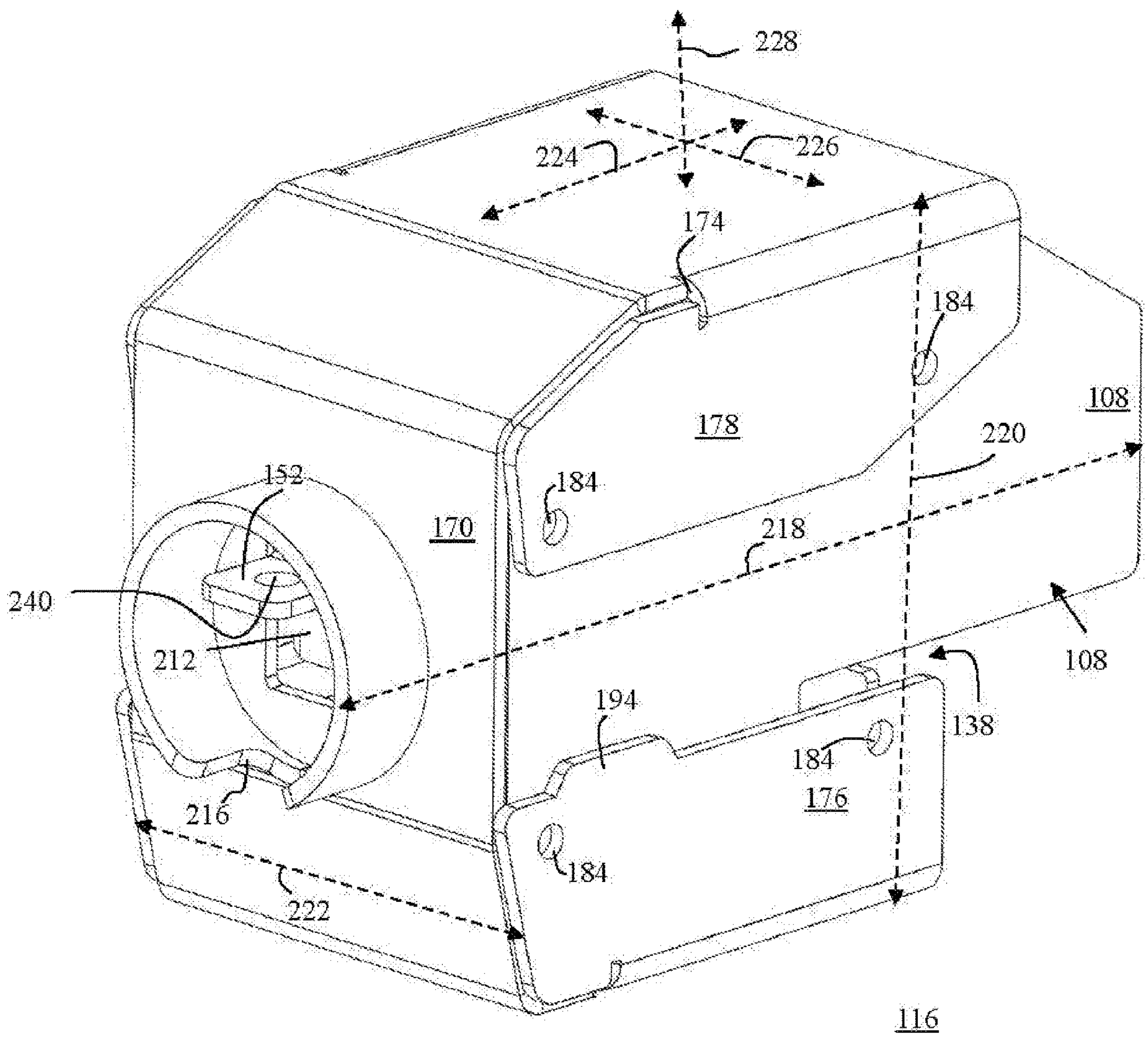
FIGS. 4A to 4F are non-limiting, exemplary illustrations of a rigid protective case of the trailer coupler lock assembly illustrated in FIGS. 1A to 3H in accordance with one or more embodiments of the present invention.
Figure 4B:
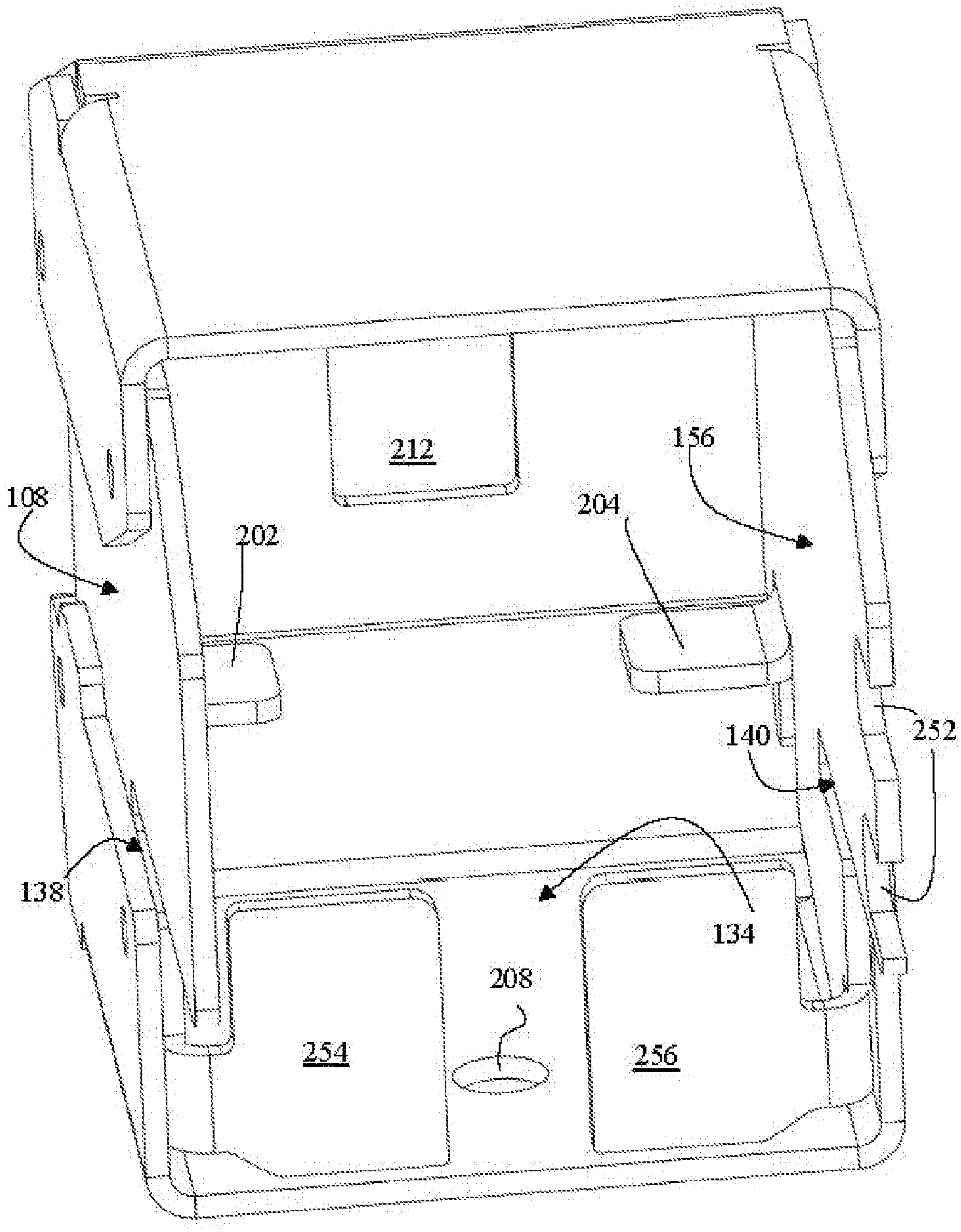
Figure 4C:
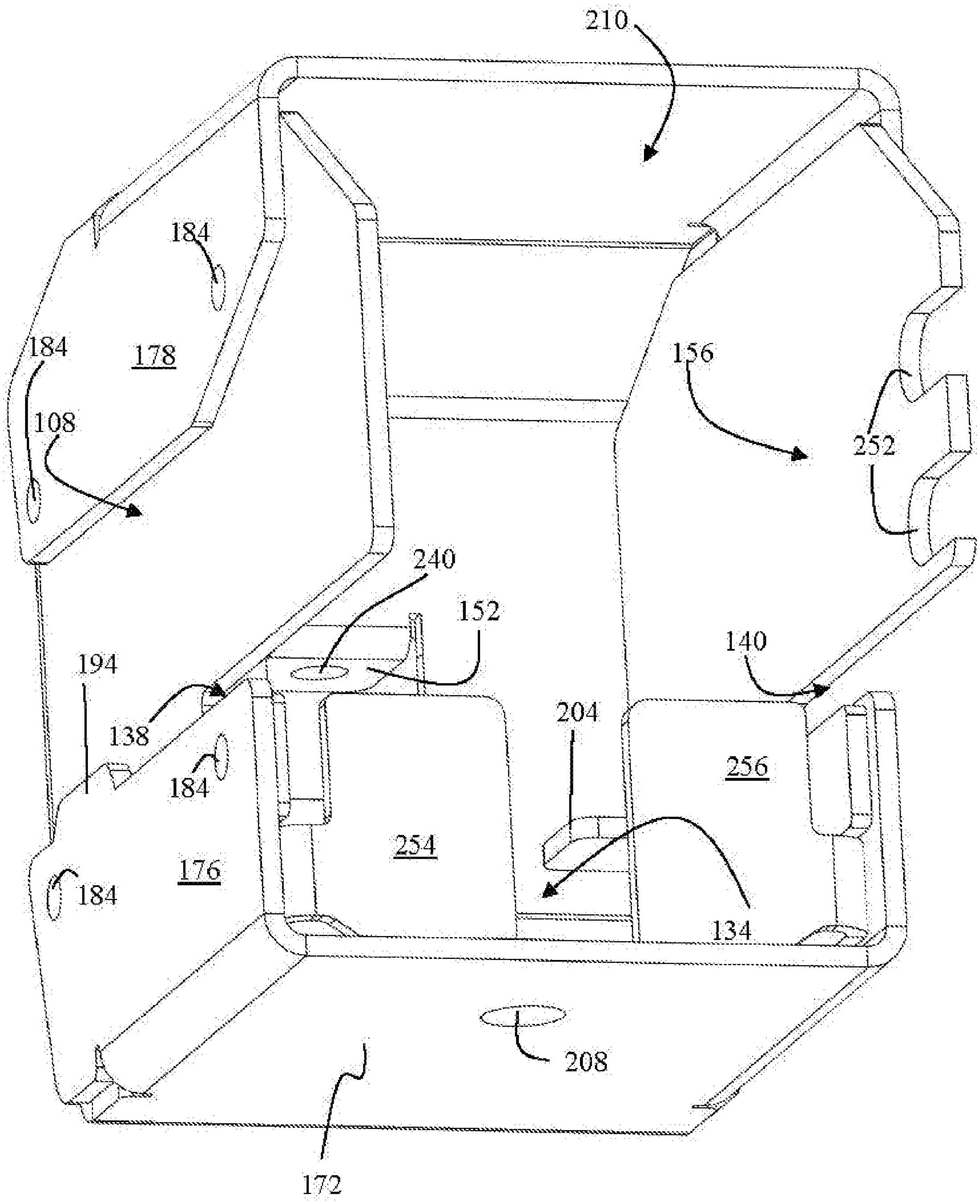
Figure 4D:
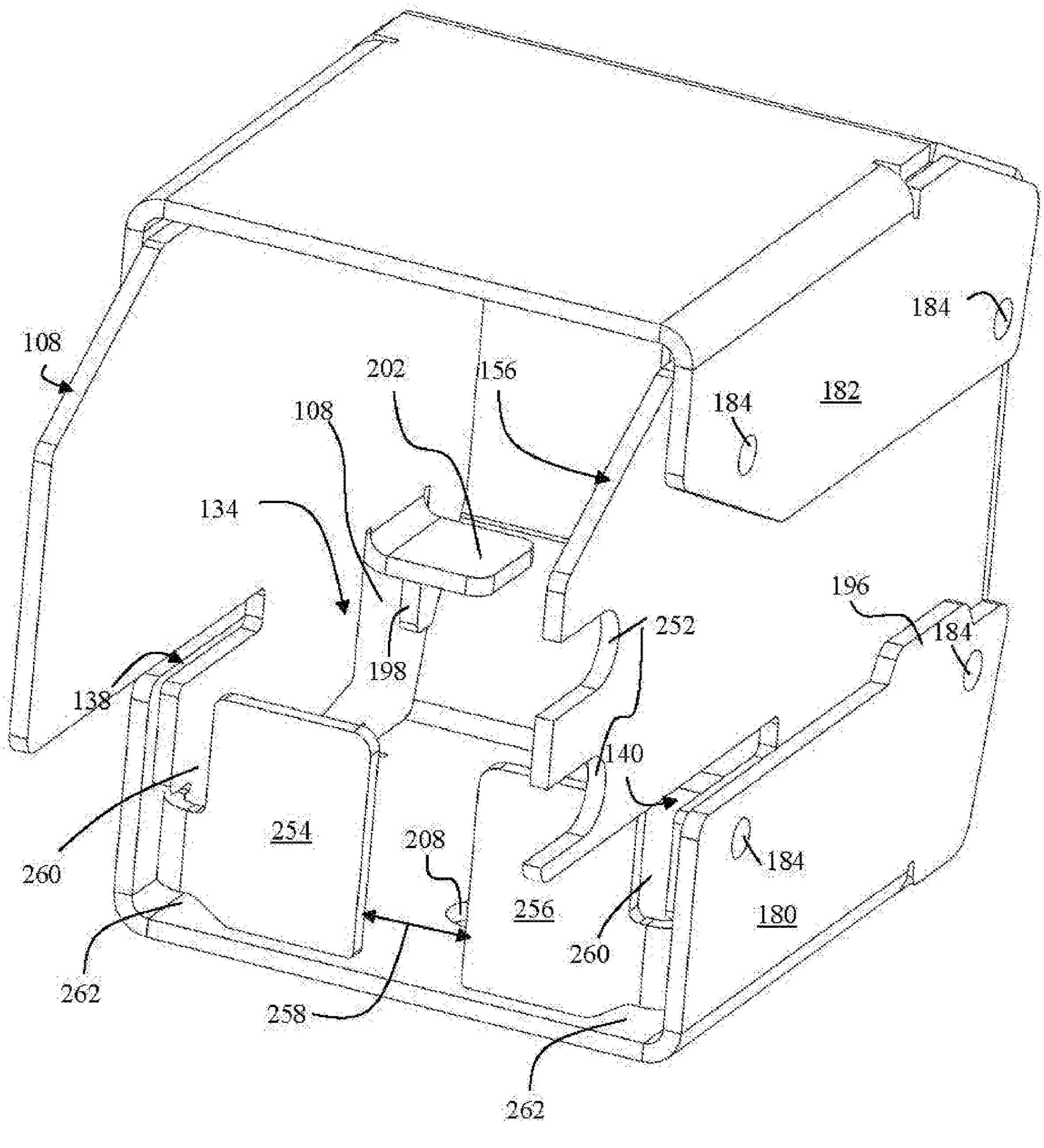
Figure 4E:
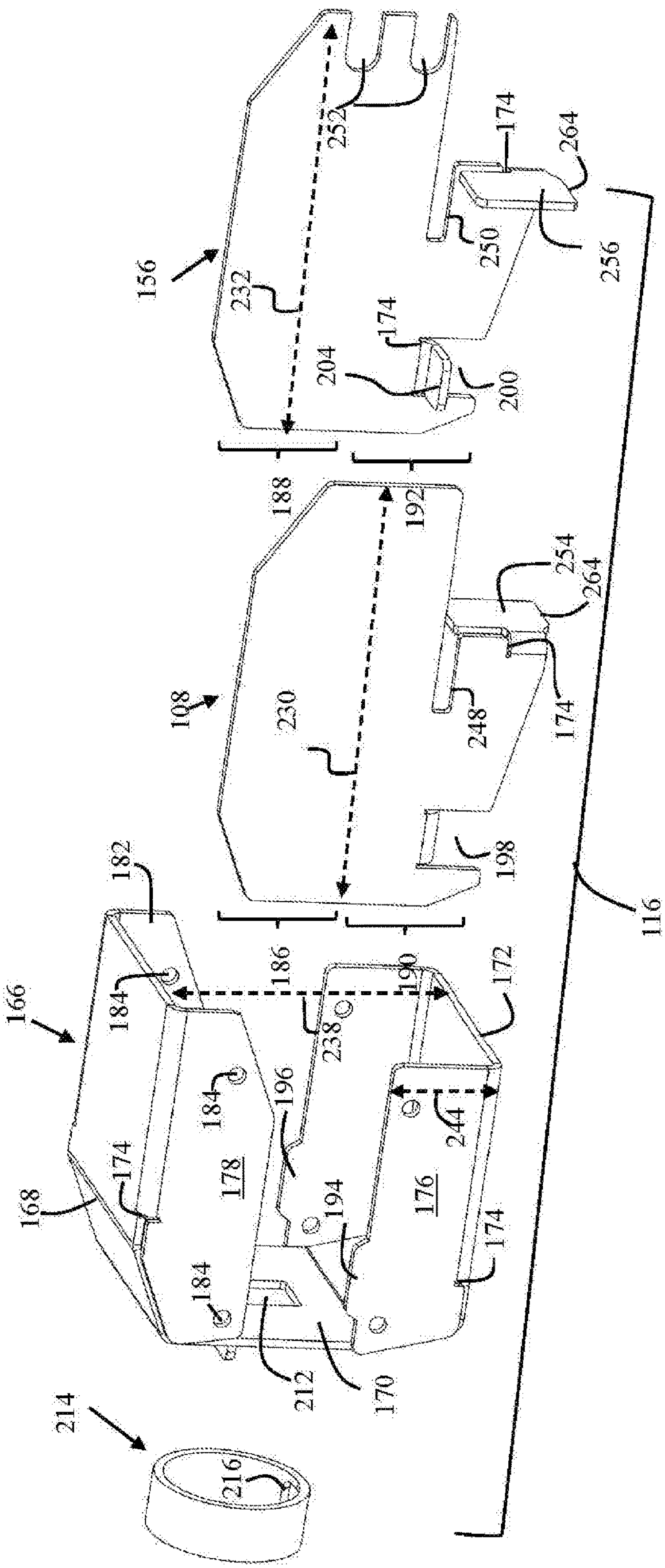
Figure 4F:
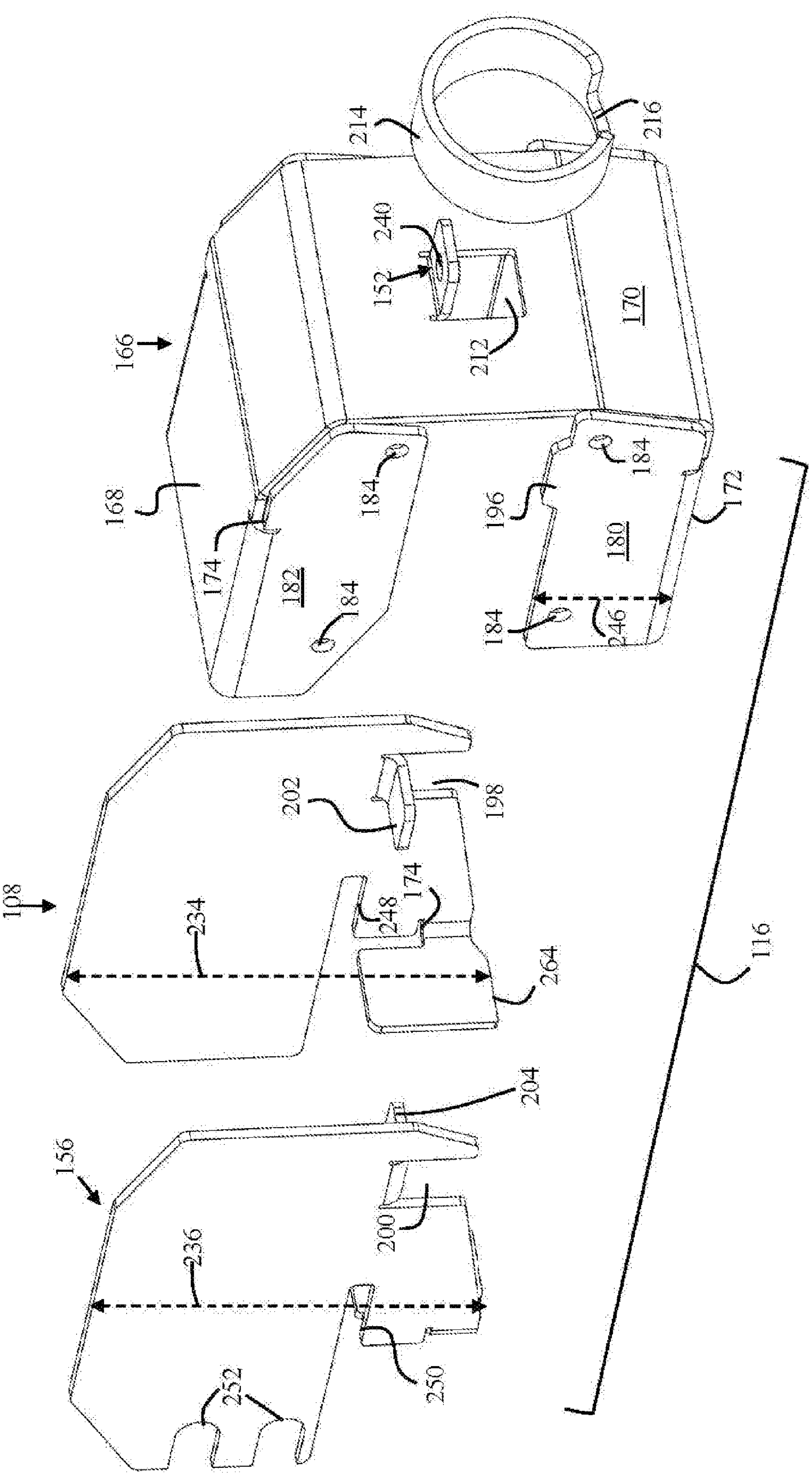

FIGS. 4A to 4F are non-limiting, exemplary illustrations of a rigid protective case of the trailer coupler lock assembly illustrated in FIGS. 1A to 3H in accordance with one or more embodiments of the present invention. FIGS. 4E and 4F are non-limiting exemplary exploded view illustration of the various members of the rigid protective case in accordance with one or more embodiments of the present invention. The exploded views shown in FIGS. 4E and 4F illustrate disassembled, separated components that show the cooperative working relationship, orientation, positioning, and exemplary manner of integration of the various members of the rigid protective case into an integral, single piece unit in accordance with one or more embodiments of the present invention, with each component detailed below.

As illustrated in FIGS. 1A to 4F, trailer coupler lock assembly 106 is comprised of a rigid protective case 116 that may comprise of a rigid metal shield with compact form-factor, with rigid protective case 116 having a compartment 134 dedicated for securing safety chain assembly 102. Trailer coupler lock assembly 106 may further include interlock adapter 118 (as further detailed below) for interlocking trailer coupler 100 within rigid protective case 116.

Rigid protective case 116 is single, integral piece, comprising a first member 166 (best shown in FIGS. 4E and 4F) that defines a top 168, a front 170, and a bottom 172 of rigid protective case 116. Rigid protective case 116 is further comprised of a second member that further defines a first lateral side 108 of rigid protective case 116, and a third member that defines a second lateral side 156 of rigid protective case 116. Further included is an optional shroud 214 (detailed below) that is connected to exterior front 170 of first member 166.

A non-limiting, exemplary method of manufacturing a rigid protective case 116 may for example, comprise of cutting a sheet of metal (steel or other sturdy metal) to one or more pieces of selected shapes as shown by any well-known methods such as for example and without limitations, stamping, punching, laser cut, use of CNC machines, etc., which may include all bend reliefs 174. Next, bending various sections of the one or more members and finally, fusing the one or more members together to form rigid protective case 116. One or more embodiments of the present invention do not preclude the fusing or joining of members through welding, brazing, soldering, etc.

Second member (first lateral side 108) is mechanically connected and fixed to first lower and upper lateral bent extensions 176 and 178 of first member 166. Third member (second lateral side 156) is mechanically connected and fixed to second lower and upper lateral bent extensions 180 and 182 of first member 166.

Second and third members (which are first and second lateral sides 108 and 156) are connected to first and second lower and upper lateral bent extensions 176, 178, 180, 182 of first member 166 at the illustrated weld spots 184 to form a single, integral piece rigid protective case 116.

First and second upper lateral bend extensions 178 and 182 of first member 166 are welded to generally upper portions 186 and 188 of first and second lateral sides 108 and 156 of rigid protective case 116. First and second lower lateral bend extensions 176 and 180 of first member are welded to generally lower portions 190 and 192 of first and second lateral sides 108 and 156 of rigid protective case 116.

As shown in FIGS. 4E and 4F, a front, upper portion of first and second lower lateral bend extensions 176 and 180 of first member 166 include extended tabs 194 and 196, that covers over seat-opening 198 and 200 of first and second lateral sides 108 and 156 of rigid protective case 116 (also shown in FIGS. 2P and 2Q). It should be noted that not covering over seat-openings 198 and 200 would most likely allow tampering with rigid protective case 116.

Seat openings 198 and 200 are formed as a result of cut-out portions from first and second lateral sides 108 and 156 that when bent at bend reliefs 174, form seats 202 and 204 upon which front bottom side 206 of interlock adapter 118 rests. Seats 202 and 204 maintains interlock adapter 118 horizontally, keeping it from "tipping down" and hence, enables easy alignment of first and second hasp pieces 152 and 154 once interlock adapter 118 is fully inserted within rigid protective case 116. In other words, this alignment enables interlock adapter hasp piece 154 to extend out from first opening 212, be positioned underneath rigid protective case hasp piece 152, with openings 240 and 242 of both hasp pieces 152 and 154 aligned and ready to easily receive a shackle of lock 150 (also shown in FIG. 3A-2).

Bottom 172 of first member 166, which is the bottom of rigid protective case 116 includes opening 208 (a through-opening-best shown in FIG. 4B) for drainage. In case of snow, rain, or washing, water will drain from this drainage opening 208, thus preventing secured chain from rusting.

Rigid protective case 116 includes a first opening (rear opening) 210 for receiving trailer coupler 100 as illustrated throughout FIGS. 1A to 3H. First opening 210 has sufficient small size to prevent tampering with trailer coupler lock assembly 106 (for example, insertion of a crow bar to break the lock assembly), while allowing for securing trailer coupler 100 and safety chain assembly 102.

Rigid protective case 116 includes a second opening (front opening)212 for receiving the hasp 154 of interlock adapter 118. Second opening 212 is formed as a result of a cut-out of front 170 of first member 166, which is bent outward, perpendicular to the plane of front 170, with the cut-out formed into the hasp 152 of rigid protective case 116. As detailed in FIGS. 1A to 3H, hasp 154 of interlock adapter 118 and hasp 152 of rigid protective case 116 form the hasp assembly that are locked by a lock mechanism.

Second opening 212 of rigid protective case 116 (and hence also hasp assembly) is surrounded by a protective shroud 214 that shields lock mechanism 150 against tampering. A section 216 of the protective shroud 214 has a lower height, which forms a relief to inset and remove a cylindrical core of the lock mechanism.

As best illustrated in FIG. 4A, rigid protective case 116 has a length 218 that parallels a longitudinal axis 224 of rigid protective case 116, a height 220 that parallels a vertical axis 228 of rigid protective case 116, and a width 222 that parallels a traverse axis 226 of rigid protective case 116, forming a volume with sufficient space to receive trailer coupler 100. First and second lateral sides 108 and 156 have lengths 230 and 232 (FIGS. 4E and 4F) extending parallel longitudinal axis 224 of rigid protective case 116, determining the depth dimension of volume of space of rigid protective case 116. First and second lateral sides 108 and 156 have varying heights 234 and 236 that are substantially commensurately configured with varying interior height 238 of rigid protective case 116.

In particular, rigid protective case 116 is compactly sized (or dimensioned) in terms of its overall height 220 to accommodate an appropriately sized diameter protective shroud 214 to fully protect a selected lock mechanism. Further, rigid protective case 116 is sized (or dimensioned) in terms of its height 220 commensurate with the type and model of the trailer coupler 100 (and its latch arm 128, if any) for which trailer coupler lock assembly 106 was manufactured. This way, rigid protective case 116 would fit around an existing trailer coupler 100 for which it was manufactured. The coupler latch (or latch arm 128) adds to the overall height of trailer coupler 100, which must be accounted for when manufacturing the interior space of rigid protective case 116. This way, latch handle or arm 128 cannot be moved to an unlatch position (FIGS. 2I and 2J) and hence, trailer coupler 100 cannot be removed since there is no space to lift trailer coupler 100 and disengage it from interlock projection 124.

Rigid protective case 116 further includes insertion slots 138 and 140 for insertion of mounting flanges 142 and 144 of interlock adapter 118. Mounting flanges 142 and 144 within insertion slots 138 and 140 prevent unnecessary movements of interlock adapter 118.

As illustrated, first and second lower lateral bent extensions 176 and 180 have a height 244 and 246 (FIGS. 4E and 4F) at rear that is generally flush with lower edge 248 and 250 of the formed first and second lateral insertion slots 138 and 140 of first and second lateral sides 108 and 156 of rigid protective case 116, defining first and second lateral insertion slots 138 and 140 of rigid protective case 116.

Rear section of second lateral side 156 of rigid protective case 116 further includes a notch 252 through which a fastener of an adjustable mechanism of the adjustable trailer coupler extend. In this non-limiting, exemplary instance, two notches are provided for two fasteners.

As illustrated, compartment 134 is fixed within and is an integral part of rigid protective case 116. Compartment 134 is comprised of lateral sides 108 and 156 of the rigid protective case 116, front 170 of rigid protective case 116, bottom 172 of rigid protective case 116, and rear barriers 254 and 256.

Compartment 134 is positioned within a lower interior portion of rigid protective case 116. Rear barriers 254 and 256 of compartment 134 are comprised of lower extensions of first and second lateral sides 108 and 156 of rigid protective case 100 configured as adjacent tabs (chain retainers) 254 and 256. That is, lower portions of first and second lateral sides 108 and 156 of rigid protective case 116 comprise of flanges that are bent at bend reliefs 174 to form rear barriers 254 and 256 of compartment 134. In other words, lengths 230 and 232 of first and second lateral sides 108 and 156 extend beyond a length of member 166 of rigid protective case 116, with lower portions bent and formed into flanges or tabs 254 and 256, defining rear barriers 254 and 256 of compartment 134.

Lower portion 190 and 192 of first and second lateral sides 108 and 156 have a shorter length than a maximum overall length 230 and 232 thereof. This enables rigid protective case 116 to be mounted onto trailer couplers with "Y" configuration where the shorter portions 190 and 192 of lateral side 108 and 156 of rigid protective case 116 would not touch the progressively wider sections (or progressively divergent lateral parts) of trailer coupler 100 and hence, be prevented from being mounted. Accordingly, the shorter portions 190 and 192 accommodate the divergent lateral sides of the particular type, make, and model of the trailer coupler 100 illustrated.

Rear lower portion of first and second lateral sides of rigid protective case 116 are formed into first and second chain retainers 254 and 256, which combined form the rear barriers 254 and 256 of compartment 134 of rigid protective case 116. Rear barriers 254 and 256 are not continuous, but includes a first gap 258 (FIG. 4D) between first and second chain retainers 254 and 256. First gap 258 facilitates management of loose chain hanging between the compartment 134 and trailer coupler 100 (e.g., FIG. 2T).

Rear lower portion of first and second lateral sides 108 and 156 of rigid protective case 116 include upper and lower cut-outs 260 and 262 that facilitate in forming first and second chain retainers 254 and 256 at respective bends 174 that extend from rear lower portion of first and second lateral sides 108 and 156. Upper lateral cut-outs 260 form lateral gaps that facilitate management of loose chain hanging between compartment 134 and trailer coupler 100 (e.g., FIG. 2T). Lateral gaps 260 are smaller cross-span than first gap 258 to accommodate different sized chains. Bottom edge 264 of first and second chain retainers 254 and 256 are mechanically, physically fixed onto interior bottom surface of bottom 172 of rigid protective case 116. They are welded to an interior of bottom 170 of rigid protective case 116.

Figure 5A:
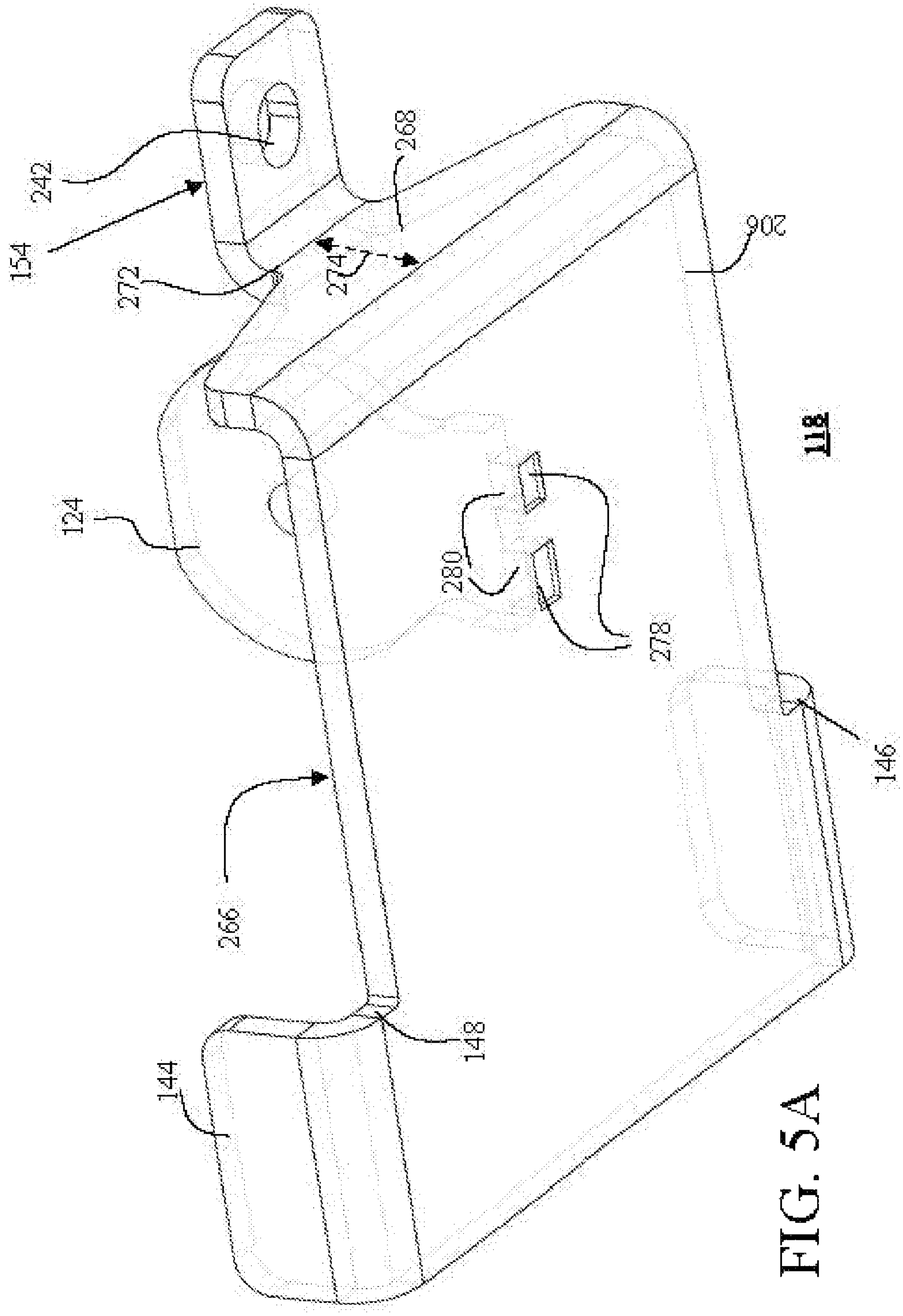
FIGS. 5A to 5C are non-limiting, exemplary illustrations of an interlock adapter of the trailer coupler lock assembly illustrated in FIGS. 1A to 4F in accordance with one or more embodiments of the present invention.
Figure 5B:
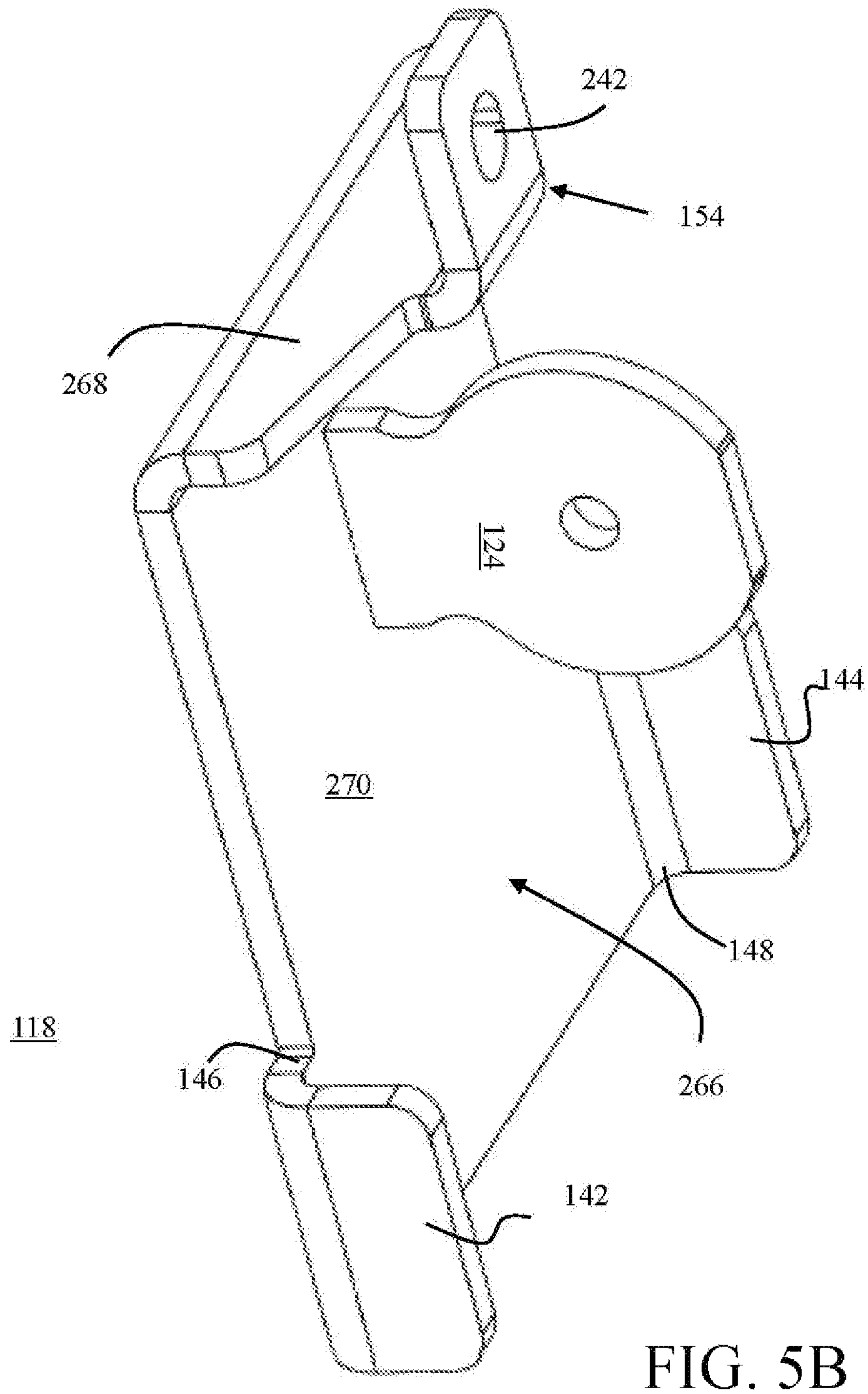
Figure 5C:
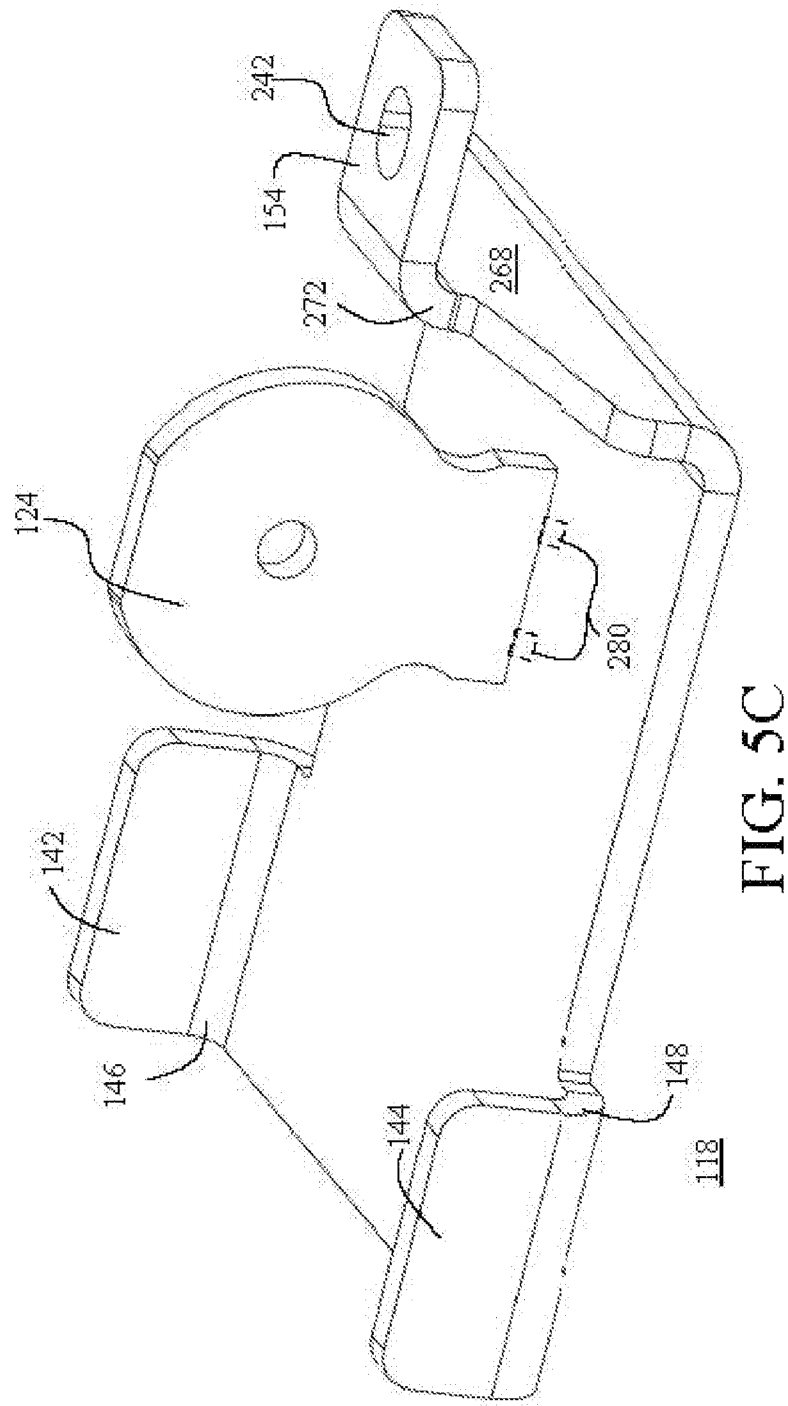
Figure 6A:
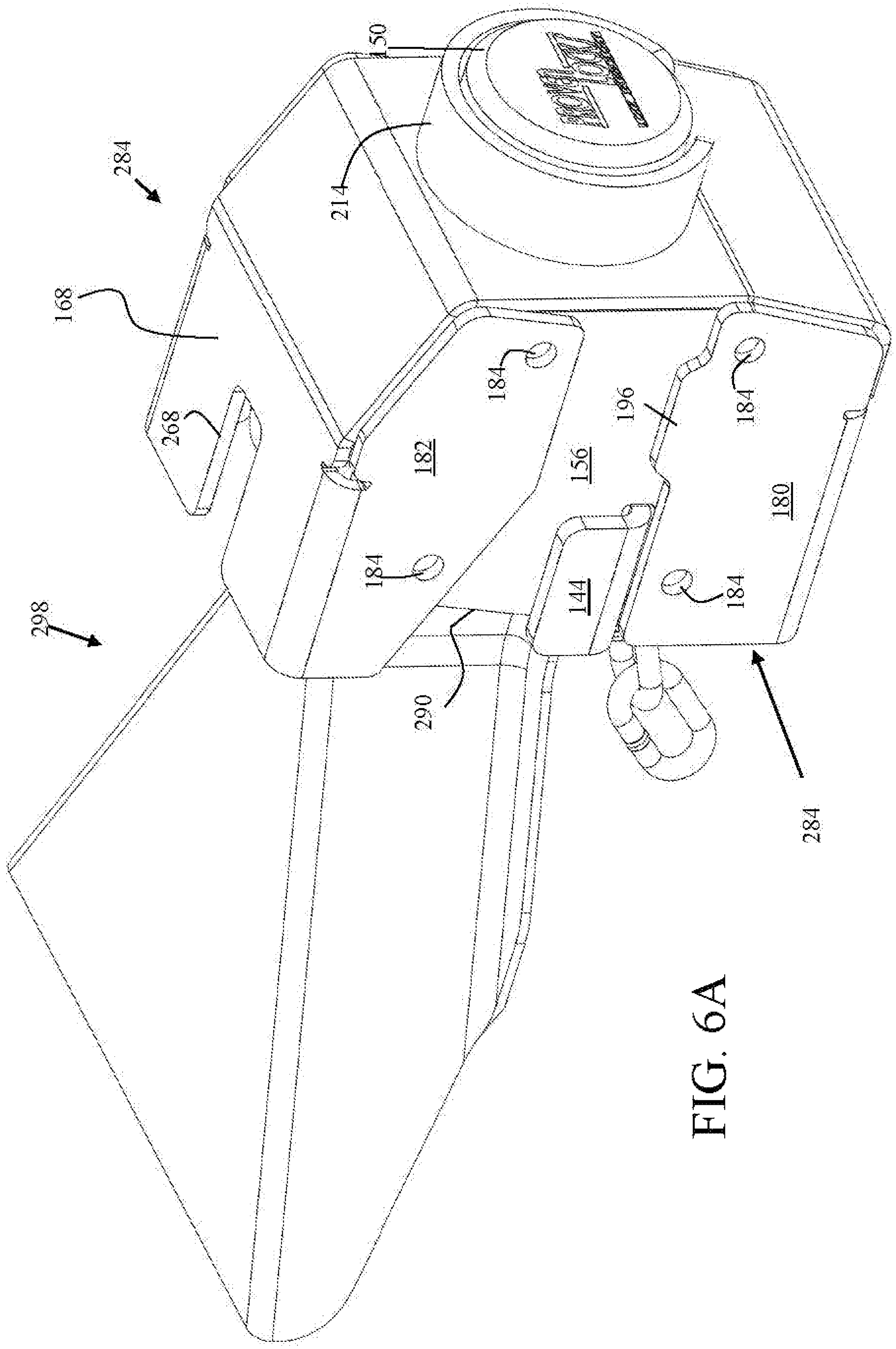
FIGS. 6A to 10B are non-limiting, exemplary illustrations of a trailer coupler lock assembly that may be used with non-adjustable trailer couplers in accordance with another embodiment of the present invention.
Figure 6B:
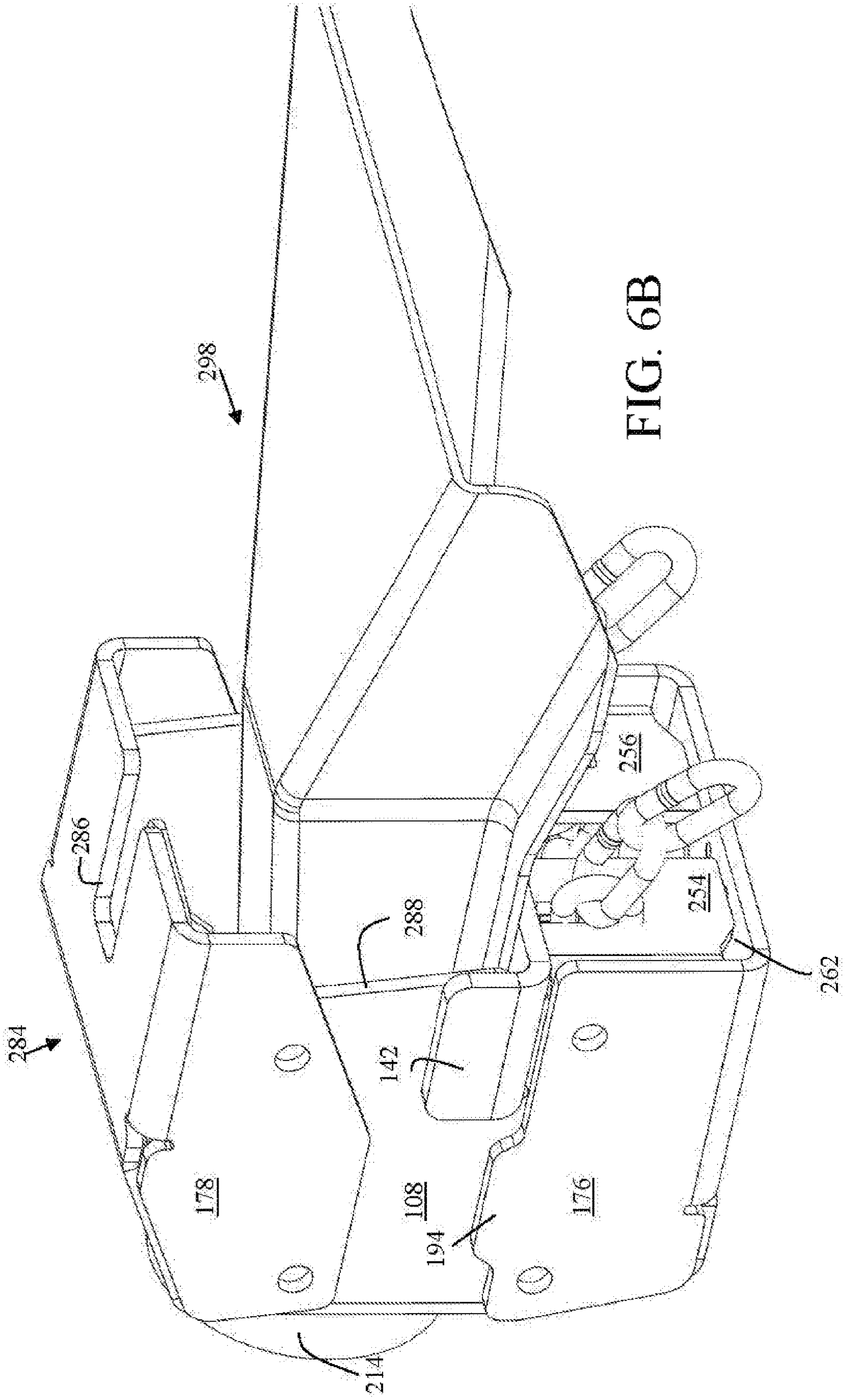
Figure 6C:
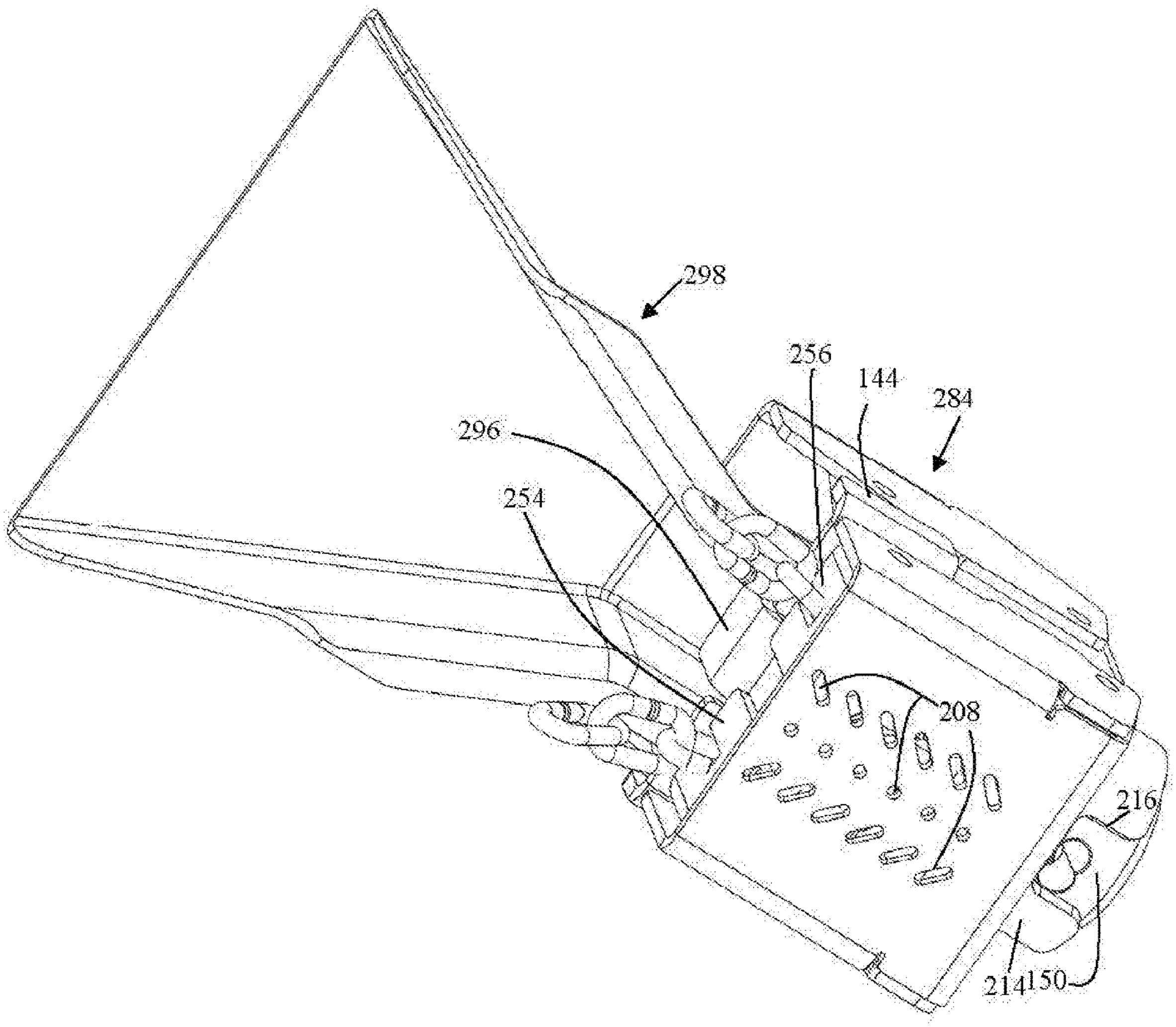
Figure 6D:
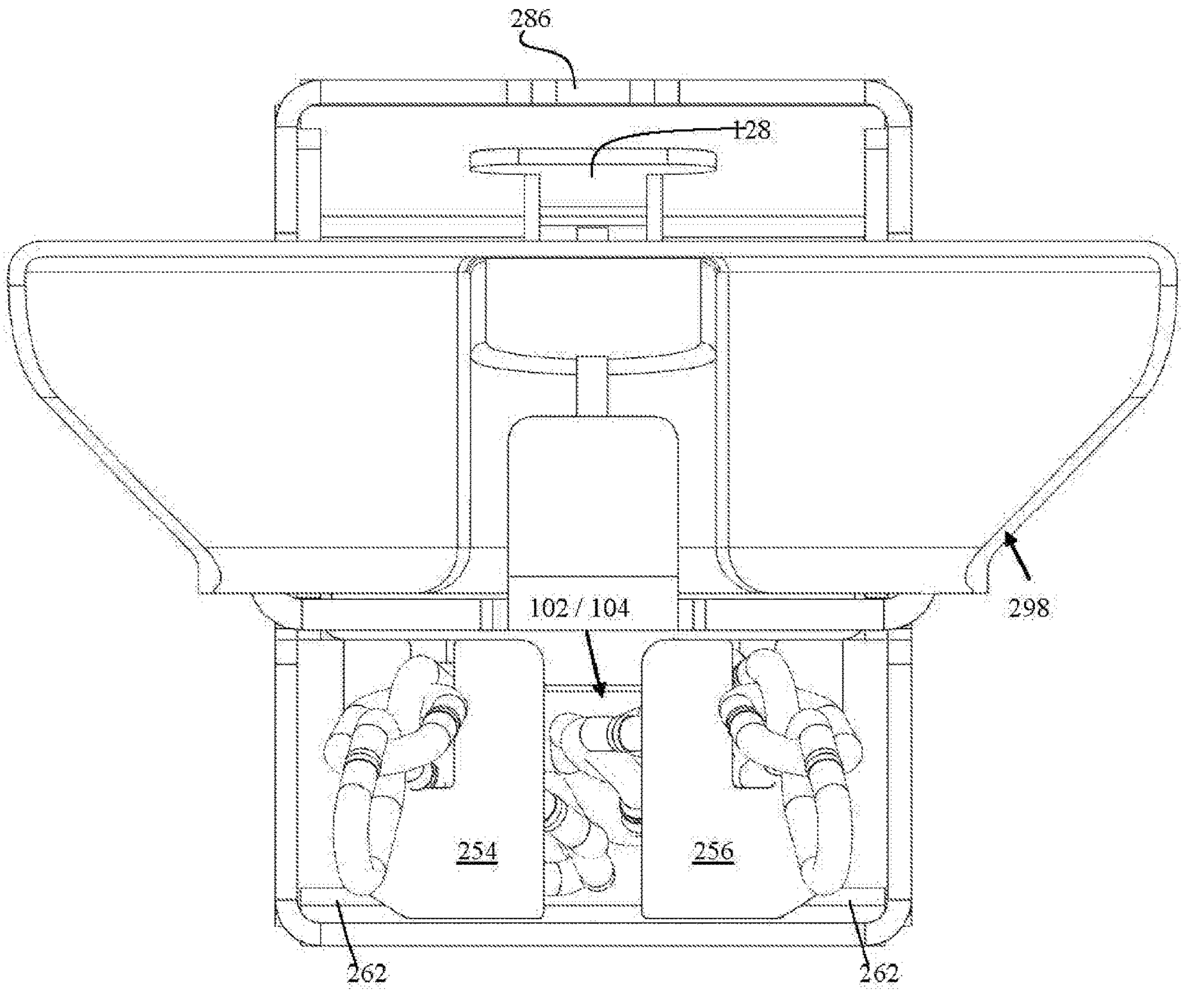
Figure 7:
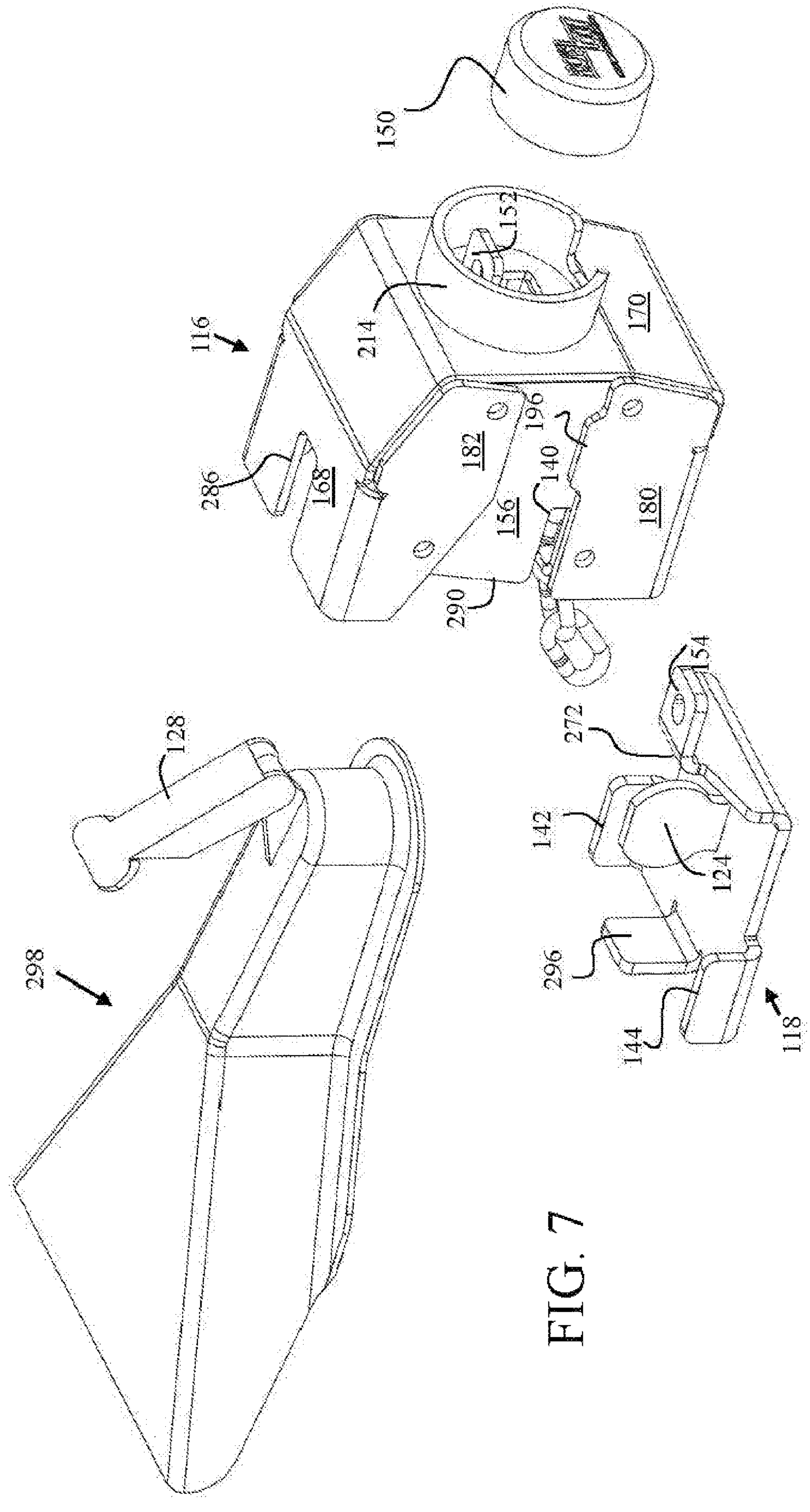
Figure 8:
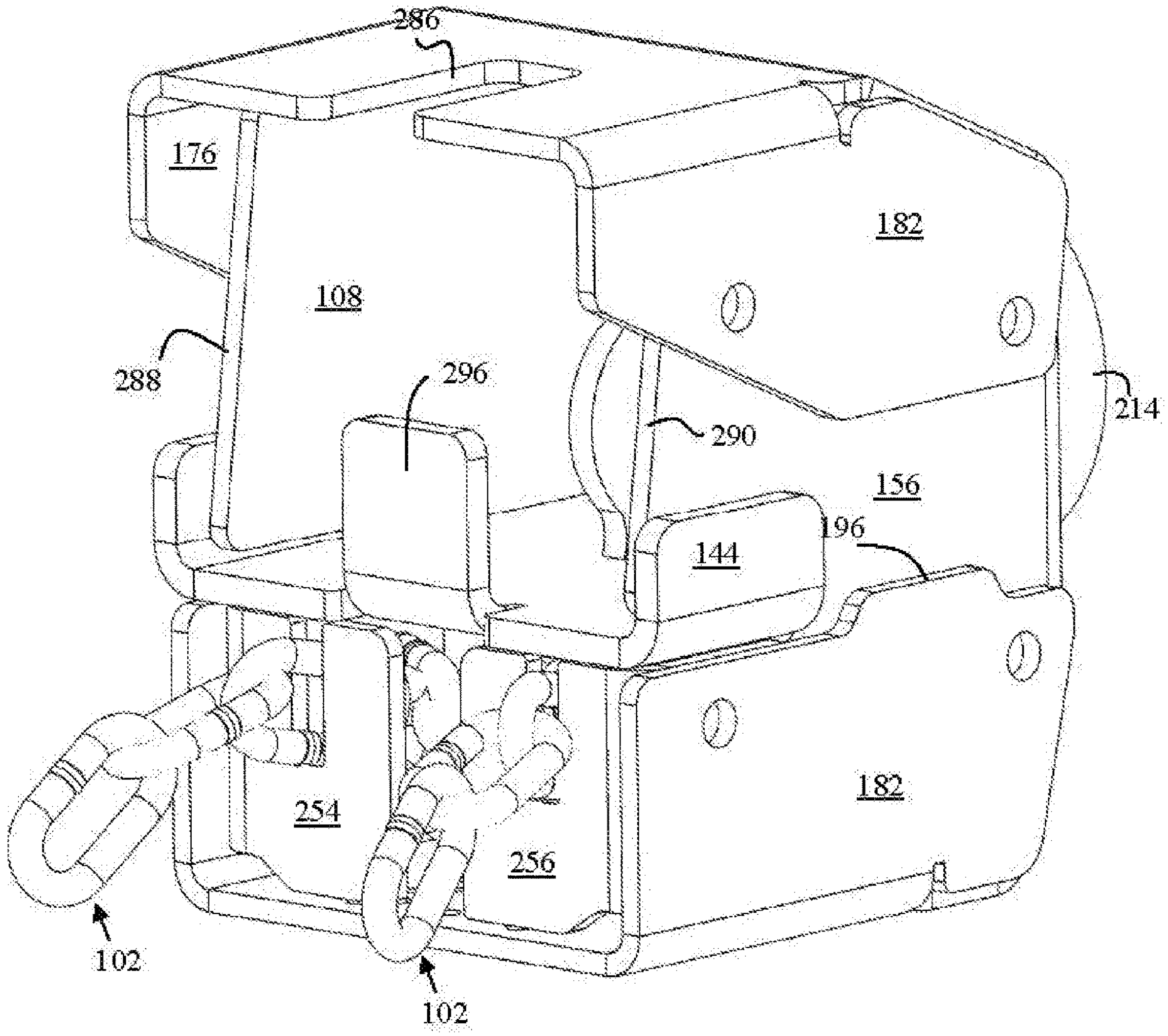
Figure 9A:
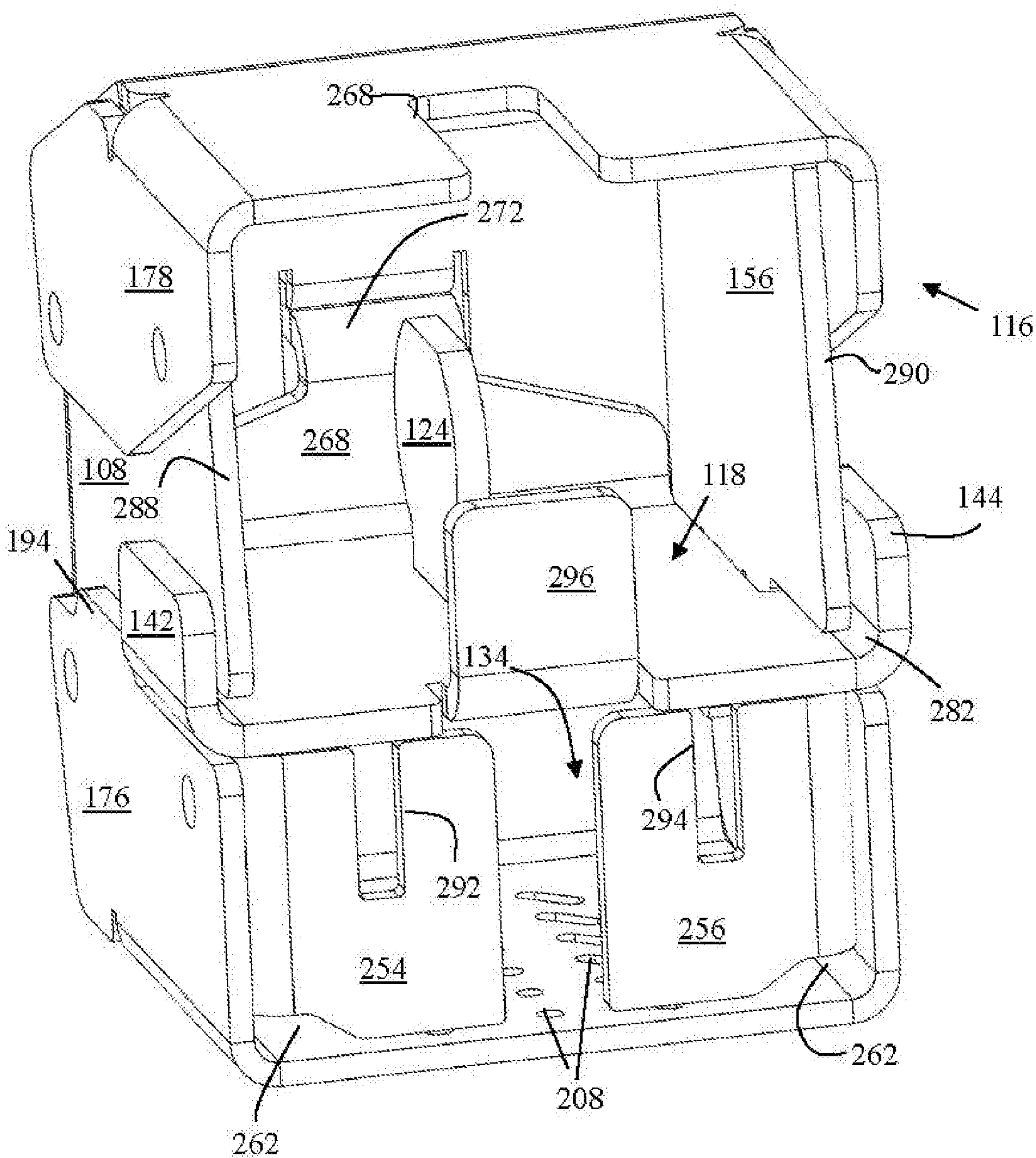
Figure 9B:
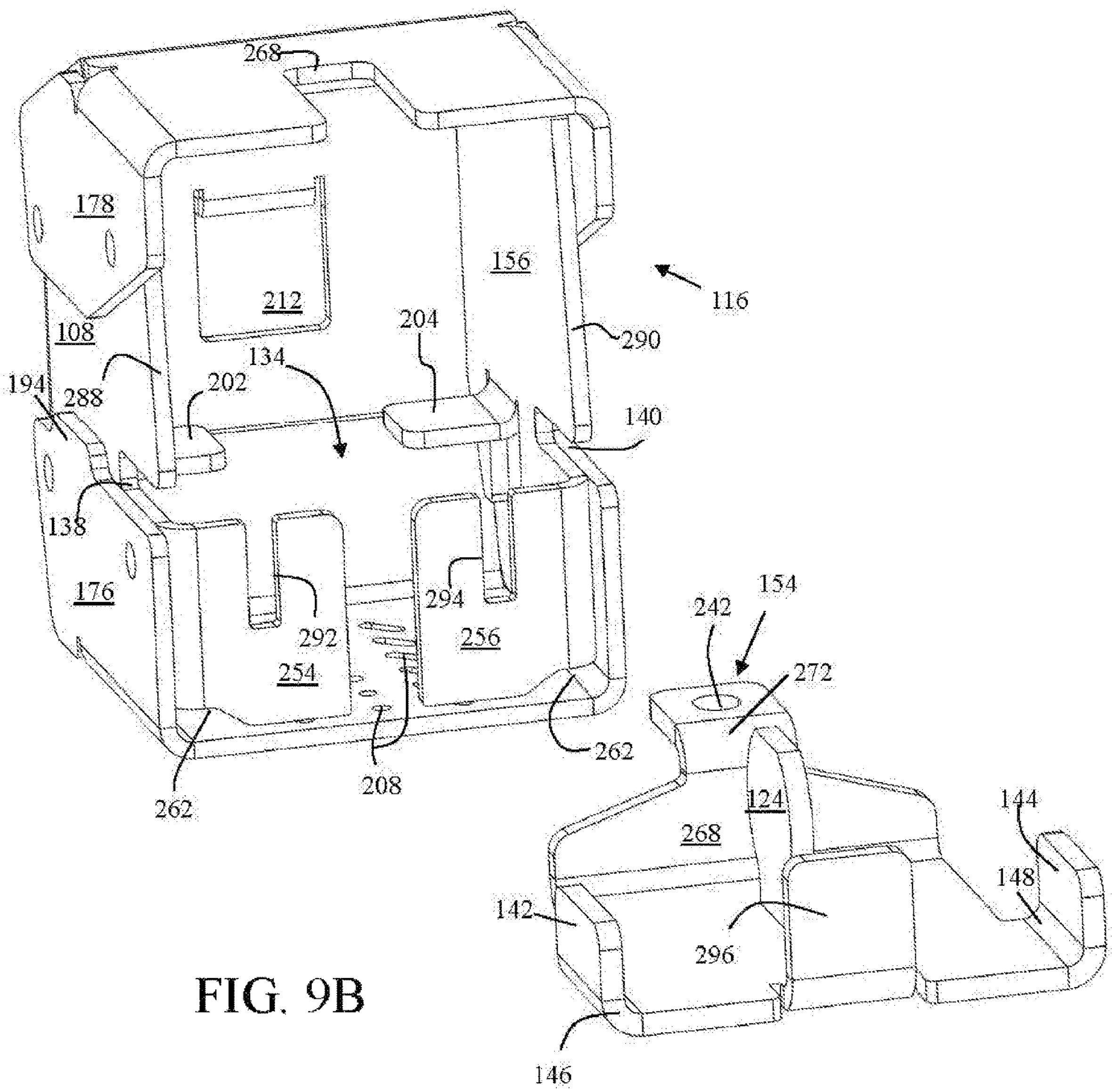
Figure 9C:
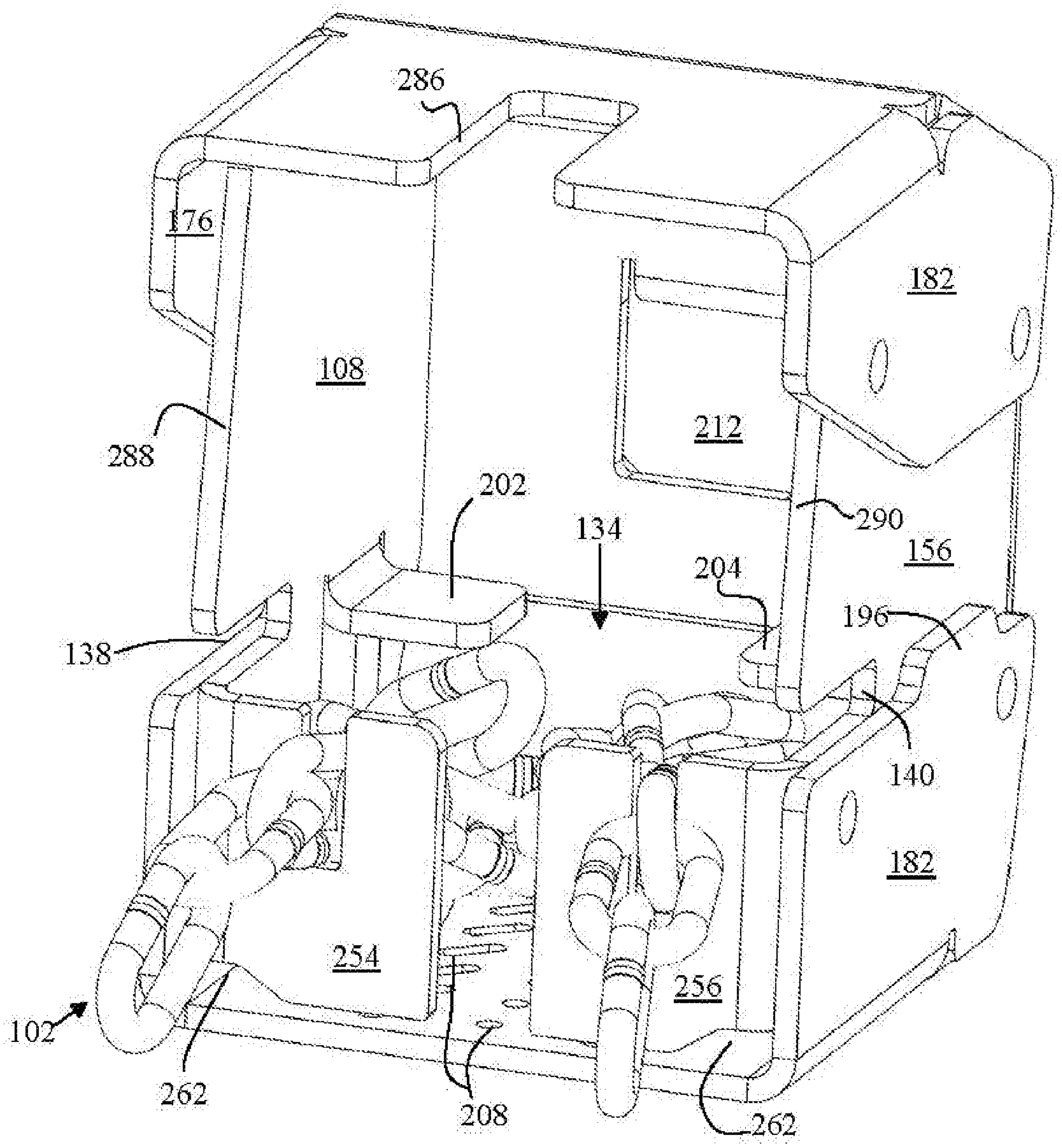
Figure 9D:
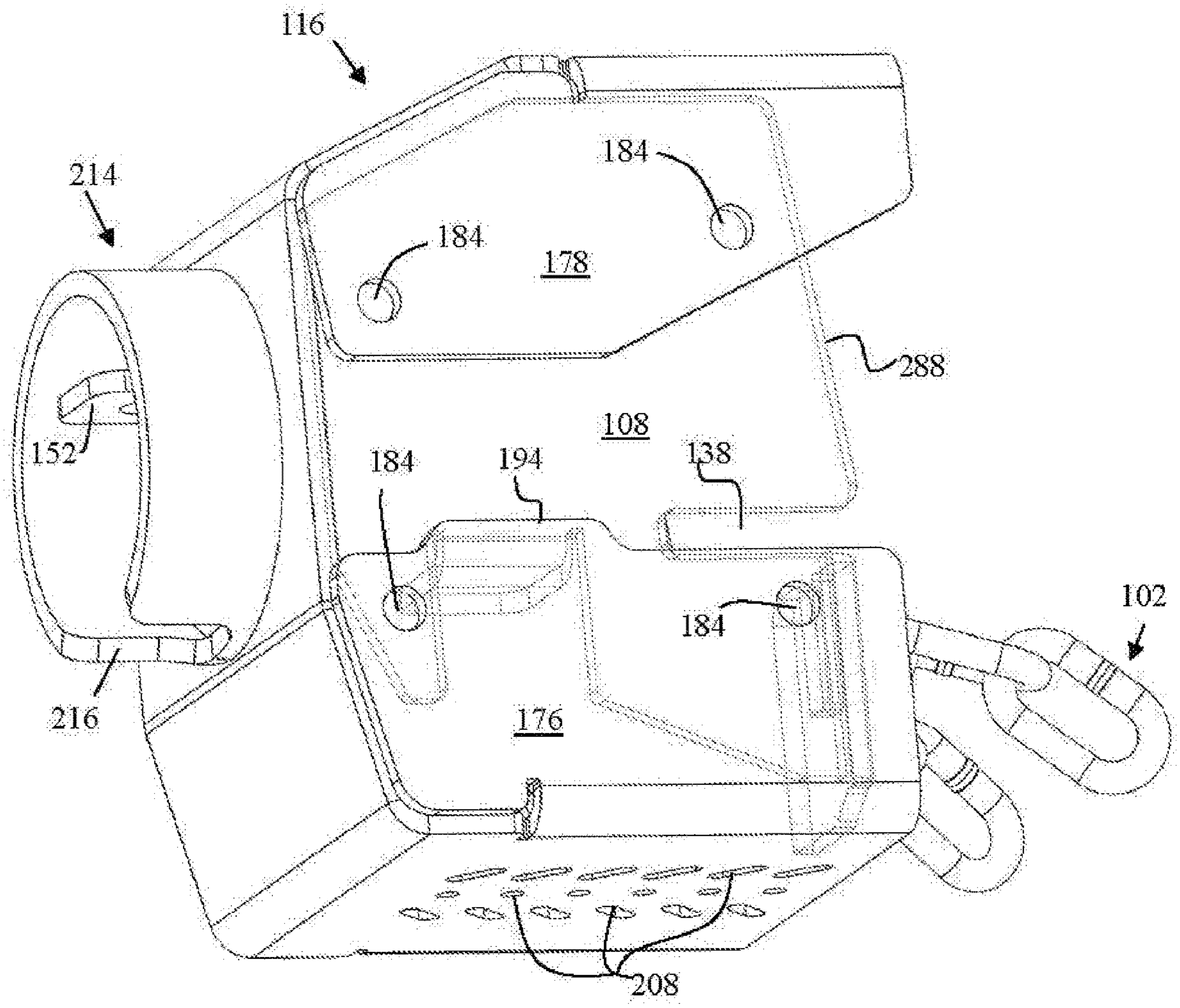
Figure 10A:
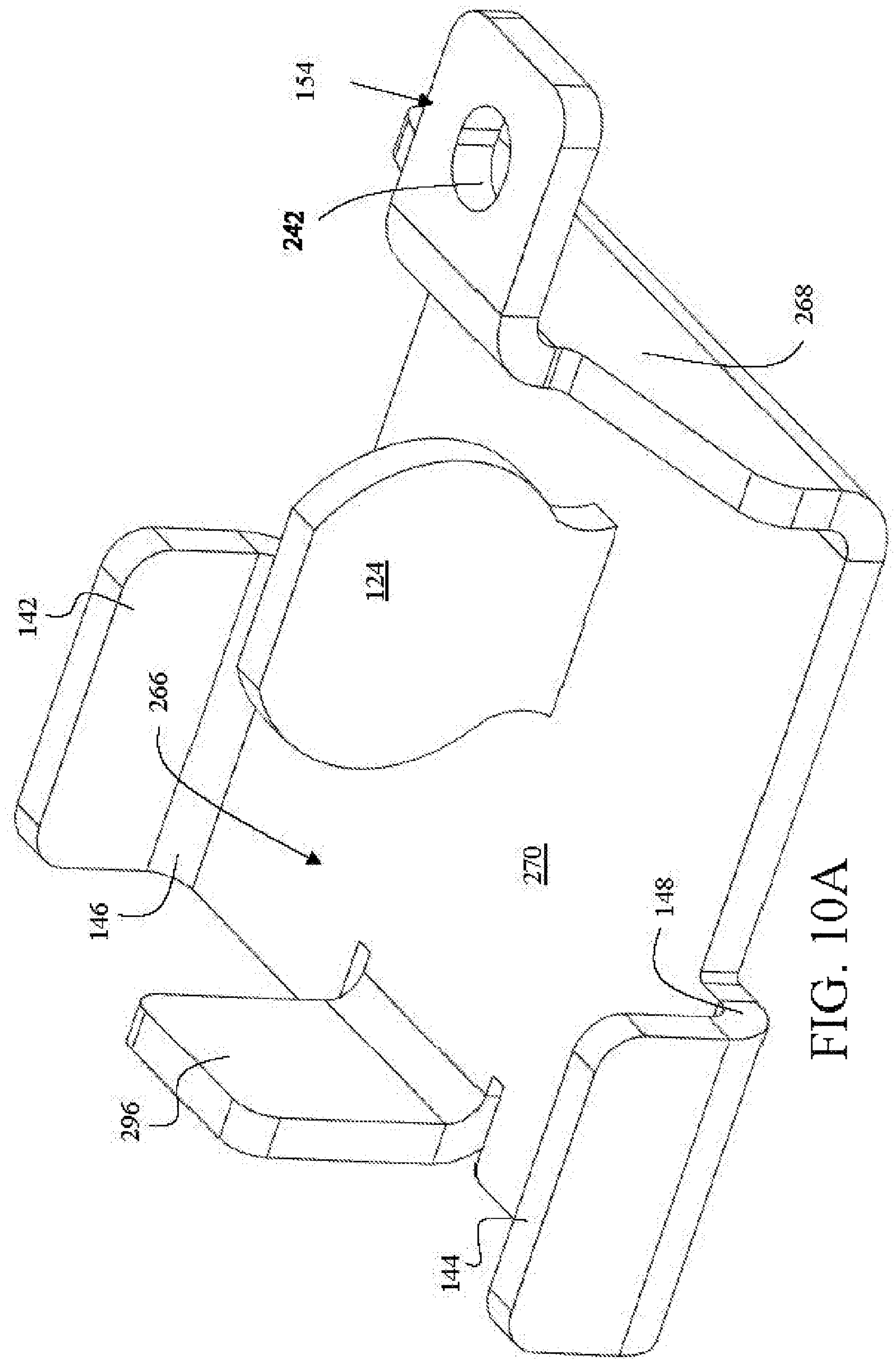
Figure 10B:
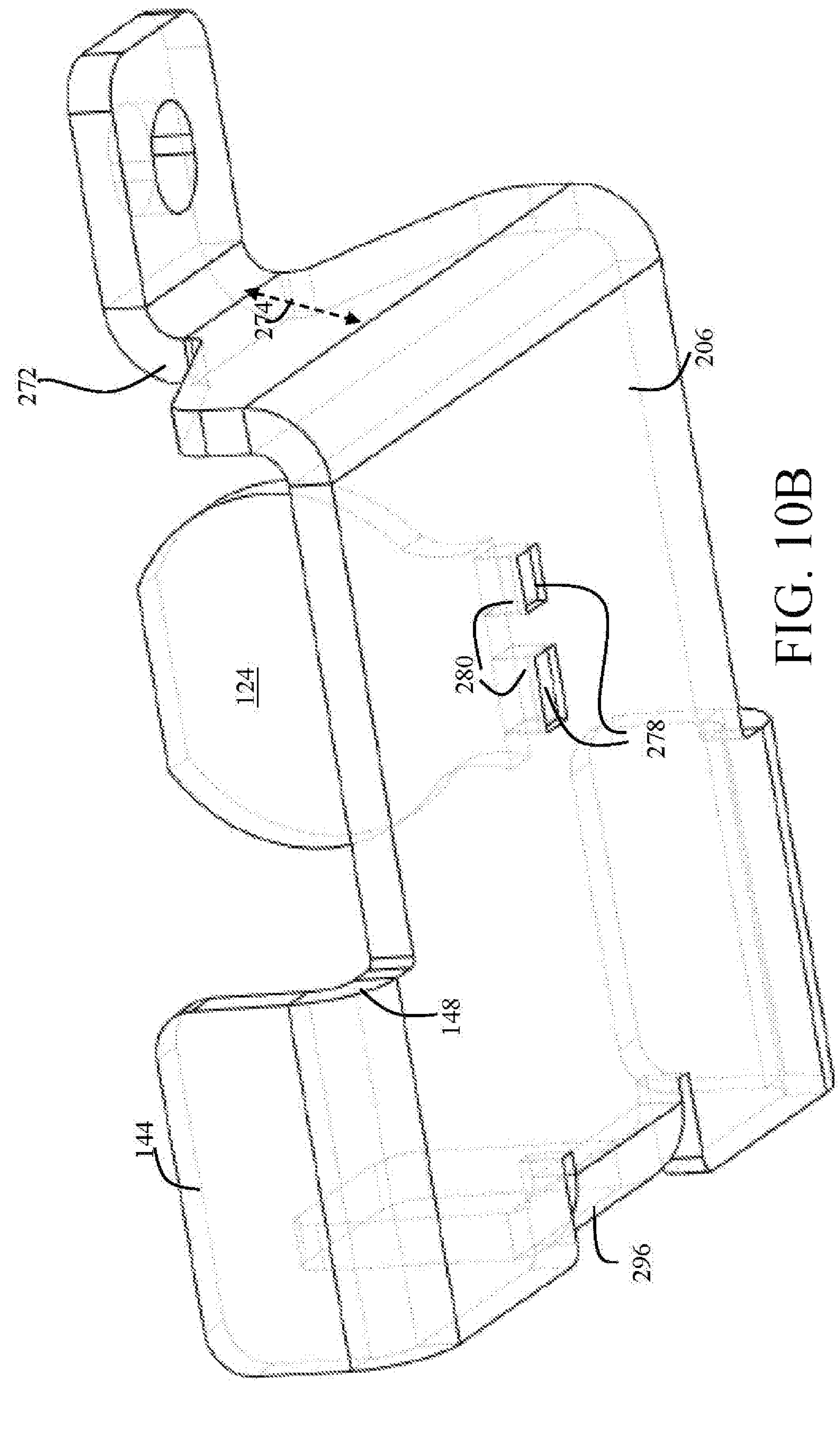

FIGS. 5A to 5C are non-limiting, exemplary illustrations of an interlock adapter of the trailer coupler lock assembly illustrated in FIGS. 1A to 4F in accordance with one or more embodiments of the present invention. Interlock adapter 118 includes a base 266 with a front projection 268 that extends from a top side 270 of base 266. Front projection 268 substantially cover second opening 212 of rigid protective case 116 to thereby prevent tampering.

Interlock adapter 118 also includes the hasp 154 that extends from an apex 272 of front projection 268, elevated 274 (FIG. 5B) from and generally extending parallel to top side 270 of base 266. Apex 272 of front projection 268 has sufficient elevation 274 to position hasp 154 underneath and adjacent to hasp 152 of rigid protective case 116.

Interlock adapter 118 also includes an engagement member 124 that engages trailer coupler 100. Engagement member 124 is an interlocking projection that is configured to interlock with an interlocking recess (well known) of trailer coupler 100.

A bottom side of engagement member 124 includes key-features (legs 276) that are inserted within commensurate set of opening 278 of base 266 for mechanically, physically fixing engagement member 124 to top side 270 of base 266 of interlock adapter 118 (also shown in FIG. 3A-2). This key/opening feature 276/280 provides indexing to allow the use of the correct engagement member 124 to match the correct trailer coupler.

Interlocking adapter further includes lateral insertion flanges 142 and 144 that help for easy insertion and removal of interlock adapter 118 with rigid protective case 116. Lateral insertion flanges 142 and 144 are received and inserted within corresponding insertion slots 134 and 140 of rigid protective case 116.

In this non-limiting, exemplary instance, insertion flanges 142 and 144 extend laterally in-plane from base 266, and are bent to extend perpendicular to top 270 of base 266. It should be noted that extending insertion flanges 142 and 144 perpendicular from bottom side of base 266 (where they would be pointing "down" as compared to "up" as shown), would require a longer lateral extension sections 146/148 of insertion flanges 142 and 144 to clear lateral sides 108 and 156 of rigid protective case 116 in addition to first and second lower lateral extension bends 176 and 180 of first member 166. This would add unnecessary weight, material, etc.

FIGS. 6A to 10B are non-limiting, exemplary illustrations of a trailer coupler lock assembly that may be used with non-adjustable trailer couplers in accordance with another embodiment of the present invention. The trailer coupler lock assembly 284 illustrated in FIGS. 6A to 10B includes similar corresponding or equivalent components, interconnections, functional, operational, and or cooperative relationships as trailer coupler lock assembly 106 that is shown in FIGS. 1A to 5C, and described above. Therefore, for the sake of brevity, clarity, convenience, and to avoid duplication, the general description of FIGS. 6A to 10B will not repeat every corresponding or equivalent component, interconnections, functional, operational, and or cooperative relationships that has already been described above in relation to trailer coupler lock assembly 106 that is shown in FIGS. 1A to 5C but instead, are incorporated by reference herein.

As illustrated in FIGS. 6A to 10B, in this non-limiting, exemplary embodiment, trailer coupler assembly 284 includes a rigid protective case 116 that has an open notch 286 on top 168. Open notch 286 allows for one coupler lock assembly 106 to be used to secure couplers 100 with different latch 128 designs.

Additionally, rigid protective case 116 of trailer coupler lock assembly 284 includes first and second lateral sides 108 and 156 that are shorter (lengthwise) and further, second lateral side 156 no longer has notches 252. Both first and second lateral sides 108 and 156 of rigid protective case 116 of trailer coupler lock assembly 284 have simple flat edges 288 and 290 at their respective rear portions because there is no need or requirement to extend lateral sides 108 and 156 to cover over any fastener of a trailer coupler 100 as trailer coupler 298 used with this embodiment as shown in FIGS. 6A to 10B is not adjustable and has no adjuster assembly 110 that may include fasteners 112/158.

Further, in this non-limiting, exemplary embodiment, rear barriers 254 and 256 of compartment 134 include center notches 292 and 294. That is, in this embodiment, instead of lateral gaps 260 for chain retention, barriers 254 and 256 include center notches 292 and 294 to allow for management of loose chain.

As to interlock adapter 118 of trailer coupler lock assembly 284, in this non-limiting, exemplary embodiment, interlock adapter 118 further includes an auxiliary engagement member 296 that engages trailer coupler 298. Auxiliary engagement member 296 is an auxiliary interlocking projection that is configured to interlock with an auxiliary interlocking recess (well-known) of trailer coupler 298.

Auxiliary interlocking projection prevents interlock adapter 118 for this embodiment from rotating in relation to trailer coupler 298. It enables the combined interlocked adapter 118 and trailer coupler 298 to be aligned (or inline) and substantially stationary in relation to one another for easier insertion into rigid protective case 116 of trailer coupler lock assembly 284. The use of the auxiliary engagement member 296 is determined based on the design of coupler 100. Not all coupler 100 designs allow for use of this auxiliary engagement member 296.

Figure 11A:
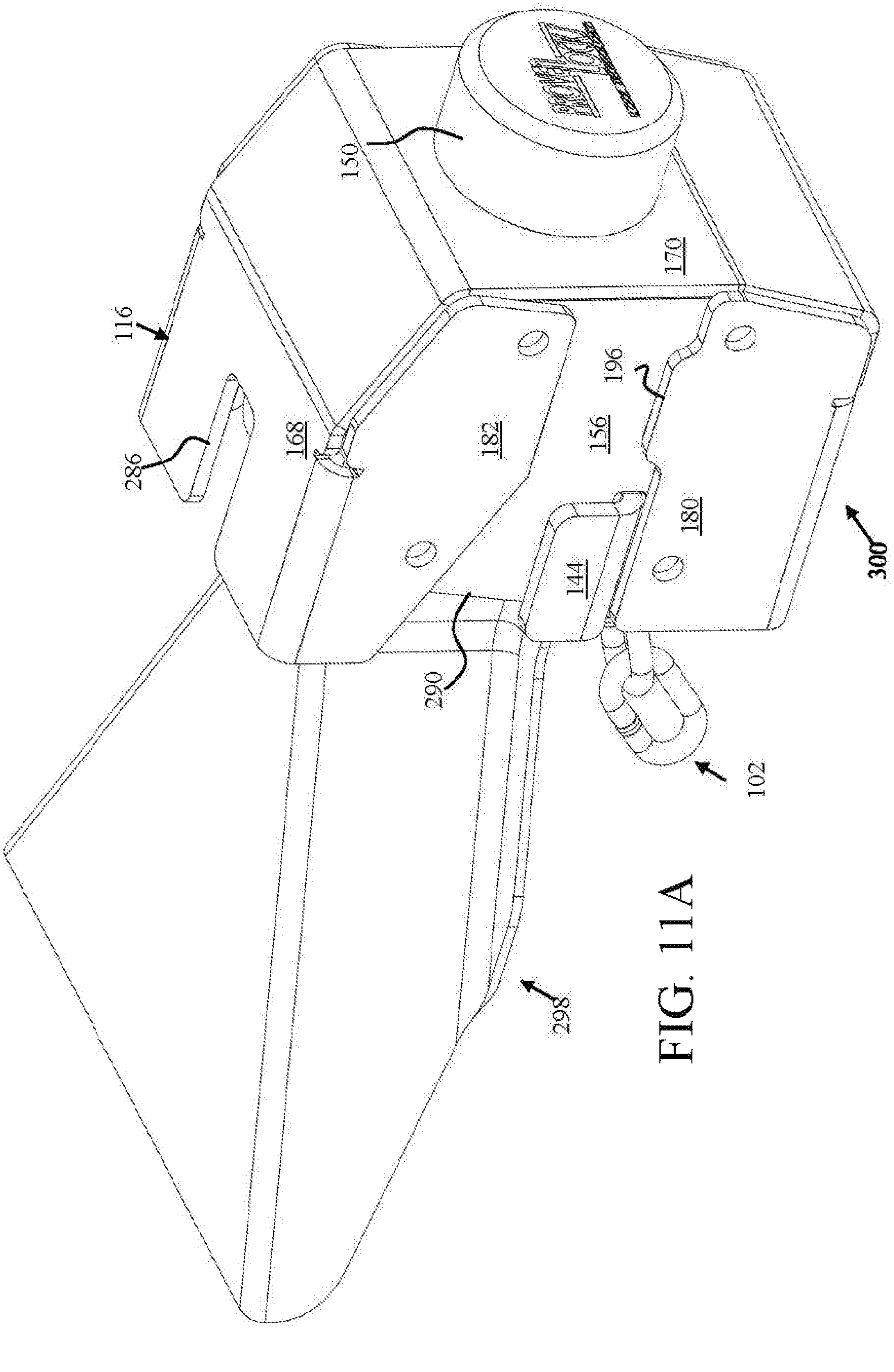
FIGS. 11A to 11C are non-limiting, exemplary illustrations of a trailer coupler lock assembly with a fixed lock mechanism in accordance with another embodiment of the present invention.
Figure 11B:
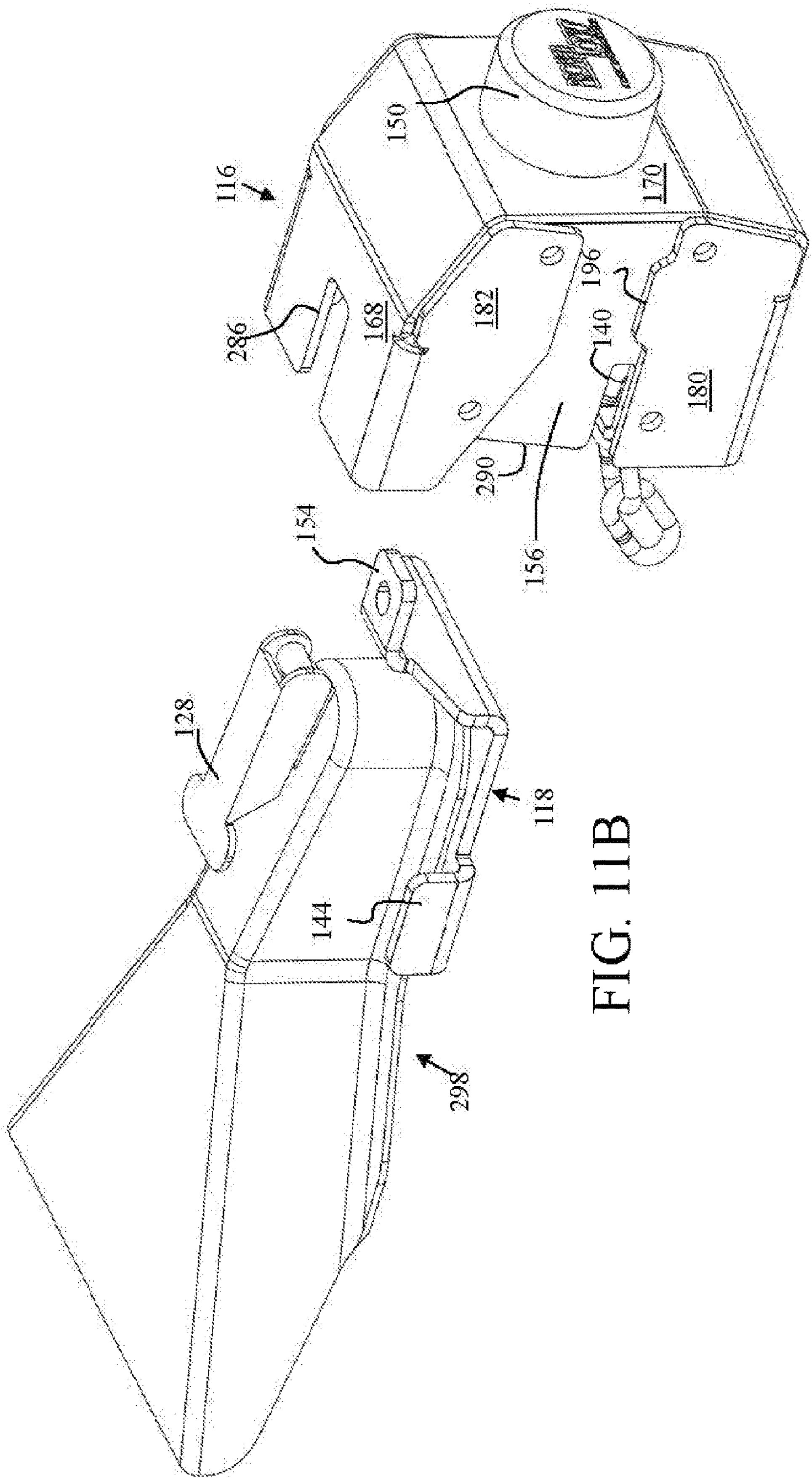
Figure 11C:
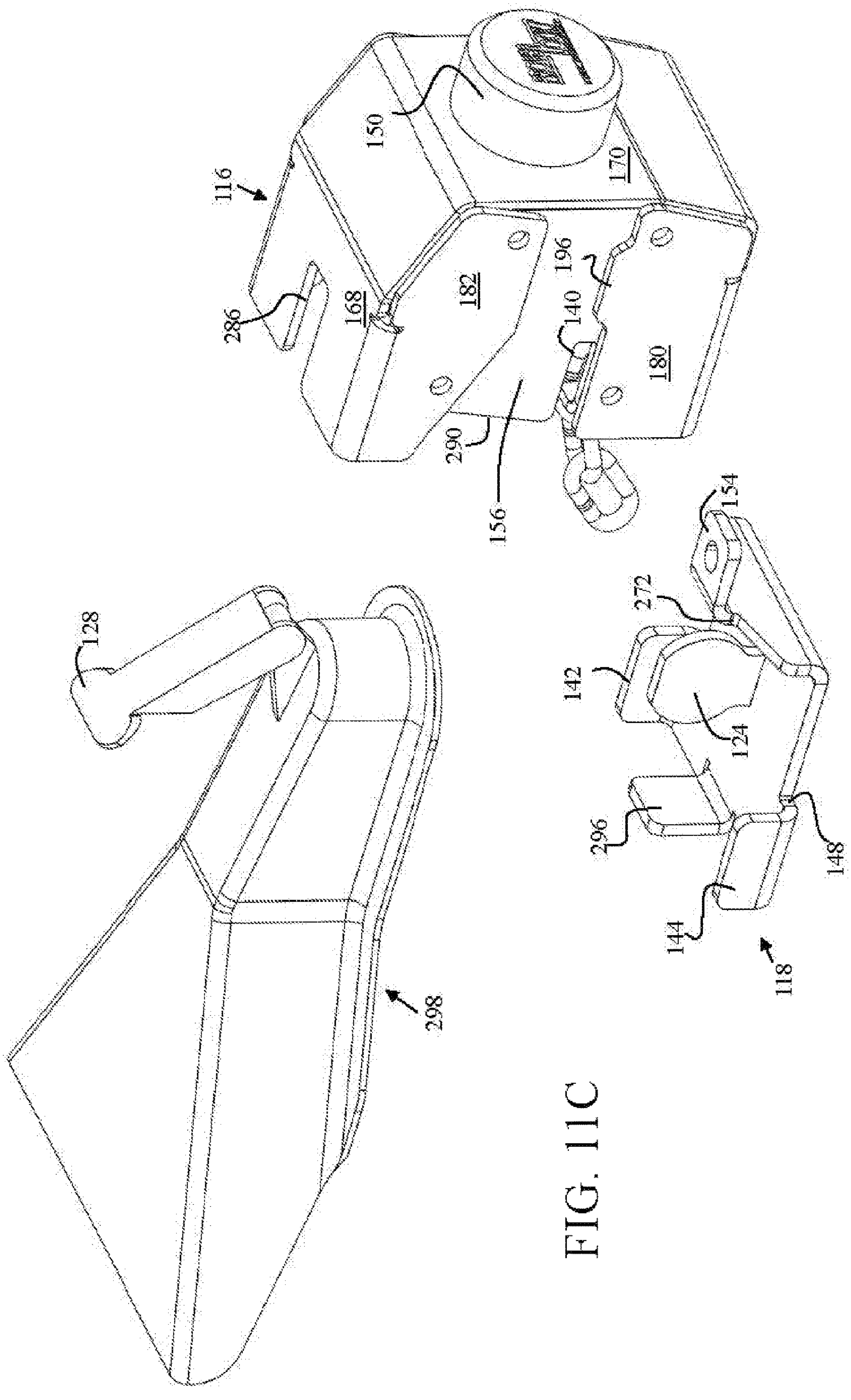

FIGS. 11A to 11C are non-limiting, exemplary illustrations of a trailer coupler lock assembly with a fixed lock mechanism in accordance with another embodiment of the present invention. Trailer coupler lock assembly 300 illustrated in FIGS. 11A to 11C includes similar corresponding or equivalent components, interconnections, functional, operational, and or cooperative relationships as trailer coupler lock assembly 106 and 284 that is shown in FIGS. 1A to 10B, and described above. Therefore, for the sake of brevity, clarity, convenience, and to avoid duplication, the general description of FIGS. 11A to 11C will not repeat every corresponding or equivalent component, interconnections, functional, operational, and or cooperative relationships that has already been described above in relation to trailer coupler lock assembly 106 and 284 that is shown in FIGS. 1A to 10B but instead, are incorporated by reference herein.

As illustrated in FIGS. 11A to 11C, in this non-limiting, exemplary embodiment, trailer coupler assembly 300 includes a conventional lock mechanism 150 that may be fixed (e.g., welded) onto front 170 of rigid protective case 116 of trailer coupler assembly 300. FIG. 3A-2 illustrates trailer coupler lock assembly 106 use with adjustable trailer coupler, but with shroud 214 removed for clarity. However, FIG. 3A-2 also illustrated the manner in which a trailer coupler assembly 300 may be implemented. Accordingly, use of a shroud 214 in both of the above embodiments of trailer coupler lock assembly 106 and 284 are optional. Lock 150 itself may be directly, mechanically physically connected (e.g., by welding) and fixed onto exterior of front 170 of rigid protective case 116 without shroud 214. This way, hasp 154 of interlock adapter 118 will directly be inserted into and move within hasp cavity 302 (best shown in FIG. 3A-2) of lock 150, below hasp 152 of rigid protective case 116, with hasp openings 240 and 242 aligned with hasp cavity of lock 150 to receive a shackle 304 of a cylindrical core of lock mechanism 150.

As detailed above in relation to all of the disclosed embodiments, trailer coupler lock assembly of the present invention provides a compartment with rigid protective case that houses and secures safety chain assembly of trailer coupler, rigid protective case also houses and secures latch arm of trailer coupler, and with at least one embodiment providing extended first and second lateral sides that prevent tampering with fasteners of adjustable trailer coupler (if an adjustable trailer couple is to be secured).

Although the invention has been exemplarily illustrated and described in considerable detail in language specific to structural features and or method acts, it is to be understood that the invention defined in the appended claims is not necessarily limited to the specific features or acts described and illustrated. Rather, the specific features and acts are disclosed as exemplary preferred forms of implementing the claimed invention. Stated otherwise, it is to be understood that the phraseology and terminology employed herein, as well as the abstract and the drawings, are for the purpose of description and should not be regarded as limiting. Further, the specification is not confined to the disclosed embodiments. Therefore, while exemplary illustrative embodiments of the invention have been described and illustrated, numerous variations and alternative embodiments will occur to those skilled in the art. As a non-limiting example, pipe or tubing structures such as a single piece hollow cylinder may be used to manufacture a rigid protective case in lieu of the disclosed methodologies, with a compartment within the hollow cylindrical structure. In fact, the non-limiting, exemplary rigid protective case may comprise of any configuration so long as it has sufficient interior volume of space for a compartment to secure a safety chain assembly and can house and lock the trailer coupler. As another non-limiting example, the hasp of the rigid protective case may be removed. In other words, the rigid protective case may be manufactured without its hasp, which would still enable securing of the trailer coupler and the safety chain assembly, including the interlock adapter and its hasp with a lock mechanism. As yet another non-limiting example, a simple post or a flange extending from an interior bottom of the compartment may be added to hook or wrap around and secure and retain the safety chain assembly within the compartment, instead of using barriers 254 and 256. The flange may comprise of a simple tab with an opening within which the hooks of the safety chain assembly engage. As a further another non-limiting example, notches 252 may be optional. For example, trailer coupler 100 may be wider and hence, trailer coupler lock assembly 106 must in general be commensurately wider. This way, lateral sides 108 and 156 would easily extend to cover over fasteners 112 without the need for notches 252. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A trailer coupler lock assembly, comprising:

a rigid protective case; and an interlock adapter for interlocking a trailer coupler within the rigid protective case, the interlock adapter being detachably associated with the rigid protective case, the interlock adapter including the hasp; the rigid protective case having a compartment for securing a safety chain assembly.

2. The trailer coupler lock assembly as set forth in claim 1, wherein:

the rigid protective case includes one or more openings that function as retention points for retaining the safety chain assembly.

3. The trailer coupler lock assembly as set forth in claim 1, wherein:

the interlock adapter includes the hasp that is locked by a lock mechanism.

4. The trailer coupler lock assembly as set forth in claim 1, wherein:

the rigid protective case includes:

a first opening for receiving the trailer coupler;

a second opening for receiving the hasp of the interlock adapter.

5. The trailer coupler lock assembly as set forth in claim 4, wherein:

the second opening of the rigid protective case is surrounded by an external protective shroud that shields the lock mechanism against tampering.

6. The trailer coupler lock assembly as set forth in claim 5, wherein:

the shroud has an opening to allow the lock mechanism to operate without restriction.

7. The trailer coupler lock assembly as set forth in claim 1, wherein:

an interior of the rigid protective case has sufficient volume of space to receive a trailer coupler.

8. The trailer coupler lock assembly as set forth in claim 1, wherein:

the rigid protective case further includes:

slots for stabilizing the interlock adapter detachably engaged within the rigid protective case.

9. The trailer coupler lock assembly as set forth in claim 1, wherein:

lateral sides of rigid protective case extend and block an adjustable mechanism of an adjustable trailer coupler.

10. The trailer coupler lock assembly as set forth in claim 1, wherein:

the compartment houses and secures safety chain assembly of trailer coupler;

the rigid protective case houses and secure a latch arm of the trailer coupler; and lateral sides of the rigid protective case prevent tampering with the trailer coupler.

11. The trailer coupler lock assembly as set forth in claim 1, wherein:

the interlock adapter includes:

an engagement member that engages the trailer coupler.

12. The trailer coupler lock assembly as set forth in claim 1, wherein:

an engagement member of the interlock adapter is an interlocking projection that is configured to interlock with an interlocking recess of the trailer coupler.

13. A trailer coupler lock assembly, comprising:

a rigid protective case that shields a trailer coupler;

the rigid protective case includes:

a detachable interlock adapter that facilitates securing of the trailer coupler assembly to the trailer coupler lock assembly;

locking compartment for housing, securing, and locking a safety chain assembly, the locking compartment having openings as an integral part of the rigid protective case as retention points for the safety chain assembly.

14. The trailer coupler lock assembly as set forth in claim 13, wherein:

rigid protective case extends over adjustable mechanism of a trailer coupler that is adjustable.

15. The trailer coupler lock assembly as set forth in claim 13, wherein:

the interlock adapter detachably engages the trailer coupler, and is secured to the rigid protective case.

16. The trailer coupler lock assembly as set forth in claim 13, wherein:

the rigid protective case has openings that function as retention points for safety chain assembly.

17. The trailer coupler lock assembly as set forth in claim 13, wherein:

the interlock adapter is locked with the rigid protective case using a lock mechanism.

18. A method of locking a trailer coupler lock assembly, comprising:

providing a rigid protective case;

removing an interlock adapter from the rigid protective case;

positioning a projection of the interlocking adapter within an interlocking recess of the trailer coupler;

latching the coupler latch to secure the interlock adapter to trailer coupler;

positioning safety chain assembly within a compartment of the rigid protective case;

mounting the rigid protective case and the included safety chain assembly over the combined interlock adapter and the trailer coupler;

wherein: the hasp piece of the interlock adapter passes through the body of the rigid protective case and is secured using a lock, preventing the protective case from being removed from the interlocking adapter attached to the trailer coupler.

19. A trailer coupling lock assembly, comprising:

a rigid protective case; and a coupling adapter detachably associated with the rigid protective case;

the rigid protective case having a compartment for securing a safety chain assembly and a panel with a plurality of chain retention notches, the chain retention notches receiving links of the safety chain assembly and preventing removal of the safety chain assembly without removing the coupling adapter from the rigid protective case;

a lock assembly for releasably securing the rigid protective case to the coupling adapter.

* * * * *